US008628658B2

(12) United States Patent
Giovannitti et al.

(10) Patent No.: US 8,628,658 B2
(45) Date of Patent: *Jan. 14, 2014

(54) EMERGENCY EXTRACTION LINE AND MARINE PARTICLE SKIMMER

(75) Inventors: Fred Giovannitti, Las Vegas, NV (US); Ashley Day, Anaheim, CA (US)

(73) Assignees: Ashley Day, Anaheim, CA (US); Fred Giovannitti, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/493,399

(22) Filed: Jun. 11, 2012

(65) Prior Publication Data

US 2013/0081987 A1    Apr. 4, 2013

Related U.S. Application Data

(63) Continuation of application No. 13/106,538, filed on May 12, 2011, now Pat. No. 8,216,457.

(60) Provisional application No. 61/334,110, filed on May 12, 2010, provisional application No. 61/414,080, filed on Nov. 16, 2010.

(51) Int. Cl.
*E02B 15/10* (2006.01)
*E02B 15/04* (2006.01)
*C02F 1/40* (2006.01)
*C02F 101/32* (2006.01)
*C02F 103/00* (2006.01)

(52) U.S. Cl.
CPC .............. *E02B 15/045* (2013.01); *E02B 15/106* (2013.01); *C02F 1/40* (2013.01); *C02F 2101/32* (2013.01); *C02F 2103/007* (2013.01); *C02F 2201/008* (2013.01); *C02F 2201/009* (2013.01); *Y10S 210/923* (2013.01)

USPC .............. 210/170.05; 210/170.11; 210/242.3; 210/923

(58) Field of Classification Search
USPC .................... 210/122, 170.05, 170.09, 170.1, 210/170.11, 242.1, 242.3, 923
See application file for complete search history.

(56) References Cited

U.S. PATENT DOCUMENTS

| | | |
|---|---|---|
| 3,476,246 A | 11/1969 | Dahan |
| 3,709,366 A | 1/1973 | Pruitt |
| 3,722,688 A | 3/1973 | Wirsching |
| 3,744,254 A | 7/1973 | Fennelly |
| 3,745,115 A | 7/1973 | Olsen |
| 3,831,756 A | 8/1974 | Bhuta et al. |
| 3,853,767 A | 12/1974 | Mohn |
| 3,853,768 A | 12/1974 | Bagnulo |
| 3,970,556 A | 7/1976 | Gore |
| 4,024,063 A | 5/1977 | Mori |
| 4,038,182 A | 7/1977 | Jenkins |
| 4,111,809 A | 9/1978 | Pichon |
| 4,908,127 A | 3/1990 | Metais |
| 4,988,438 A | 1/1991 | Eddleman |
| 5,169,526 A | 12/1992 | Gould |
| 5,474,685 A | 12/1995 | Breslen |
| 6,743,358 B1 | 6/2004 | Lundback |
| 2004/0045912 A1 | 3/2004 | Guilmette |

*Primary Examiner* — Christopher Upton
(74) *Attorney, Agent, or Firm* — King & Spalding

(57) ABSTRACT

Removing contaminated water and pollutants from a body of water. Apparatus includes marine particle skimmers that can pull contaminated water through filter units or otherwise direct contaminated water or pollutants to a collection point. Emergency extraction lines can remove contaminated water and pollutants by conducting water to an extraction point. Emergency extraction lines include multiple emergency extraction line components connected to each other. The marine particle skimmers and emergency extraction lines typically float on the surface of the water but can be configured to extract contaminants below the water surface.

15 Claims, 44 Drawing Sheets

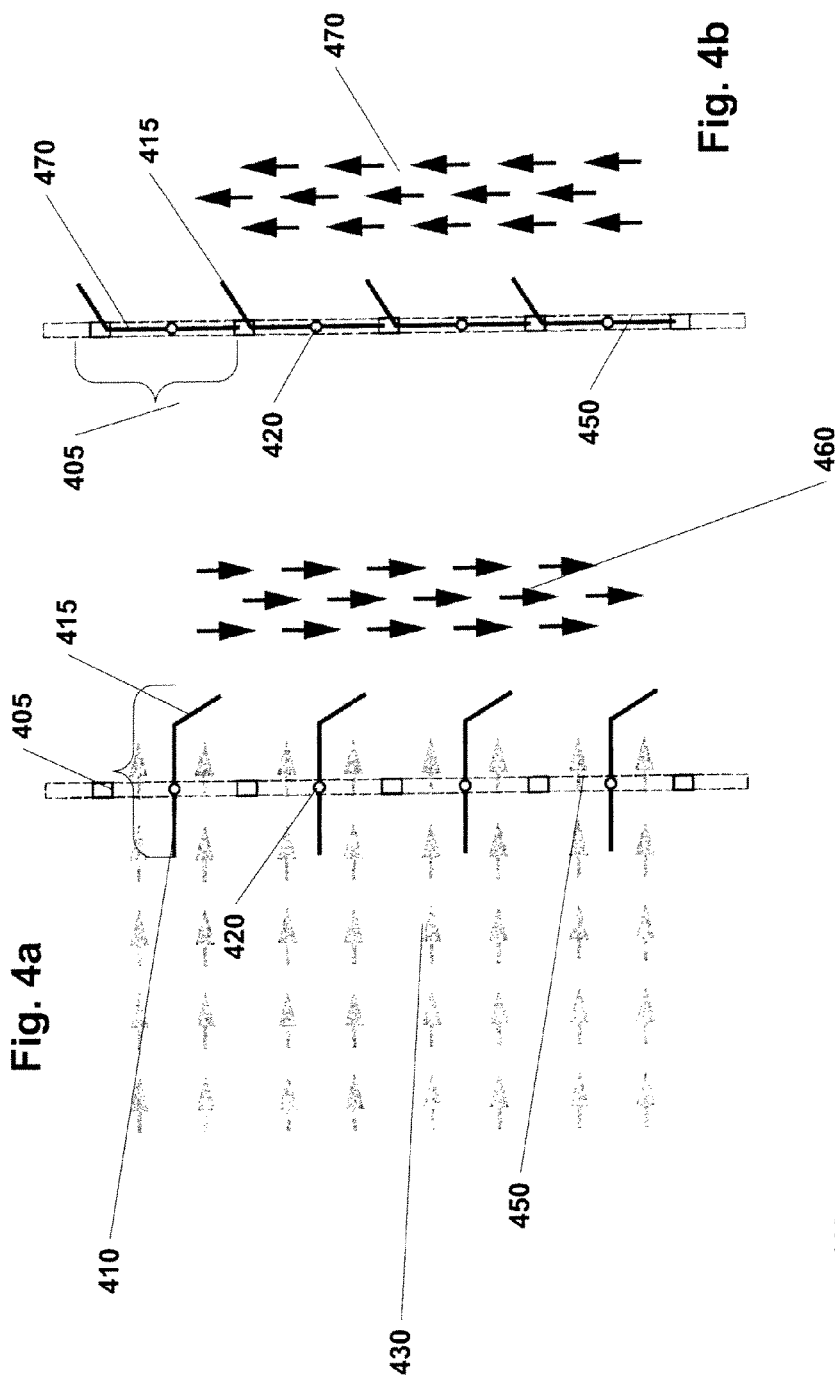

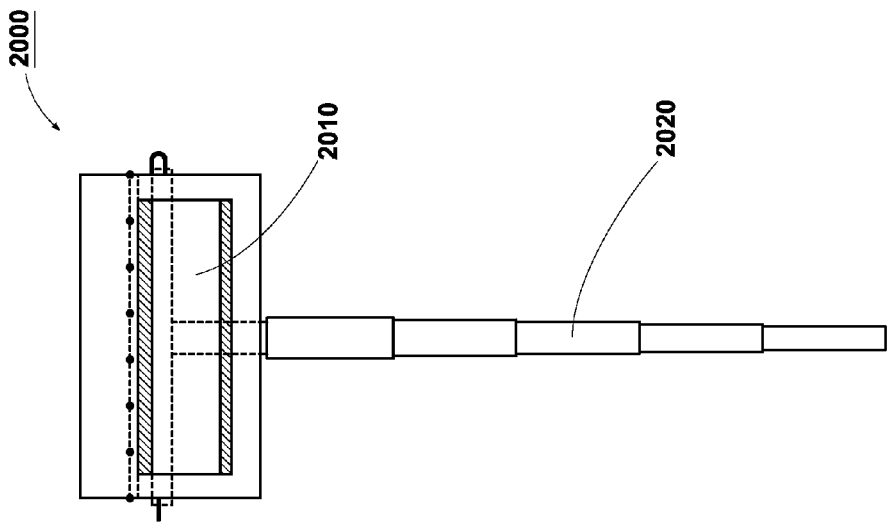
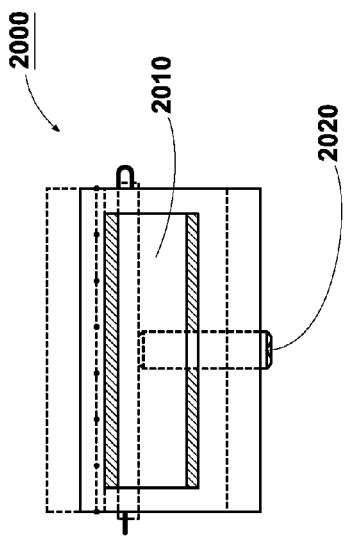
Fig. 20b
Fig. 20a

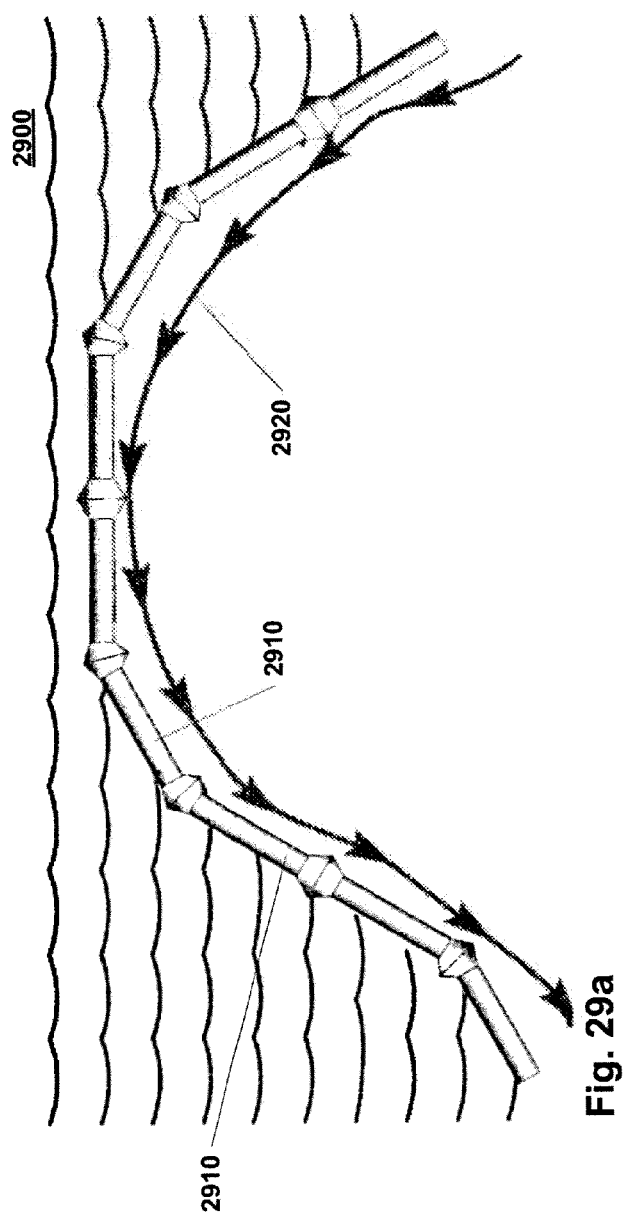
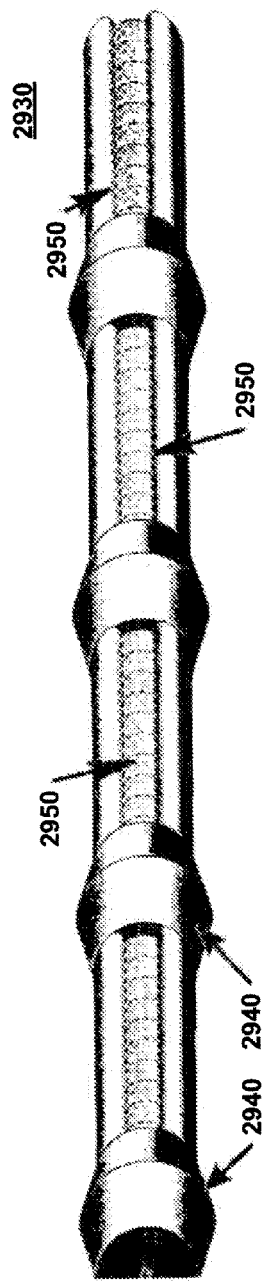
Fig. 29a
Fig. 29b

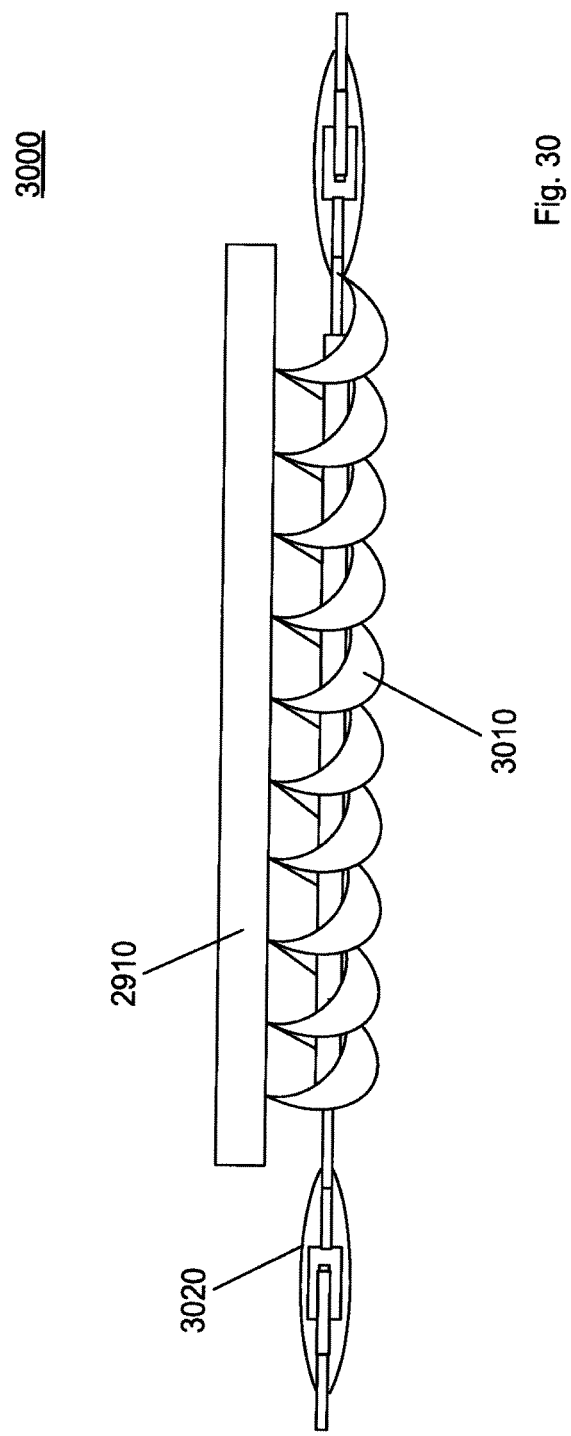

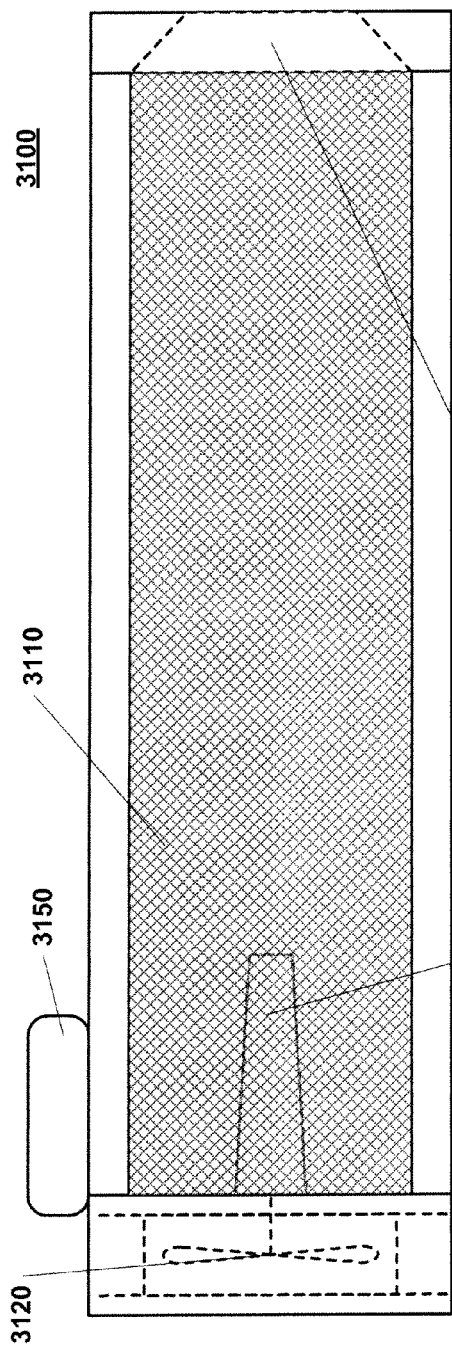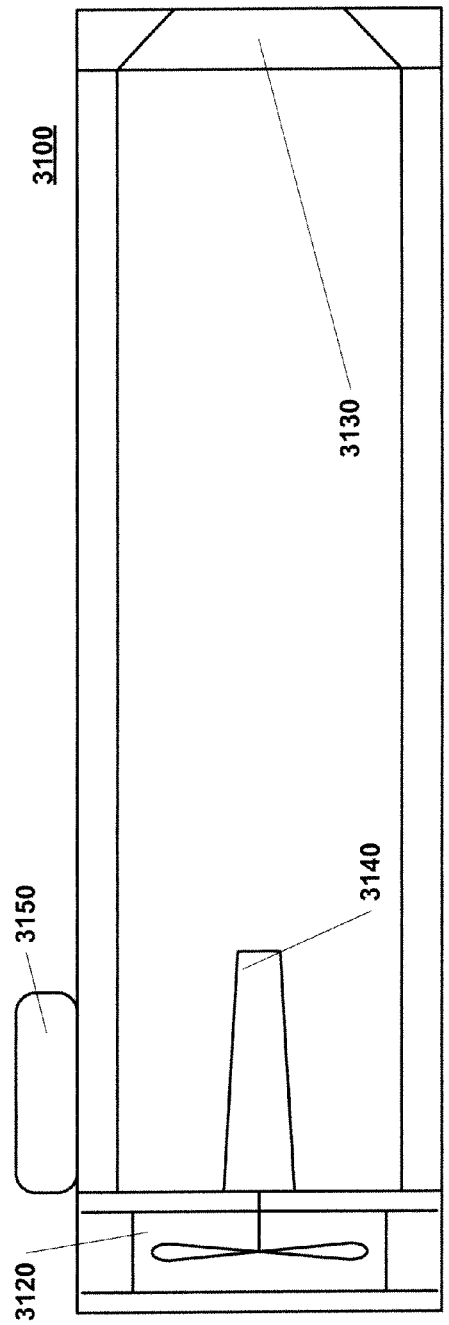

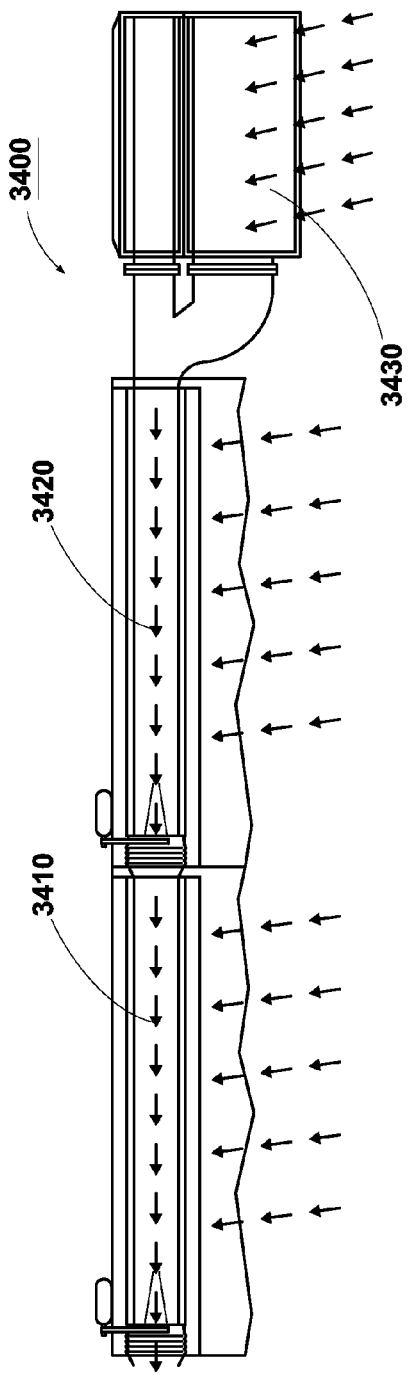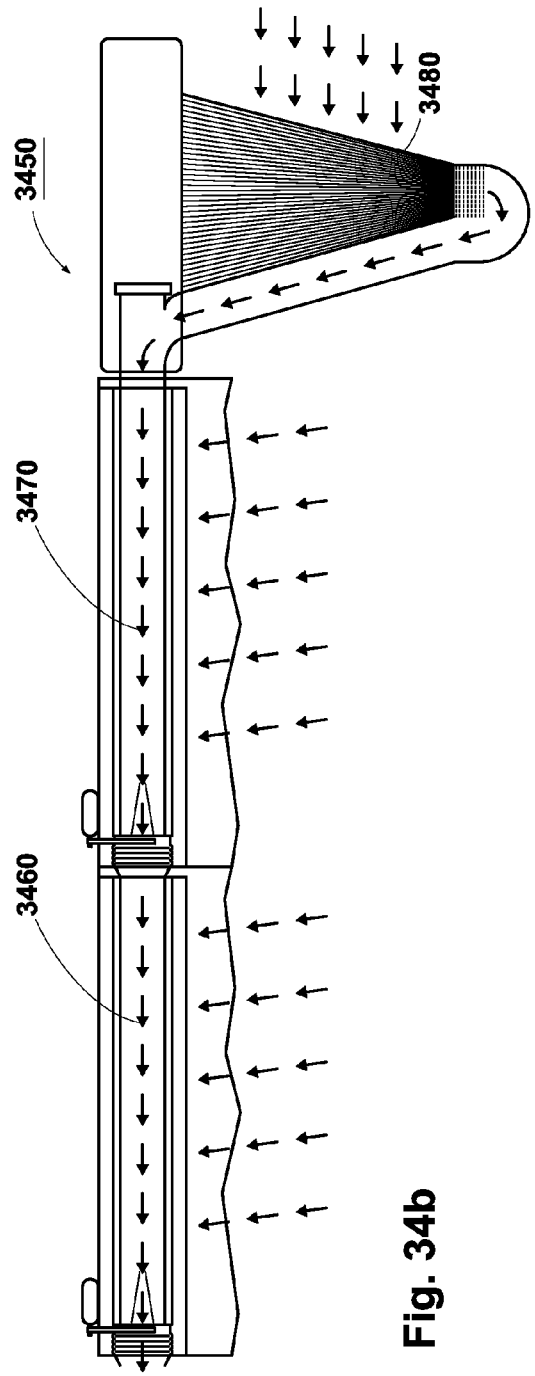
Fig. 34a
Fig. 34b

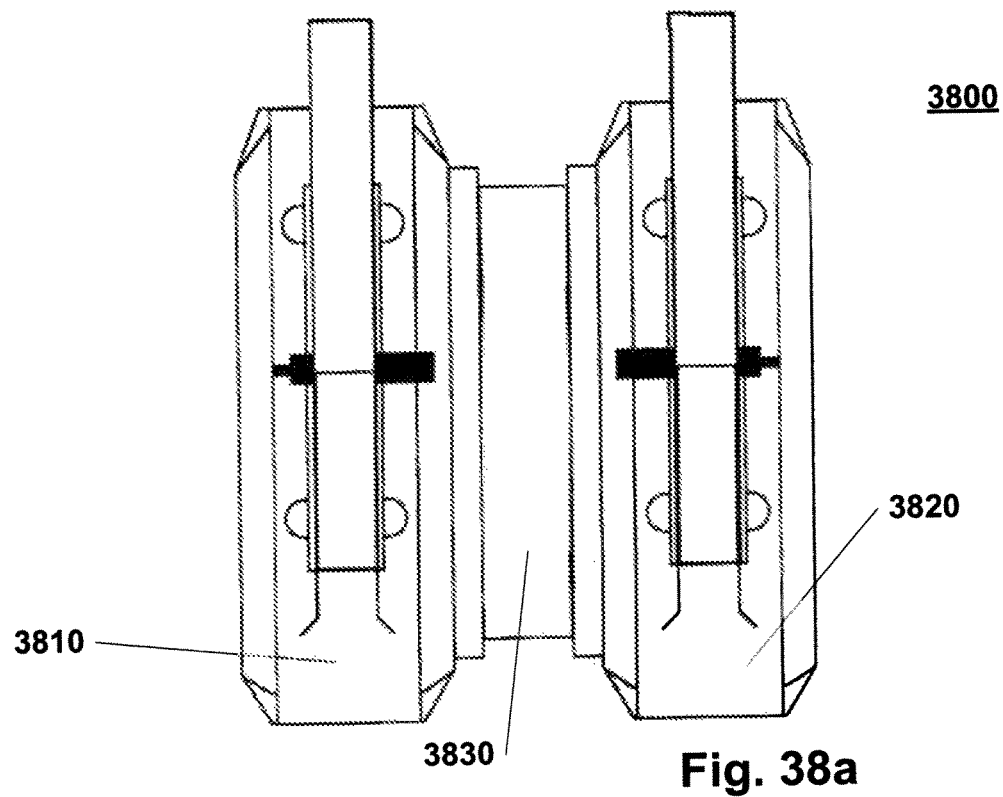
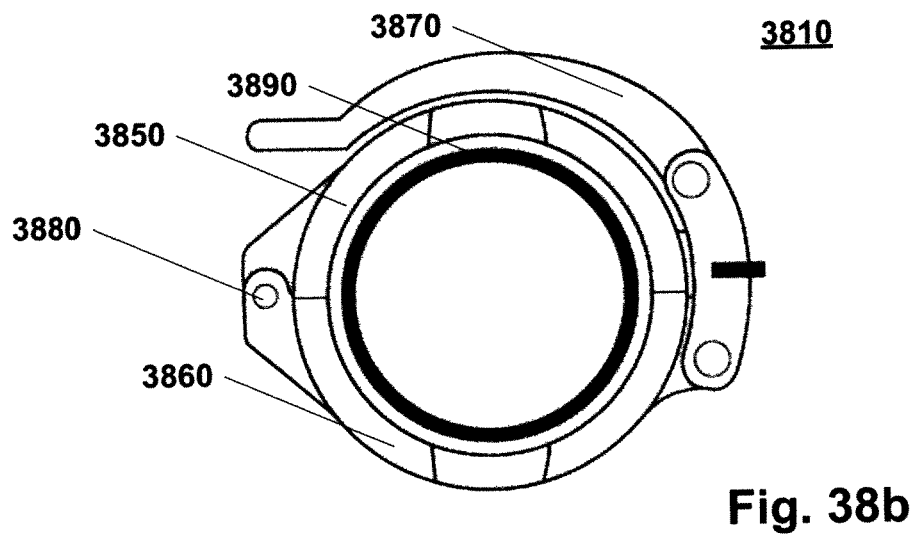

EMERGENCY EXTRACTION LINE AND MARINE PARTICLE SKIMMER

RELATED APPLICATIONS

This application is a continuation application of U.S. patent application Ser. No. 13/106,538, filed May 12, 2011, now U.S. Pat. No. 8,216,457 which claims priority under 35 U.S.C. §119 to U.S. Provisional Patent Application No. 61/334,110, entitled "Marine Particle Skimmer," filed on May 12, 2010 and U.S. Provisional Patent Application No. 61/414,080, entitled "Emergency Extraction Line and Marine Particle Skimmer," filed on Nov. 16, 2010. Each of the foregoing applications is hereby fully incorporated herein by reference.

TECHNICAL FIELD

The present invention relates generally to systems and apparatus for removing materials and contaminants from bodies of water and more specifically systems and apparatus that may be deployed in the body of water to remove materials from the water or to extract contaminated water.

BACKGROUND

Unwanted materials and spilled contaminants pose threats to bodies of water. Industrial operations, harbors, and inadvertent spills contribute pollutants to the oceans and other waterways. These materials and contaminants can harm marine life that live in the body of water and adversely affect those that use the body of water for economic pursuits or recreation. For example, debris that floats near the surface of a lake or other body of water can harm fish and marine birds that might unknowingly eat the material. The debris can foul fishing nets. Also, the debris can make the water such that it cannot be used for swimming or other water sports, or at least make such a use undesirable. Similarly, spills of liquid contaminants into the body of water, such as oil or other petroleum products or chemicals, can harm marine life that encounters the spill. The spill can adversely affect the use of the water for fishing or marine sports and can foul adjacent beaches. Certain approaches to addressing a spill include adding chemical dispersants into the water, which might break up a spill but merely dilutes, rather than cleans, the spill and adds additional chemicals to the water.

Current techniques for removing material and contaminants from bodies of water are ineffective and/or labor intensive. What is needed are systems and apparatus that can remove contaminants and material from bodies of water with minimal need for human intervention and little or no adverse impacts on the surrounding environment.

SUMMARY OF THE INVENTION

Exemplary embodiments of the present invention provide systems and apparatus that can be used to remove solid and liquid pollutants from bodies of water. In one aspect of the present invention, an apparatus is provided that includes multiple emergency extraction line components deployed in a body of water and operable to intake a liquid, each emergency extraction line component includes: (1) a body that includes a buoyant material; (1) a conduit running through the body; and (3) a liquid intake connected to the conduit; where each emergency extraction line component is connected to at least one other emergency extraction line component at the conduit for the emergency extraction line component and the conduit is connected to a pump.

In another aspect of the present invention, a system for removing contaminated water from a body of water is provided. The system includes: a pump; multiple emergency extraction line components deployed in the body of water and operable to intake the contaminated water, where each emergency extraction line component includes: (1) a body that includes a buoyant material; (1) a conduit running through the body; and (3) a liquid intake connected to the conduit; and where each emergency extraction line component is connected to at least one other emergency extraction line component at the conduit for the emergency extraction line component.

In yet another aspect of the present invention, an apparatus for removing contaminated water from a body of water is provided. The apparatus includes: a first emergency extraction line component and a second emergency extraction line component, each emergency extraction line component deployed in the body of water and operable to intake the contaminated water. Each emergency extraction line component includes: (1) a body that includes a buoyant material; (2) a first conduit running through the body and operably connected to a first pump; (3) a second conduit running through the body and connected to first conduit and operably connected to a second pump, wherein the connection allows contaminated water to flow between the first conduit and the second conduit; (4) multiple liquid intakes connected to the first conduit such that the contaminated water is pulled into the first conduit; wherein the first emergency extraction line component is connected to the second emergency extraction line component at the first conduit and second conduit by flexible connectors.

BRIEF DESCRIPTION OF THE DRAWINGS

FIG. 4a shows a close up of a side screen and louver elements for a marine particle skimmer in "harvest" mode in accordance with an exemplary embodiment of the present invention.

FIG. 4b shows a close up of a side screen and louver elements for a marine particle skimmer in "collection" mode in accordance with an exemplary embodiment of the present invention.

FIG. 4c shows a close up of a louver element of a marine particle skimmer in accordance with an exemplary embodiment of the present invention.

FIG. 20a shows an emergency extraction line component with an extendable extractor in accordance with an exemplary embodiment of the present invention.

FIG. 20b shows an emergency extraction line component with the extendable extractor in extended configuration in accordance with an exemplary embodiment of the present invention.

FIG. 29a shows a system for an alternative emergency extraction line in accordance with an exemplary embodiment of the present invention.

FIG. 29b shows a close-up of a section of the alternative emergency extraction line in FIG. 29a.

FIG. 30 shows a close-up of a screw auger of the alternative emergency extraction line in FIG. 29a.

FIG. 31a shows an alternative emergency extraction line component in accordance with an exemplary embodiment of the present invention.

FIG. 31b shows a cut-away of the alternative emergency extraction line component in FIG. 31a.

FIG. 34a shows a side view of two connected emergency extraction line components and a marine particle skimmer in accordance with an exemplary embodiment of the present invention.

FIG. 34b shows a side view of two connected emergency extraction line components and an alternative marine particle skimmer in accordance with an exemplary embodiment of the present invention.

FIG. 38a shows side view of a connector system used to connect multiple emergency extraction line components or multiple marine particle skimmers in accordance with an exemplary embodiment of the present invention.

FIG. 38b shows side view of a hinge lock component of the connector system of FIG. 38a.

FIG. 39b shows side view of alternative connectors of the connector system of FIG. 39a.

DETAILED DESCRIPTION OF EXEMPLARY EMBODIMENTS

The exemplary embodiments of the present invention provide systems and apparatus that can be used to remove solid and liquid pollutants from bodies of water. Aspects of the invention employ emergency line extraction components to remove pollutants. These components may uptake contaminated water and transport it for treatment. These components may also generate currents that move contaminants to a treatment location. Other aspects of the invention include the removal of solid pollutants. These components typically operate with little or no human intervention and minimal negative environmental impacts.

Figure 1:
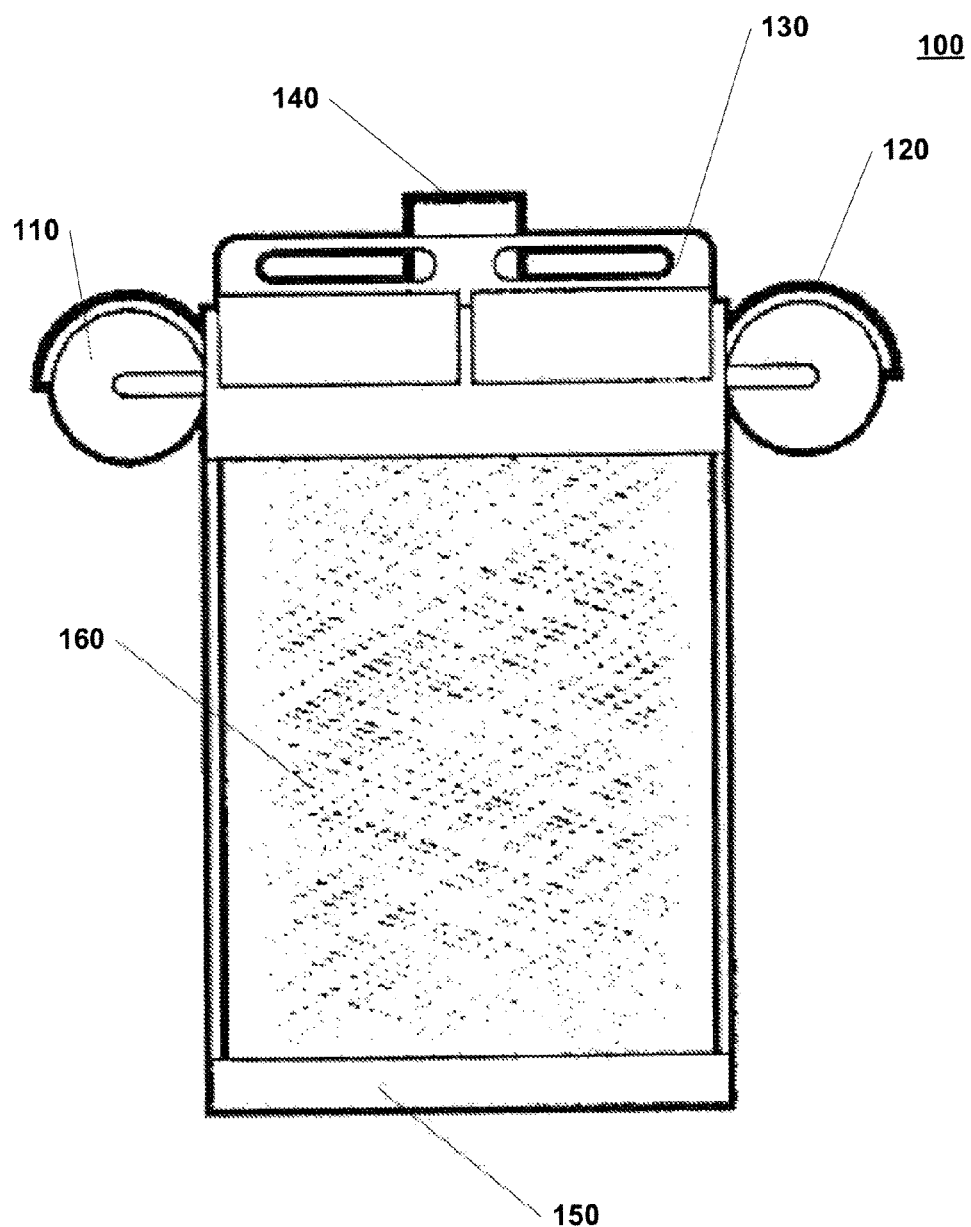
FIG. 1 shows in side view a marine particle skimmer in accordance with an exemplary embodiment of the present invention.

FIG. 1 shows in side view a marine particle skimmer 100 in accordance with an exemplary embodiment of the present invention. Referring to FIG. 1, the marine particle skimmer 100 includes a buoyant ring 110. The buoyant ring 110 provides buoyancy to the marine particle skimmer 100 on all four sides. The buoyant ring 110 may include internals used by the marine particle skimmer 100. These internals may include a GPS unit that can determine and transmit the position of the marine particle skimmer 100, a computer unit, and a battery. The buoyant ring 110 protects these internals from the water and adverse effects of weather. The buoyant ring 110 allows the marine particle skimmer 100 to float on the water surface, with the majority of the marine particle skimmer 100 submerged just beneath the surface. The buoyant ring 110 includes a cover 120. The cover 120 protects the buoyant ring. The cover may also include solar panels used to power the marine particle skimmer 100. The marine particle skimmer 100 also includes a lifting rig 130. The lifting rig 130 allows for the placement of the marine particle skimmer 100. For example, the marine particle skimmer 100 may be placed into the water by a ship, where the ship includes a line attached to the lifting rig 130. The line could then lower or retrieve the marine particle skimmer 100. The marine particle skimmer 100 also includes a flush port 140. The flush port 140 is used to remove collected pollutants from the marine particle skimmer 100. The operation of the collection process is described in greater detail below, in connection with FIG. 3b.

The marine particle skimmer 100 further includes a fan housing 150. The fan housing 150 houses a fan (not shown) that is used to establish a current of water through the marine particle skimmer 100 which in turn allows the marine particle skimmer 100 to remove pollutants from the water. The role of the fan in the operation of the marine particle skimmer 100 is described in greater detail in connection with FIGS. 3a and 3b, below. The marine particle skimmer 100 further includes a screen 160. The marine particle skimmer 100 of this exemplary embodiment is shaped as a rectangular solid box. This box has screens, such as screen 160 on each of the four sides of the box. The screens include a louver system that allows for removing pollutants from the water and for flushing the marine particle skimmer 100 once the unit becomes saturated with pollutants. The role of the screens in the operation of the marine particle skimmer 100 is described in greater detail in connection with FIGS. 3a, 3b, 4a, 4b, and 4c, below.

Figure 2A:
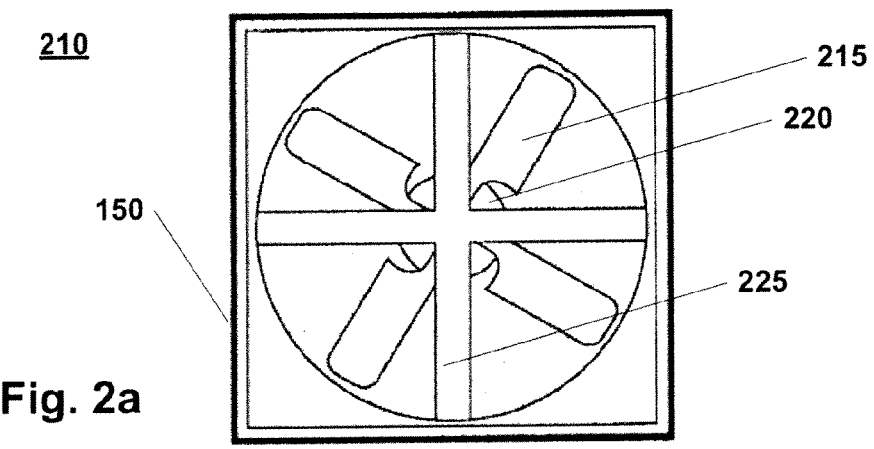
FIG. 2a shows in bottom view a fan unit for a marine particle skimmer in accordance with an exemplary embodiment of the present invention.

FIG. 2a shows in bottom view a fan unit 210 for a marine particle skimmer 100 in accordance with an exemplary embodiment of the present invention. Referring to FIGS. 1 and 2a, the fan unit 210 is housed in a fan housing 150. The fan unit 210 includes a fan 215. The depicted fan 215 includes four blades, but fans with other than four blades can be used. The fan unit 210 also includes a motor 220. The motor 220 drives the fan 215. The motor 220 derives it power from an on-board power supply, such as a battery (not shown). The battery may be charged by solar panels, such as solar panels on cover 120. Alternatively, the motor 220 may be powered from a power line connected to the marine particle skimmer 100. The fan unit 210 also includes a protective structure 225. This protective structure 225 helps to prevent marine animals from being hit by the turning fan 215. The protective structure 225 is depicted as cross members positioned in a "+" shape. Alternatively, the protective structure 225 can be a series of slats or a screen.

Figure 2B:
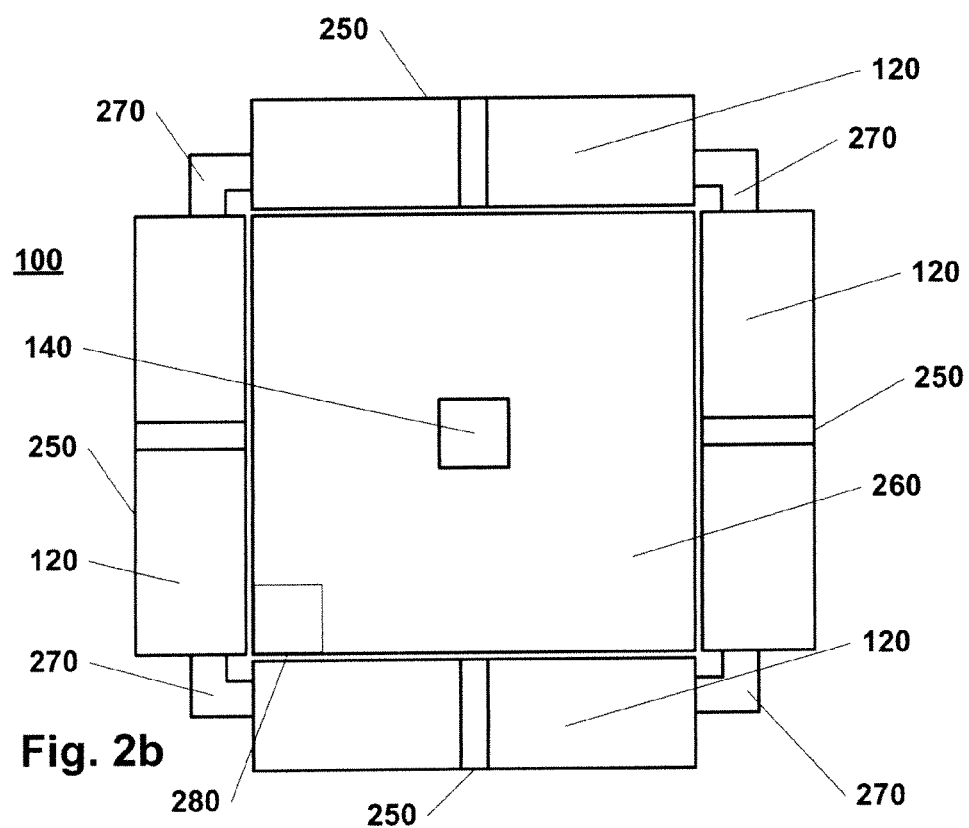
FIG. 2b shows in top view a marine particle skimmer in accordance with an exemplary embodiment of the present invention.

FIG. 2b shows in top view a marine particle skimmer 100 in accordance with an exemplary embodiment of the present invention. Referring to FIGS. 1 and 2b, the buoyant ring 110 includes four buoyant modules 250. Each buoyant module 250 includes a cover 120. The four buoyant modules 250 are connected by connectors 270. The connectors 270 may be formed by a continuous tube that is positioned through the center of each buoyant module 250. This tube may be connected to the main body of the marine particle skimmer 100. Alternatively, the buoyant ring 110 may be connected to the main body of the marine particle skimmer 100 through the cover 120 or other connectors that attach each buoyant module 250 to the main body of the marine particle skimmer 100. Each buoyant module 250 is made of a buoyant material, such as smart foam. This material may be encased in plastic or metal, such as stainless steel. Alternatively, air may be used as the buoyant material.

The marine particle skimmer 100 includes a top deck 260, made from a water and weather resistant material, such as plastic or stainless steel. Typical plastic materials to be used would include lexan. Alternatively, metal structures could be coated in a mixture of polyurea and polyurethane, such as that used in RHINO LINER products. The top deck 260 may include solar panels used to power the marine particle skimmer 100. As discussed above in connection with FIG. 1, the control internals may be housed in the buoyant ring 100. A cut-away of a buoyant module 250 shows the control internals 280. Alternatively, the top deck 260 may cover the internals.

Figure 3A:
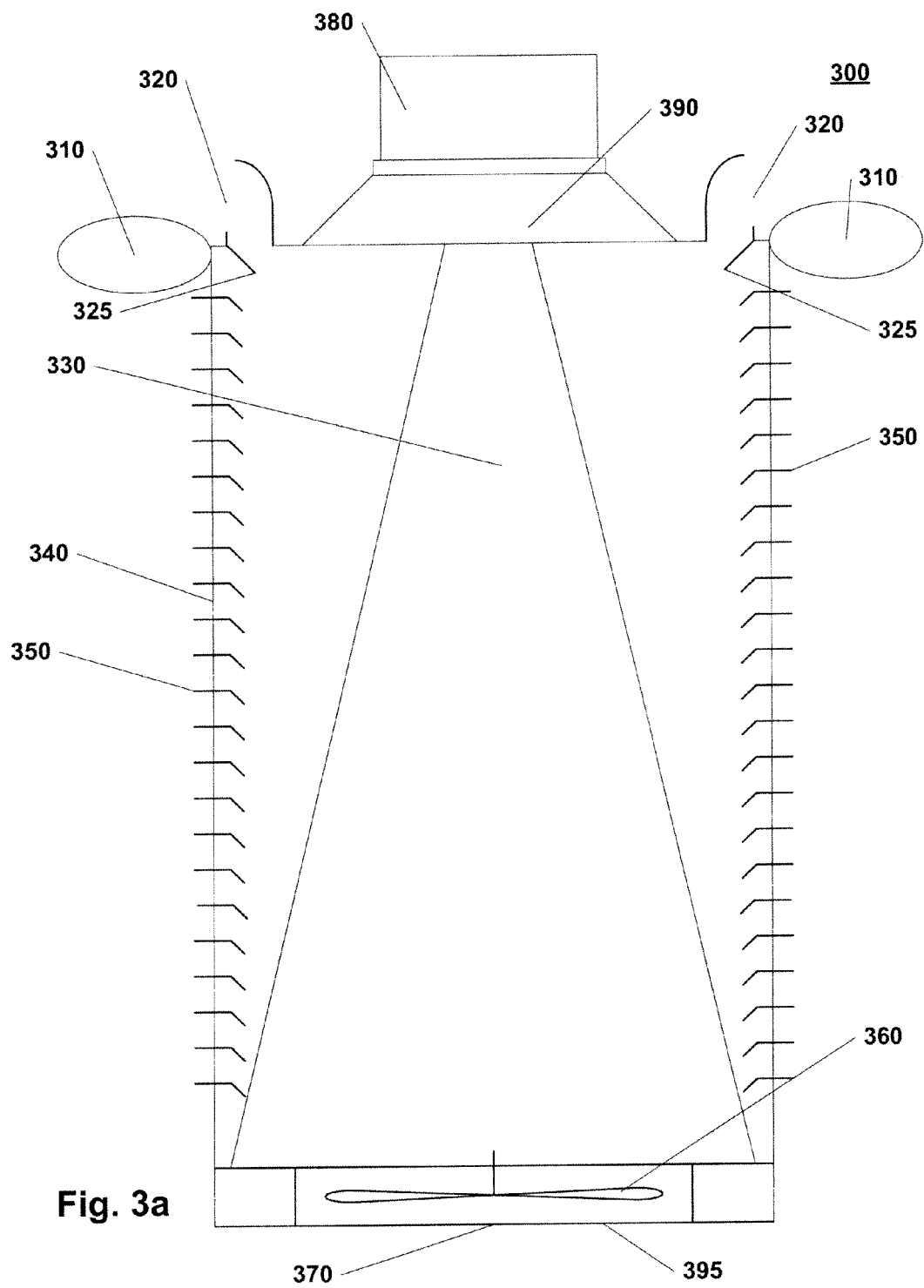
FIG. 3a shows in side view a marine particle skimmer in "harvest" mode in accordance with an exemplary embodiment of the present invention.

FIG. 3a shows in side view a marine particle skimmer 300 in "harvest" mode in accordance with an exemplary embodiment of the present invention. Referring to FIG. 3a, a buoyant ring 310 allows the marine particle skimmer 300 to float on the water surface, with the majority of the marine particle skimmer 300 submerged. In contrast to the buoyant ring 110 (FIG. 1), the buoyant ring 310 has an oval cross-section. Alternatively, the buoyant ring 310 (and buoyant ring 110) can have a variety of cross-sectional shapes, such as circular, oval, square, rectangular, or other shape. In the exemplary marine particle skimmer 300, the buoyant ring 310 has an oval cross-section to facilitate the drawing in of surface water into openings 320. In this way, solid pollutants floating on the water surface can be captured. The openings 320 are optional.

The operation of the marine particle skimmer 300 in "harvest" mode is now described. A fan 360 is shown in a cut-away view of a fan housing 370. The fan 360 rotates to push water out the bottom 395 of the marine particle skimmer 300. This movement of water causes the louvers 350 to open. The role of the louvers in the operation of the marine particle skimmer 100 is described in greater detail in connection with FIGS. 4a, 4b, and 4c, below. With the louvers 350 in an open position, water can flow through the screen 340 and impact the filter 330. Water is pulled through the conical-shaped filter 330 and out the bottom 395. Solid pollutants are retained on the filter 330. The size of the material that is collected by the filter 330 will depend on the size of the opening in the screen 340 and the pore size of the filter 330. Typically, the filter 330 would be sized to allow plankton and other small marine life through the filter 330 but cause larger particles of debris to be collected on the filter 330. The filter 330 may be made of corrosion resistant plastic or coated stainless steel. Other known filter materials capable of filtering particulate material from water may be used.

In "harvest mode," the exhaust structure 380 and funnel 390 are isolated from the rest of the marine particle skimmer 300 so that water is not pulled through the unit from the exhaust structure 380 by the fan 360. For example, the exhaust structure 380 and funnel 390 may be equipped with one or more valves that close in response to the force provided by the fan 360.

Although FIG. 3a depicts louvers on two sides, the image of FIG. 3a is a cut-a-way. Accordingly, it does not depict the louvers that would be present on the side of the marine particle skimmer 300 that is the face of the image of FIG. 3a. Typically a box-shaped marine particle skimmer would have louvers on all four sides. Alternative embodiments could have louvers on only one, two, or three sides, with solid panels replacing the side or sides without louvers.

Figure 3B:
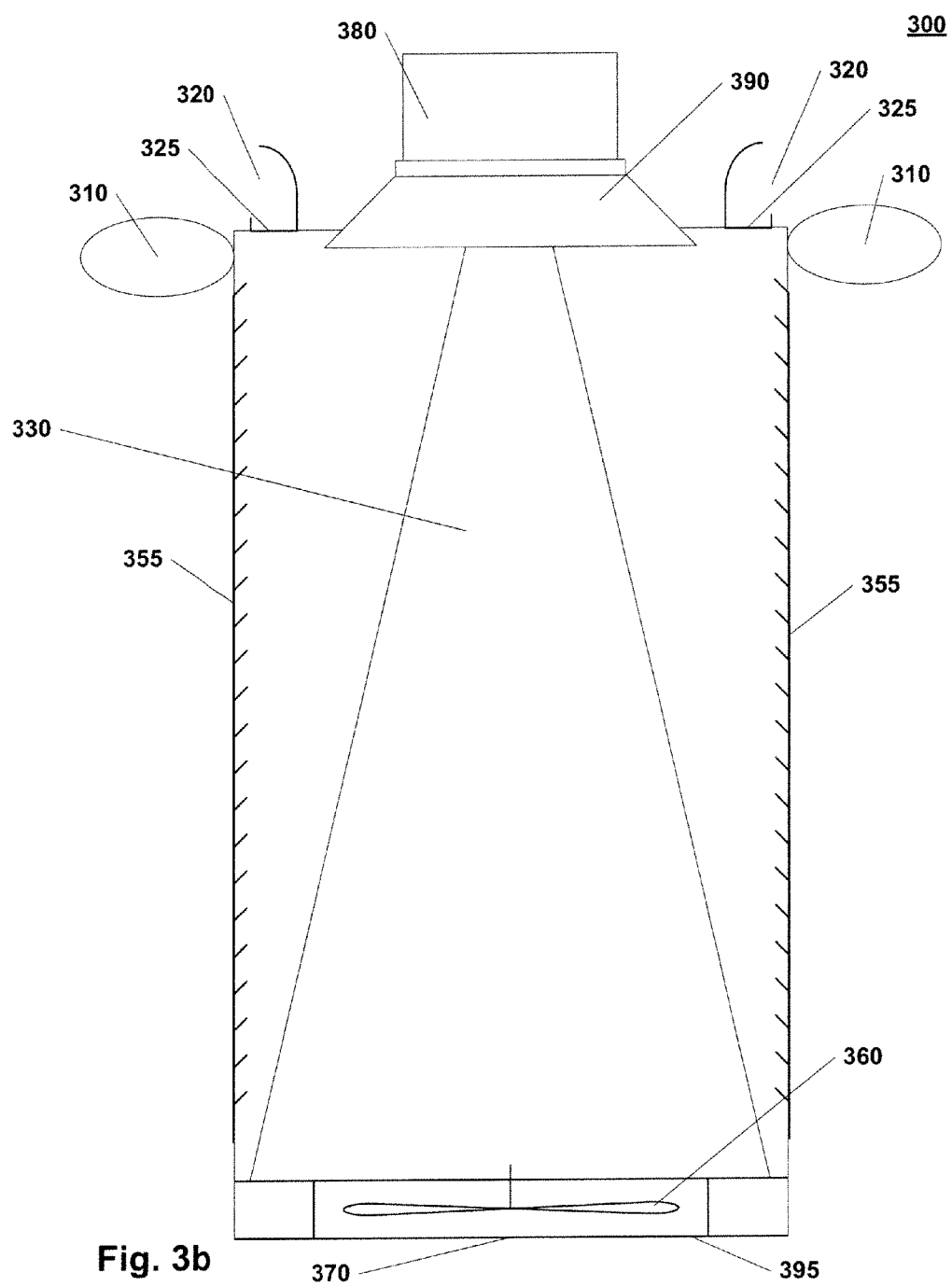
FIG. 3b shows in side view a marine particle skimmer in "collection" mode in accordance with an exemplary embodiment of the present invention.

FIG. 3b shows in side view a marine particle skimmer 300 in "collection" mode in accordance with an exemplary embodiment of the present invention. Referring to FIG. 3b, the operation of the marine particle skimmer 300 in "collection" mode is now described. The term "collection" is used here to mean the removal of pollutants from the filter 330 after the filter has become saturated with pollutants, that is, collecting the pollutants for proper disposal or recycling. For example, this "collection" operation may take place when the filter gets filled and a measured pressure gradient indicates that the flow of water is being restricted by the filter load. Alternatively, the "collection" mode can be triggered at set time periods or manually.

In collection mode, the fan 360, shown in a cut-away of the fan housing 370, rotates in a direction opposite to the direction it rotates in "harvest" mode. In this way, the fan 360 draws water up through the bottom 395 of the marine particle skimmer 300. This water movement causes the louvers 350 to rotate into a closed position. The role of the louvers in the operation of the marine particle skimmer 100 is described in greater detail in connection with FIGS. 4a, 4b, and 4c, below. In the closed position, the louvers 350 prevent the exhausting of water through the screens 340. Similarly, the hinged gates 325 are forced closed, which block the openings 320. Accordingly, water is exhausted through the funnel 390 and exhaust structure 380. A hose or other conduit (not shown) would be connected to the exhaust structure 380 to collect the material that is flushed from the filter 330. The hose or other conduit (not shown) may be continuously connected to the marine particle skimmer 300 or manually attached. The collection mode operations may be performed with the marine particle skimmer 300 in position or the marine particle skimmer 300 may be retrieved and the operation conducted adjacent to a boat or other platform that can collect the material. In many cases, the collected material will be trash that will be disposed of. In other cases, the material may include plastic or other material that can be collected and recycled.

In an alternative embodiment, the hose or other conduit (not shown) would be connected to the exhaust structure 380 to collect the material that is flushed from the filter 330 by putting the unit under suction. In this alternative embodiment, the fan 360 would not rotate but rather would be disengaged.

FIG. 4a shows a close up of a section of a side screen 450 and louver elements 405 for a marine particle skimmer in "harvest" mode in accordance with an exemplary embodiment of the present invention. Referring to FIG. 4a, a louver element includes a body portion 410 and an arm 415. The body portion 410 is connected to the screen 450 at a pivot point 420. The connection allows the body portion 410 to rotate at the pivot point 420. During the harvest mode, the current of water within the marine particle skimmer, depicted by the arrows 460 push down on the arm 415 of a louver and causes the louver to open. In the open configuration, water can pass through the screen 450 from outside the marine particle skimmer, illustrated by the arrows 430.

FIG. 4b shows a close up of a side screen and louver elements for a marine particle skimmer in "collection" mode in accordance with an exemplary embodiment of the present invention. Referring to FIG. 4b, when the current of water is reversed in the marine particle skimmer, as illustrated by the arrows 470, the water impacts on the arm 415 and causes the louver elements, such as element 405, to rotate closed. The louver element 405 rotates at the pivot point 420, causing the body portion 410 to block the opening in the screen 450. As described above in connection with FIG. 3b, the current is reversed in the marine particle skimmer by reversing the direction that the fan rotates or, alternatively, by placing the unit under suction from the top of the unit. FIG. 4c shows a close up of a louver element of a marine particle skimmer in accordance with an exemplary embodiment of the present invention.

Figure 5A:
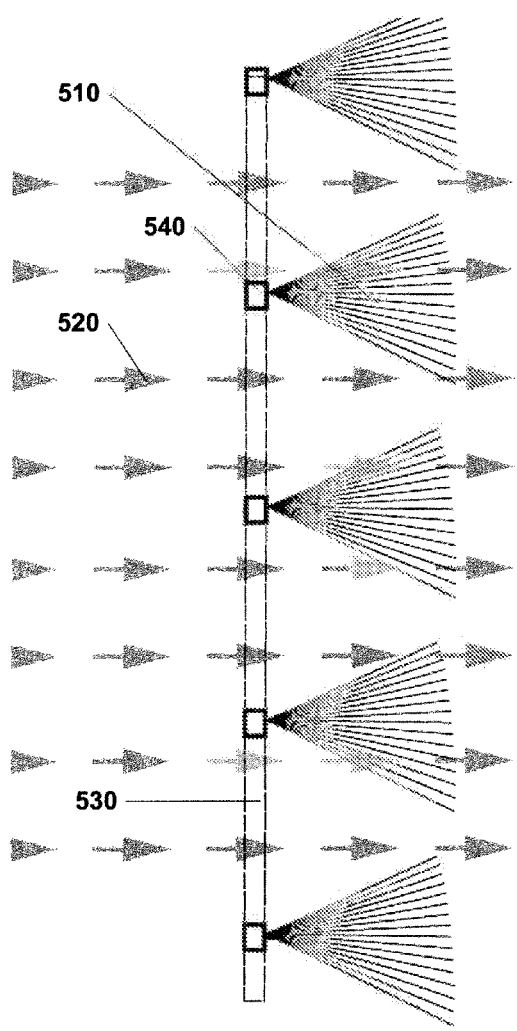
FIG. 5a shows a close up of a side screen and alternative louver elements for a marine particle skimmer in "harvest" mode in accordance with an exemplary embodiment of the present invention.

FIG. 5a shows a close up of a side screen 530 and alternative louver elements 510 for a marine particle skimmer in "harvest" mode in accordance with an exemplary embodiment of the present invention. Referring to FIG. 5a, the louver elements 510 are formed by a bristle structure. The force of the water drawn into the marine particle skimmer through the screen 530 (depicted by arrows 520) causes the louver element 510 to move away from the screen 530, opening the screen 530. In this case, the louver element 510 would pivot at pivot point 540. As an internal current would push water down in the marine particle skimmer, the pivot point 540 would prevent the louver element 510 from rotating beyond the 90-degree configuration shown in FIG. 5a.

Figure 5B:
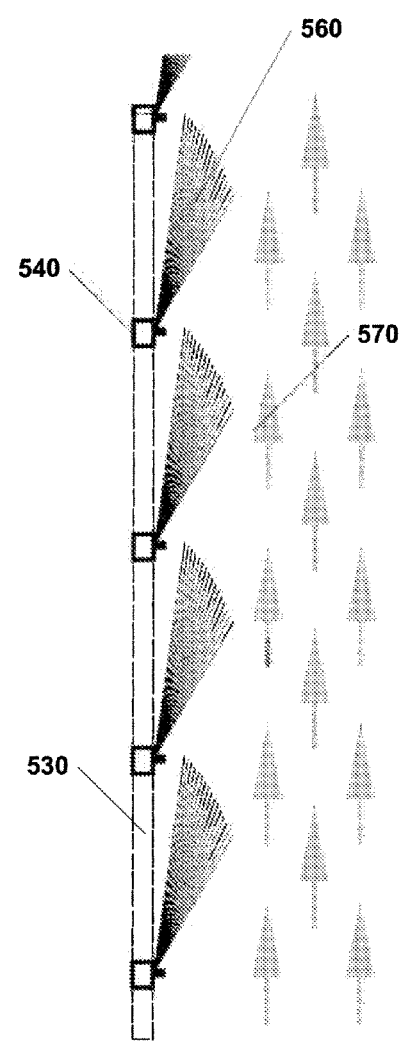
FIG. 5b shows a close up of a side screen and alternative louver elements for a marine particle skimmer in "collection" mode in accordance with an exemplary embodiment of the present invention.

FIG. 5b shows a close up of a side screen 530 and alternative louver elements 510 for a marine particle skimmer in "collection" mode in accordance with an exemplary embodiment of the present invention. Referring to FIG. 5b, the louver elements 510 are formed by a bristle structure. The force of the water drawn up from the bottom of the marine particle skimmer, depicted by arrows 570, cause the louver element 510 to be pushed towards the screen 530, blocking the openings in the screen 530. The louver element 510 pivot at pivot point 540.

Figure 6A:
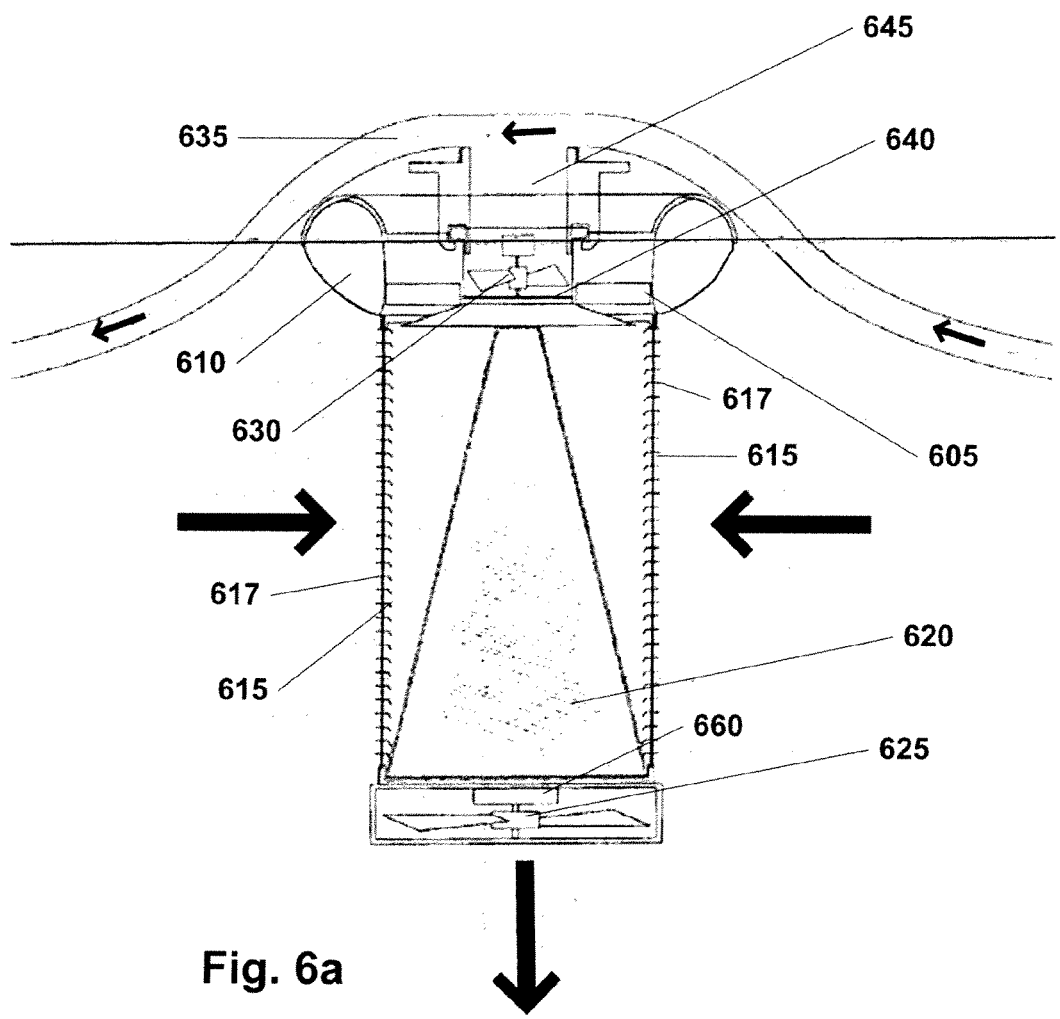
FIG. 6a shows a side view of a marine particle skimmer in "harvest" mode in accordance with an exemplary embodiment of the present invention.

FIG. 6a shows a side view of a marine particle skimmer 600 in "harvest" mode in accordance with an exemplary embodiment of the present invention. Referring to FIG. 6a, an alternative box-shaped marine particle skimmer 600 is provided. The marine particle skimmer 600 includes a buoyant ring 610. Screens 615 include louver elements 617. These louver elements 617 work comparably to the louver elements 350 (FIGS. 3a and 3b). In harvest mode, the fan 625 (shown in a cut away) rotates to force water out the bottom of the marine particle skimmer 600. The fan 630 does not operate. Exhaust structure 645 is isolated from the main body of the marine particle skimmer 600. Consequently, the fan 625 forces the louvers 617 to open and the fan 625 pulls water through the screens 615 and through the filter 620. Particulate material that can pass through the screen 615 but that is larger than the filter pore size is entrained on the filter 620. The filter 620 may be made of corrosion resistant plastic or coated stainless steel. Other known filter materials capable of filtering particulate material from water may be used. The black arrows indicate the movement of water through the marine particle skimmer 600. The fan 625 is powered by a motor 660 that operates through an internal power source, such as a battery. This battery may be contained within the buoyant ring 610 or under the top deck 605. The buoyant ring 610 or top deck 605 may include solar panels to charge the battery. Alternatively, the fan 625 is powered by an external power line.

Figure 6B:
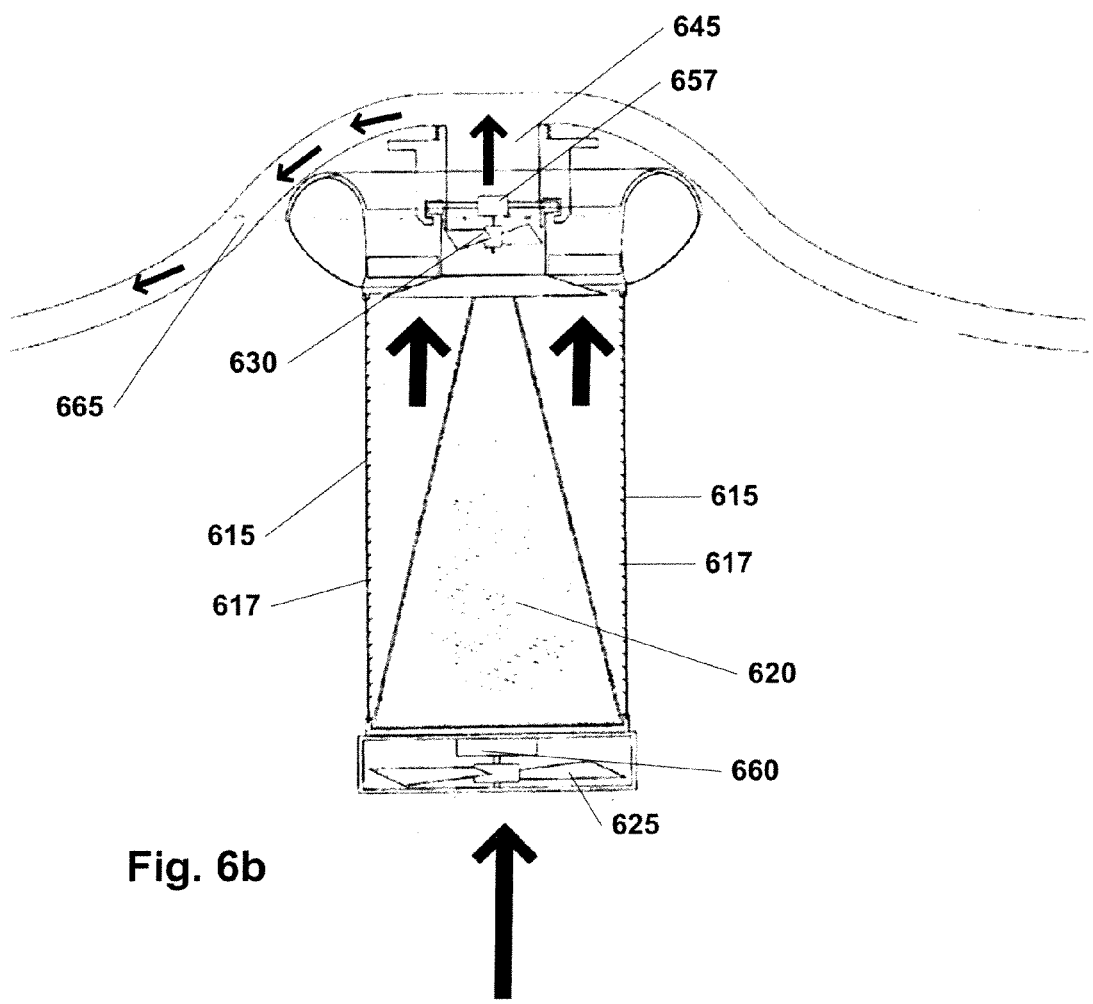
FIG. 6b shows a side view of a marine particle skimmer in "collection" mode in accordance with an exemplary embodiment of the present invention.

FIG. 6b shows a side view of a marine particle skimmer in "collection" mode in accordance with an exemplary embodiment of the present invention. Referring to FIG. 6b, the marine particle skimmer 600 is connected to a conduit 665 at the exhaust structure 645. A fan 630 is used to direct the current of water in the marine particle skimmer 600 in an upwardly direction (as depicted by the black arrows). The motor 660 that operates the fan 625 disengages, so that the fan 625 does not rotate. Alternatively, the fan 625 can operate in conjunction with fan 630. The fan 630 (and, perhaps, fan 625) moves water to the conduit 665 through the bottom of the marine particle skimmer 600, thus flushing the filter 620. This movement also causes the louver elements 617 to close, which blocks water coming in through the screens 615.

The fan 625 is powered by a motor 657 that operates through an internal power source, such as a battery. This battery may be contained within the buoyant ring 610 or under the top deck 605. The buoyant ring 610 or top deck 605 may include solar panels to charge the battery. Alternatively, the fan 625 is powered by an external power line. For example, the external power line may be part of the conduit 665. In yet another alternative, the fan 630 and motor 657 can be omitted and suction created by the conduit 665 can be used to collect the material from filter 620.

In the "collection" mode, material entrained in filter 620 of the marine particle skimmer 600 moves out the exhaust structure 645 and into the conduit 665, where it is mixed with other material from other marine particle skimmers. In this way, a system, or "farm" or marine particle skimmers can be joined and operate in a region of the body of water. Flushed material from all of the joined marine particle skimmers can be collected and managed at a single location. Depending on the number of marine particle skimmers in the "farm" and the distance between the marine particle skimmers and the central location, multiple conduits may need to be used to ensure the appropriate pressures can be maintained sufficient to draw the material to the central location.

Figure 7A:
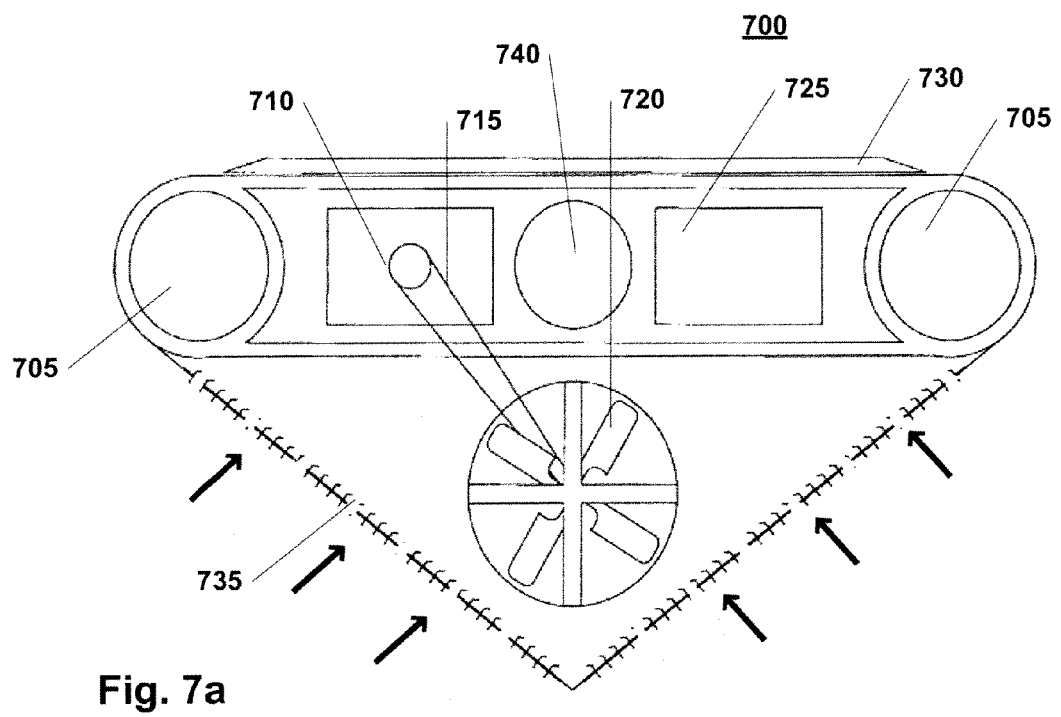
FIG. 7a shows a first side view of an alternative marine particle skimmer in accordance with an exemplary embodiment of the present invention.

FIG. 7a shows a first side view of an alternative marine particle skimmer 700 in accordance with an exemplary embodiment of the present invention. Referring to FIG. 7a, the marine particle skimmer 700 includes a fan 720, driven by a belt 715 attached to a motor 710. The motor 720 is powered by a battery 725. The battery 725 may be charged by a solar panel on the top 730. The marine particle skimmer 700 is maintained on the surface of the water, with most of its body submerged, by the buoyant ring 705. A collection conduit 740 runs through the top portion of the marine particle skimmer 700.

When the fan 720 operates, water is pulled into the lower portion of the marine particle skimmer 700 through screen 735 (as illustrated by the black arrows). The screen 735 includes louver elements comparable to the louver elements 350 and the louver elements 615. Alternatively, the screen 735 may be a mesh screen, slats, or similar structure that does not include movable louvers. The marine particle skimmer 700 does not include a filter structure. The size of the openings of the screen 735 dictates the size of material that can be drawn into the marine particle skimmer 700.

Figure 7B:
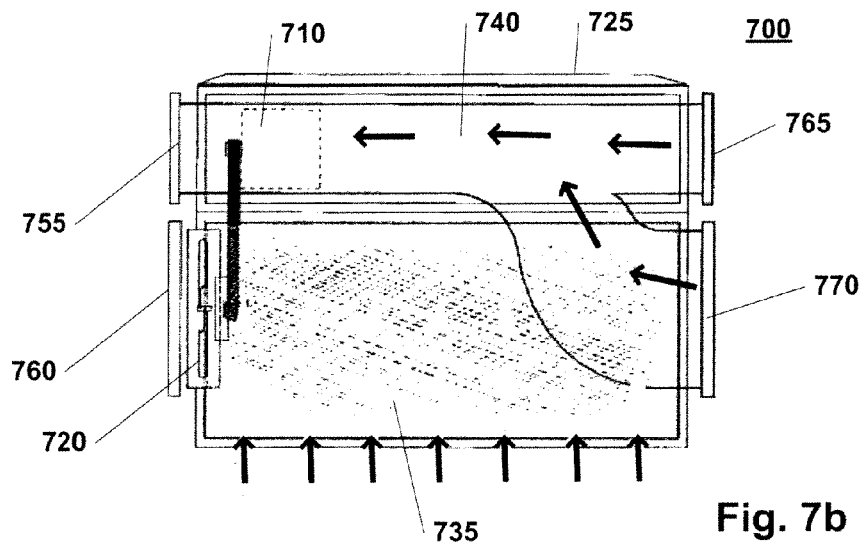
FIG. 7b shows a second side view of an alternative marine particle skimmer in accordance with an exemplary embodiment of the present invention.

FIG. 7b shows a second side view of an alternative marine particle skimmer in accordance with an exemplary embodiment of the present invention. Referring to FIG. 7b, the marine particle skimmer 700 includes a collection conduit 740 that runs through the top portion of the marine particle skimmer 700. The collection conduit 740 connects to adjacent marine particle skimmers at connection points 755, 765. The fan 720 is connected to a conduit connection point 760. The conduit connection point 760 connects to a conduit connection point 770 of a different marine particle skimmer. This tandem operation is discussed in greater detail below, in connection with FIG. 8.

Figure 8:
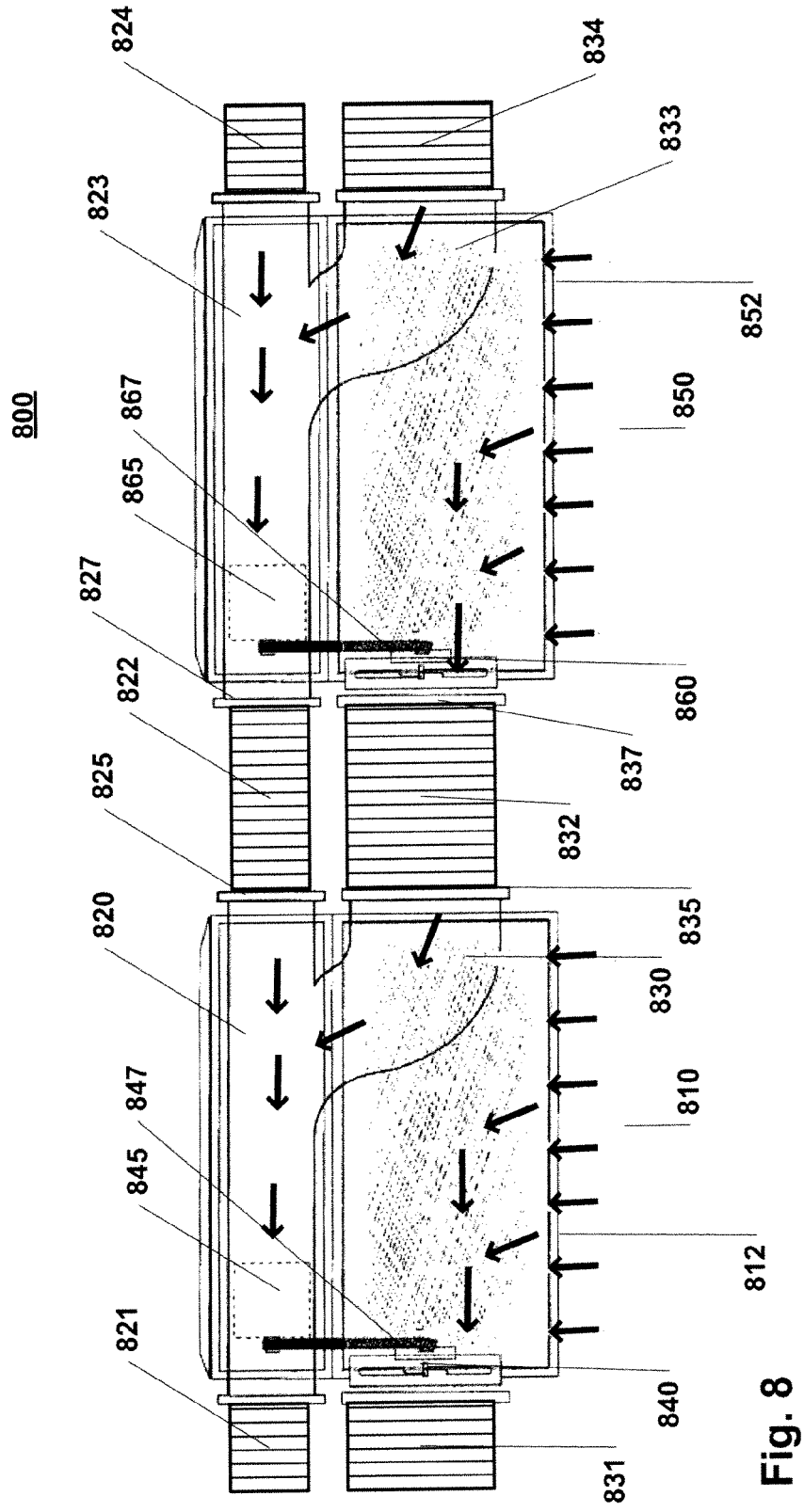
FIG. 8 shows a side view of two connected marine particle skimmers in accordance with an exemplary embodiment of the present invention.

FIG. 8 shows a side view of two connected marine particle skimmers in accordance with an exemplary embodiment of the present invention. Referring to FIG. 8, the system 800 includes two marine particle skimmers 810, 850 similar in structure to the marine particle skimmer 700 (FIGS. 7a and 7b). The marine particle skimmer 810 is connected to marine particle skimmer 850 by conduit 822 and conduit 832. Conduit 822 is connected to marine particle skimmer 810 at connection point 825 and is connected to marine particle skimmer 850 at connection point 827. Similarly, conduit 832 is connected to marine particle skimmer 810 at connection point 835 and is connected to marine particle skimmer 850 at connection point 837.

Conduit 822 carries water and pollutants and other material from conduit 823, which runs through the top portion of marine particle skimmer 850 (conduit 823 is similar to conduit 740, FIGS. 7a and 7b), to the conduit 820, which runs through the top portion of marine particle skimmer 810 (conduit 820 is similar to conduit 740, FIGS. 7a and 7b). Conduit 823 has material and water that entered the marine particle skimmer 850 through conduit 824 and through conduits 833 and 834. Conduits 824, 834 are attached to another marine particle skimmer (not shown). The movement of water and pollutants are depicted by black arrows.

The fan 860 draws water and pollutants into the marine particle skimmer 850 through screen 852. The water and pollutants are pushed through conduit 832 and conduit 830 into conduit 820. Similarly, fan 840 draws water and pollutants into the marine particle skimmer 810 through screen 812. Screen 812 is typically made from metal, such as aluminum, but other materials may be used. The screen 812 typically has 0.5-inch openings. The water and pollutants are pushed through conduit 831 and into an adjacent marine particle skimmer (not shown). In this way, each pair of marine particle skimmers in the line pushes water and pollutants into a conduit. This contaminated water is ultimately collected and the pollutants removed.

Figure 9:
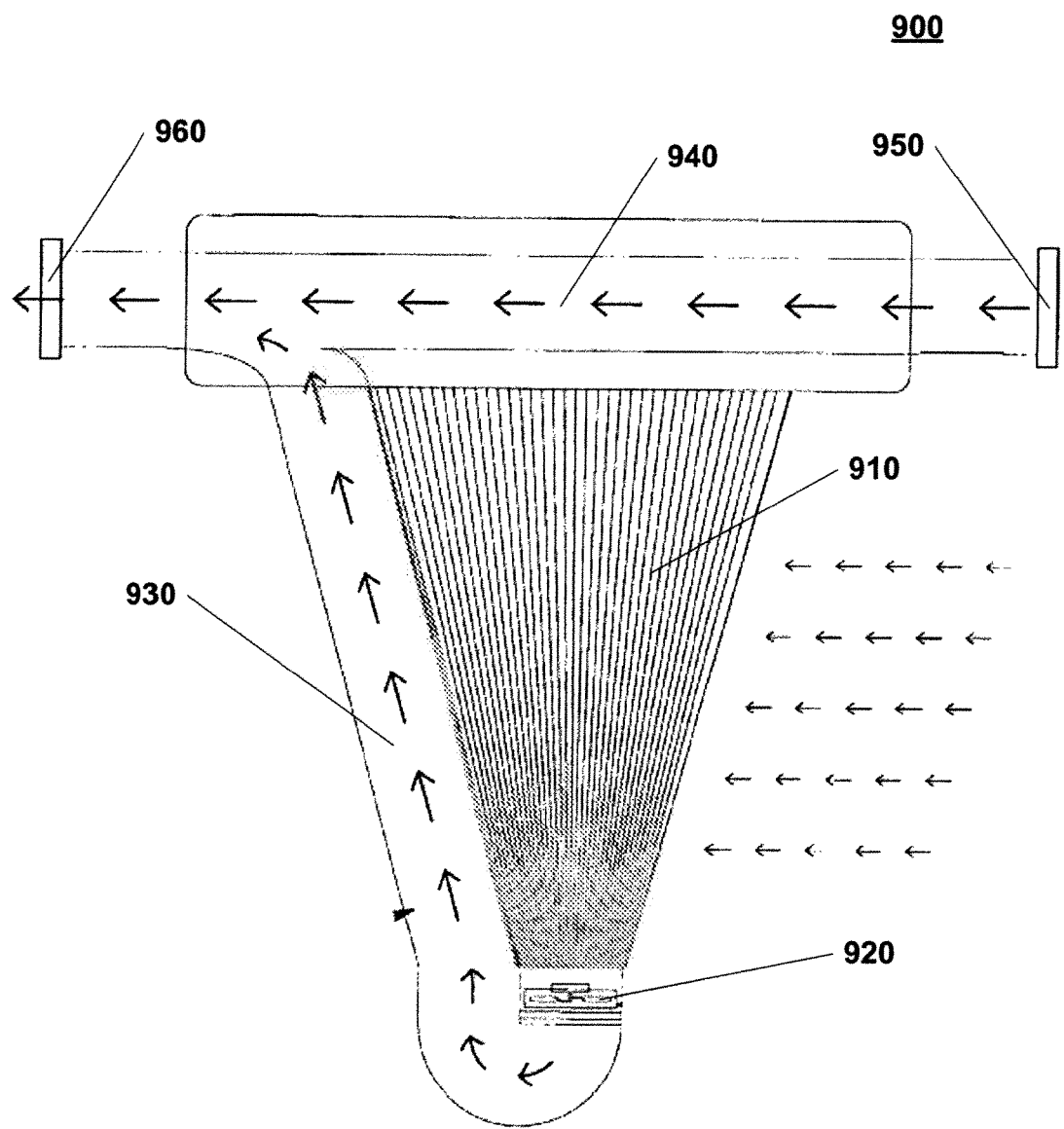
FIG. 9 shows a side view of an alternative marine particle skimmer in accordance with an exemplary embodiment of the present invention.

FIG. 9 shows a side view of an alternative marine particle skimmer 900 in accordance with an exemplary embodiment of the present invention. Referring to FIG. 9, the marine particle skimmer 900 includes a conduit 940 that can be connected to other conduits or marine particle skimmers at connection points 950, 960. Conduit 940 receives water and pollutants from other marine particle skimmers. A fan 920, which is power by an internal power source (not shown), draws water and pollutants through the screen 910 and into conduit 930. Screen 910 is typically made from metal, such as aluminum, but other materials may be used. The screen 910 typically has 0.5-inch openings. Conduit 930 joins conduit 940, such that the water and pollutants pulled in to conduit 930 by fan 920 through screen 910 is joined with the water and pollutants from other units. The marine particle skimmer 900 does not include a filter. In an alternative embodiment, the fan 920 (and other control systems such as a computer or GPS system, not shown) of the marine particle skimmer 900 is powered by an external power source, such as an external line that is run in conjunction with the conduits that connect individual marine particle skimmers.

Figure 10:
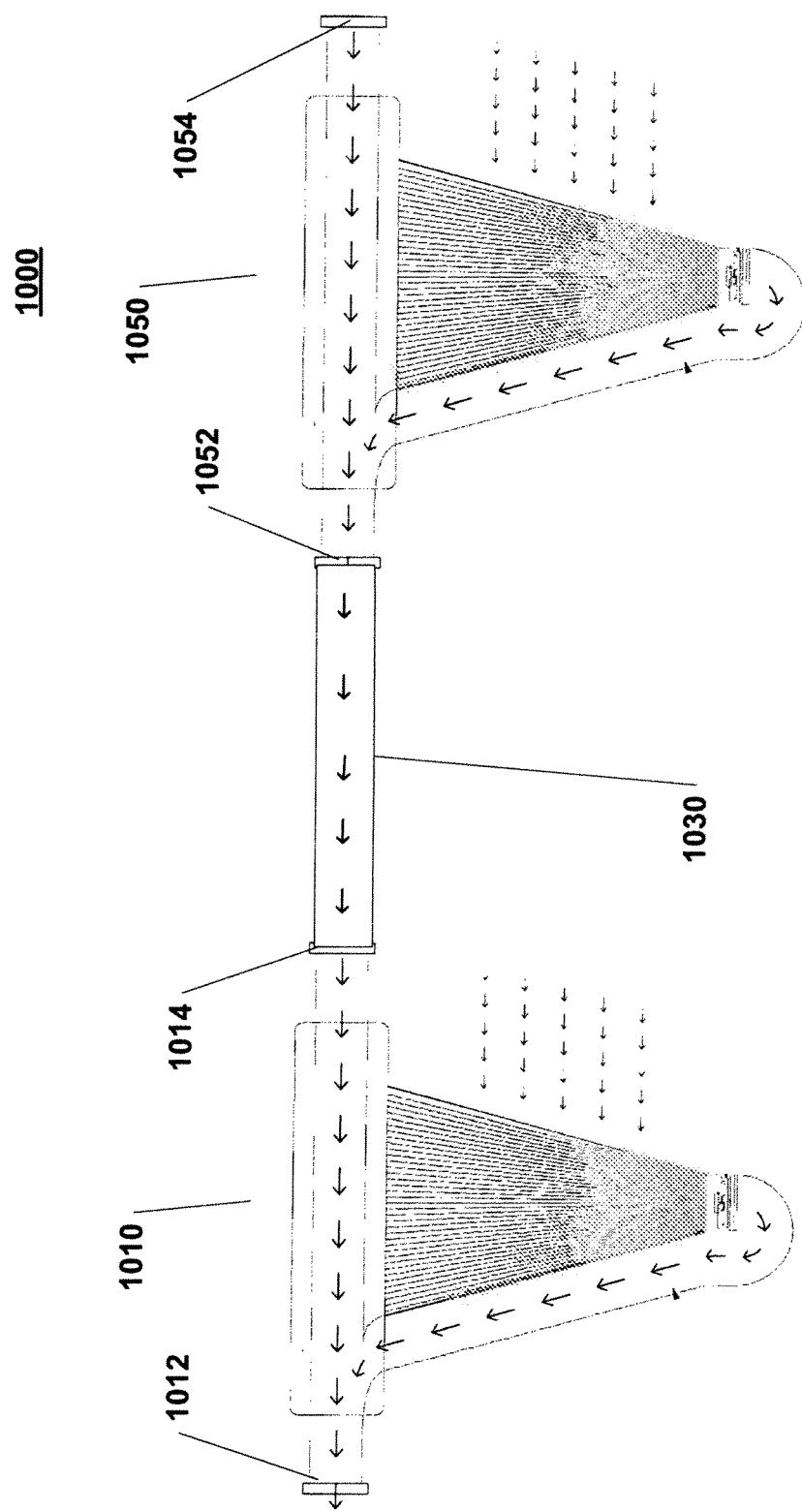
FIG. 10 shows a side view of two connected marine particle skimmers in accordance with an exemplary embodiment of the present invention.

FIG. 10 shows a side view of two connected marine particle skimmers in accordance with an exemplary embodiment of the present invention. Referring to FIG. 10, the system 1000 includes a marine particle skimmer 1010 and a marine particle skimmer 1050. The two marine particle skimmers 810, 850 are connected by a conduit 1030, which connects to marine particle skimmer 1010 at connection point 1014 and a marine particle skimmer 1050 at connection point 1052. The conduit 1030 allows water and pollutants to move from marine particle skimmer 1050 to marine particle skimmer 1010. The conduit 1030 would have a component that would allow the conduit to float on the surface of the water. The conduit 1030 is likely made of poly vinyl chloride or other plastic material. Connection points 1012 and 1054 would connect to other conduit and/or marine particles skimmers.

Figure 11:
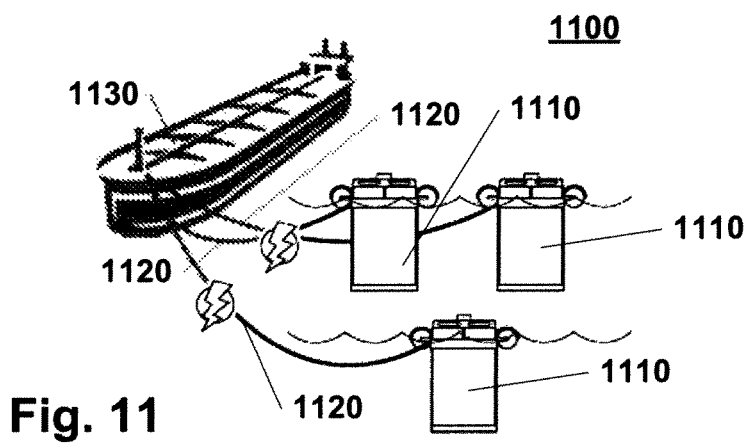
FIG. 11 shows a system of marine particle skimmers in accordance with an exemplary embodiment of the present invention.

FIG. 11 shows a system of marine particle skimmers in accordance with an exemplary embodiment of the present invention. Referring to FIG. 11, multiple marine particle skimmers 1110 are connected to a vessel 1130 by lines 1120. These lines provide external power to the marine particle skimmers 1110. Although FIG. 11 depicts each marine particle skimmers 1110 connected to the vessel 1130 by a separate line 1120, the marine particle skimmers 1110 could be connected to the boat and each other by a single line 1120. Further, although FIG. 11 depicts marine particle skimmers 1110 as the same type of marine particle skimmer, this arrangement could be used with marine particle skimmers of different types.

Figure 12:
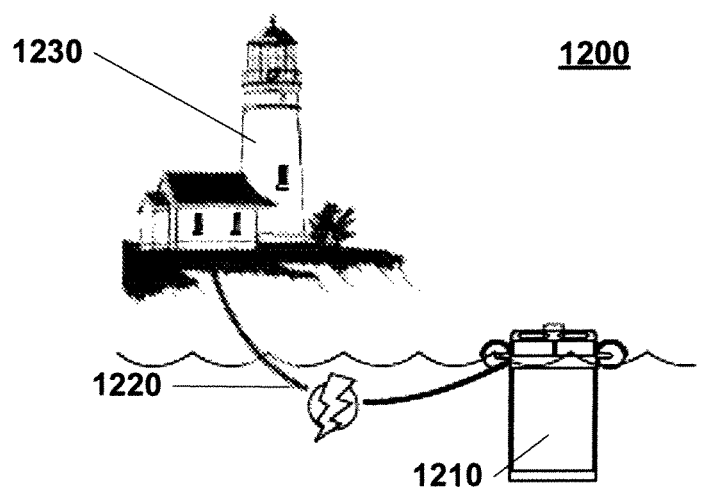
FIG. 12 shows an alternative marine particle skimmer in accordance with an exemplary embodiment of the present invention.

FIG. 12 shows an alternative marine particle skimmer in accordance with an exemplary embodiment of the present invention. Referring to FIG. 12, a marine particle skimmer 1210 is connected to a land-based structure, such as lighthouse 1230, by line 1220, which supplies power to the marine particle skimmer 1210. Although FIG. 12 depicts just one marine particle skimmer 1210, multiple marine particle skimmers 1210 could be employed in this manner, either connected to a single line 1220 or individual lines 1220.

Figure 13:
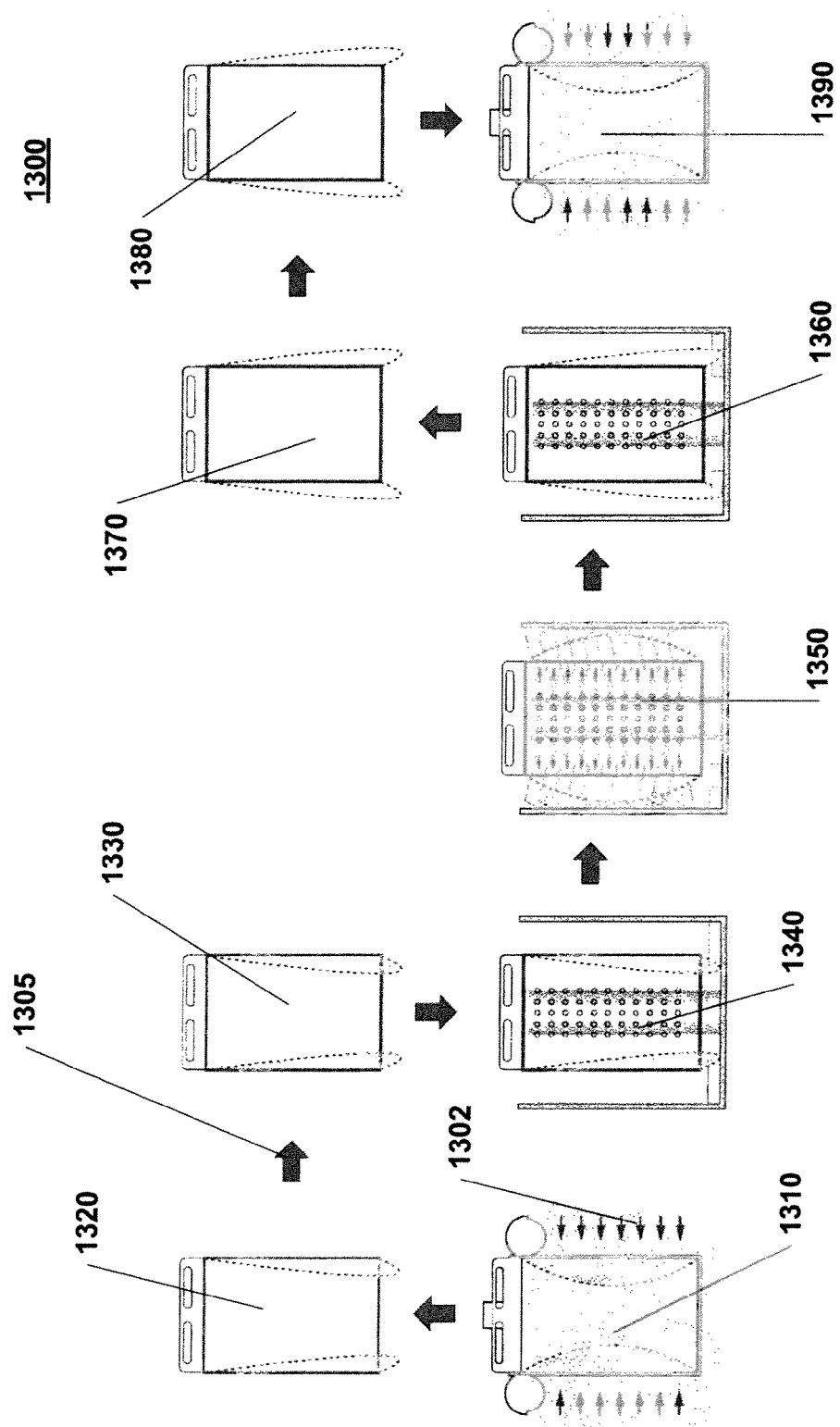
FIG. 13 shows a process for removing captured pollutants from an alternative marine particle skimmer in accordance with an exemplary embodiment of the present invention.

FIG. 13 shows a process 1300 for removing captured pollutants from an alternative marine particle skimmer in accordance with an exemplary embodiment of the present invention. Referring to FIG. 13, each depiction shows a step on the process 1300, with large arrows 1305 depicting the sequence. The starting point is a marine particle skimmer with a removable filter, but without the capability to flush the filter, such as described in connection with FIGS. 3b and 5b, above. At step 1310, a marine particle skimmer takes in water and pollutants, such that the pollutants are entrained on a removable filter. At step 1320, the filter is removed. This step may be triggered based on a measured pressure drop, indicating a full filter, or at a regular interval, or for another reason.

At step 1330, the filter is moved to the location of an extractor unit. At step 1340, the filter is positioned into the extractor unit. At step 1350, the extractor unit is operated. The unit causes air, water, or other fluid to be pushed through the filter in a direction opposite to the direction that water flows through the filter during normal operations of the filter within a marine particle skimmer. At this step, the debris collected in the filter is flushed off the filter. At step 1360, the filter is refreshed and any material extracted from the filter is collected by the extraction unit. At step 1370, the refreshed filter is removed from the extraction unit. At step 1380, the refreshed filter is moved to a marine particle skimmer. At step 1390, the filter is returned to the marine particle skimmer and the marine particle skimmer is returned to operation. Steps 1330 and 1380 include that the filter is "moved" between the marine particle skimmer and extraction unit. It may be that the marine particle skimmer and extraction unit are co-located, such that the moving is over a very short distance. For example, the marine particle skimmer may be retrieved from the water and transported to a boat or land-based facility that includes the extraction unit. The filter may then be refreshed and returned to the marine particle skimmer, which is then returned to the water.

Figure 14:
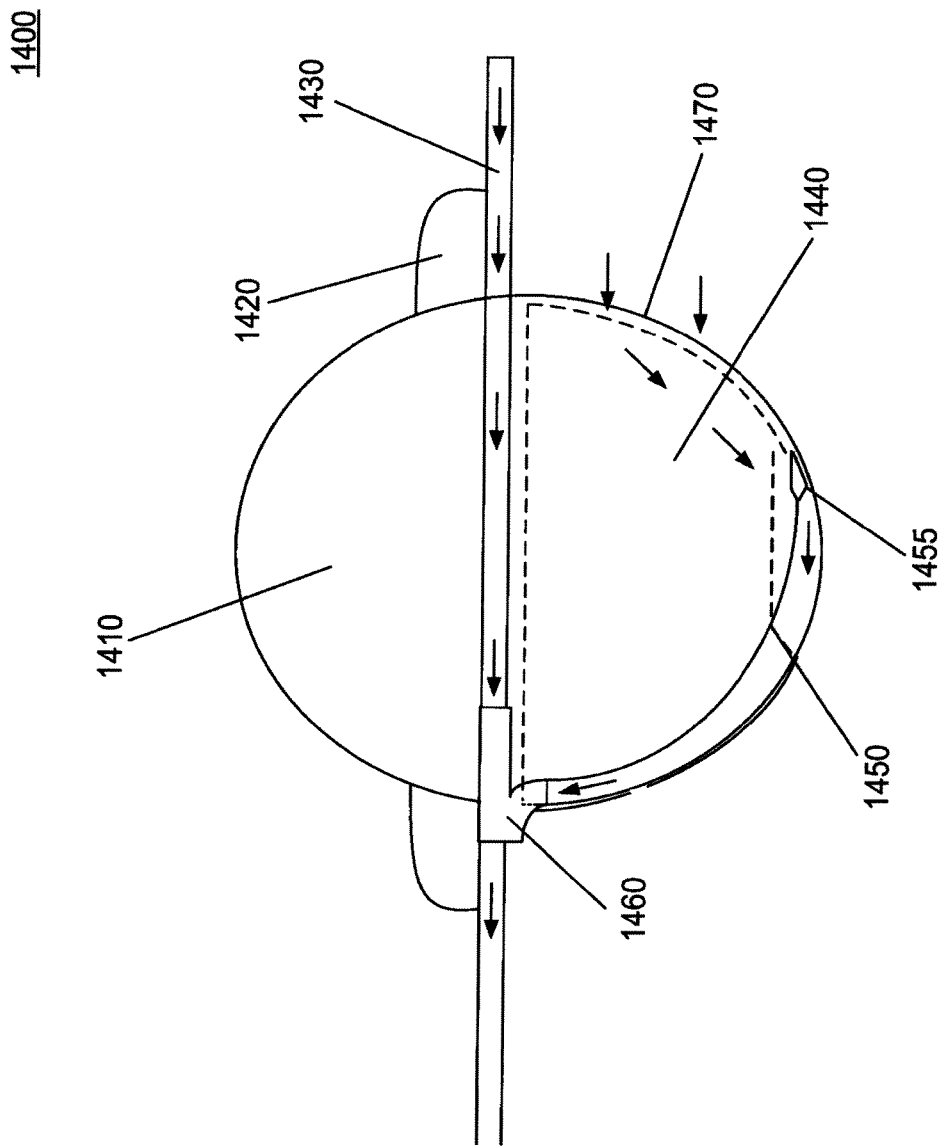
FIG. 14 shows an alternative marine particle skimmer in accordance with an exemplary embodiment of the present invention.

FIG. 14 shows an alternative marine particle skimmer 1400 in accordance with an exemplary embodiment of the present invention. Referring to FIG. 14, the marine particle skimmer 1400 includes a spherical upper portion 1410. The spherical upper portion 1410 contains buoyant material. An optional buoyant ring 1420 (showed in dashed lines) may be added to increase the buoyancy of the marine particle skimmer 1400. The marine particle skimmer 1400 has a spherical shape to better withstand rough seas, wind, and other weather effects.

The marine particle skimmer 1400 is connected to a processing facility (either vessel-based or land-based) and/or other marine particle skimmers by conduit 1430. The connection to a processing facility could also include a pump, which pulls water and pollutants through conduit 1430 (the flow of water and pollutants is illustrated by black arrows). The lower portion 1440 is submerged. It includes a screen 1470. Screen 1470 is typically made from metal, such as aluminum, but other materials may be used. Water and solid or liquid pollutants are pulled into the marine particle skimmer 1400 through screen 1470 and into conduit 1450 by pump 1455. Screen 1470 provides an opening of nearly 360 degrees, allowing the marine particle skimmer 1400 to pull in water and pollutants from all around the unit. The pump 1455 may be powered by an internal battery (not shown) or an external power line. A T-junction 1460 joins the conduit 1450 with the conduit 1430 and water and pollutants move from conduit 1450 into conduit 1430. The marine particle skimmer 1400 can be connected to other marine particle skimmers to form a system or "farm" of units. The marine particle skimmer 1400 would not include a filter.

The marine particle skimmer embodiments discussed above would be constructed using materials that could withstand the harsh environment are bodies of water, including sat water bodies and harsh weather conditions (such as extreme sun and wind). The main units would typically be constructed of plastic, such as lexan or stainless steel, such as 304 stainless steel. Alternatively, non-stainless steel metal structures coated in a mixture of polyurea and polyurethane, such as that used in RHINO LINER products, could be used. Conduits would typically be constructed of PVC or other plastic. The PVC conduit could be a reinforced compound hose, which may include polyester reinforcement commonly used for marine applications. Other components, such as louver elements, screens, and fans would typically be plastic, such as light-weight lexan, or stainless steel. Filters would typically be of the type used for swimming pool applications, such as a nylon, spun polyester, or fiberglass.

Figure 15:
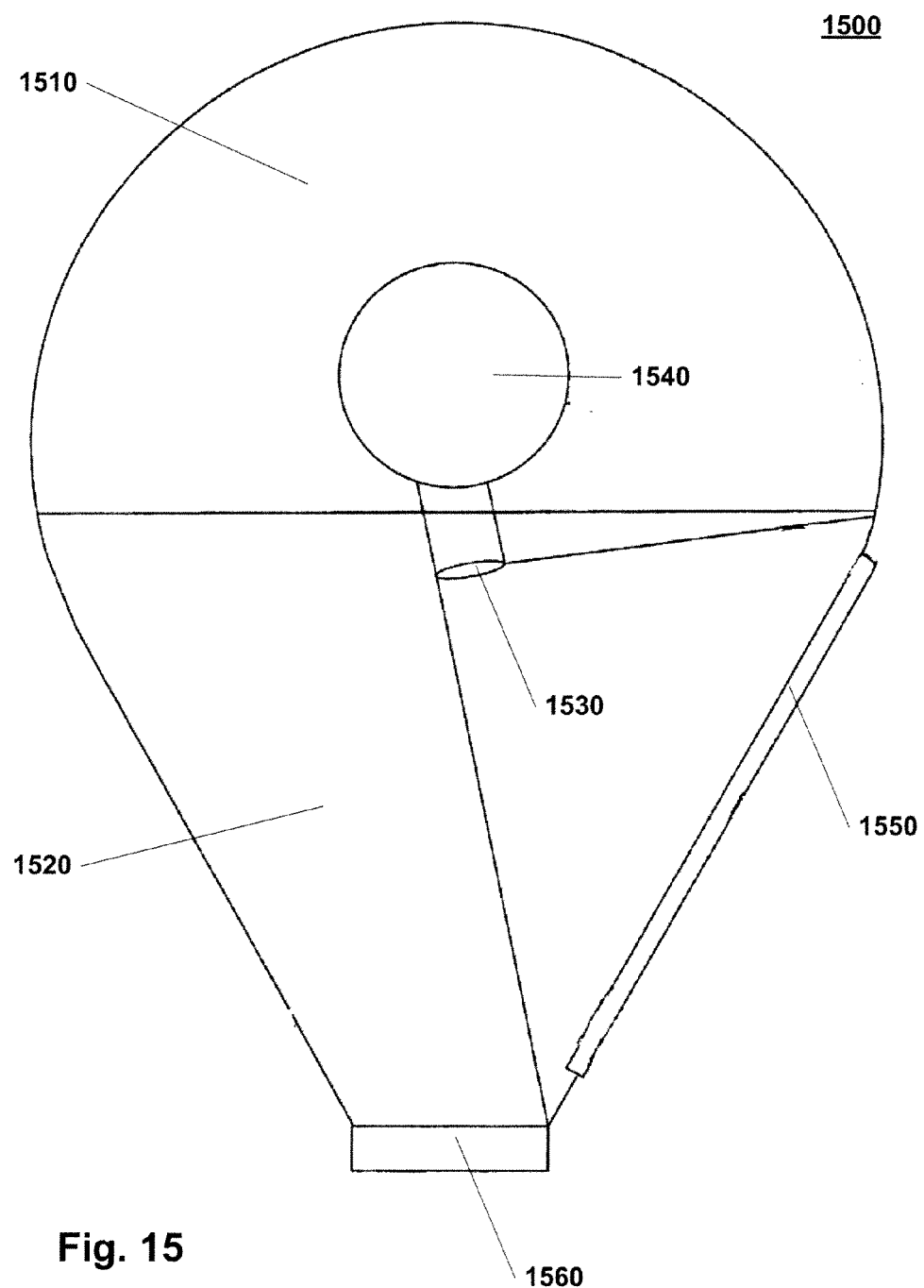
FIG. 15 shows an emergency extraction line component in accordance with an exemplary embodiment of the present invention.

FIG. 15 shows a side view of an emergency extraction line component 1500 in accordance with an exemplary embodiment of the present invention. Referring to FIG. 15, the emergency extraction line component 1500 includes a top portion 1510. The top portion 1510 would include buoyant material, such as air or "smart foam" expanding urethane frame to allow the emergency extraction line component 1500 to float on the surface of the water, with the top portion 1510 mainly above the waterline. An example of "smart foam" is manufactured by U.S. Composites, Inc. The lower portion 1520 is mainly submerged when in the water. The lower portion 1520 includes an intake 1530. The intake 1530 draws water and pollutants into the lower portion 1520 through a screen 1550 and into a conduit 1540. Screen 1550 is typically made from metal, such as aluminum, but other materials may be used. The screen 1550 typically has 0.5-inch openings. The conduit 1540 is typically connected to adjacent emergency extraction line components (not shown). FIG. 15 includes a cut away of the lower portion 1520 that shows the intake 1530. Typically, this lower portion 1520 would fill with water, which would stabilize the emergency extraction line component 1500 while it is in the water, that is, help keep the emergency extraction line component 1500 in an upright position.

A ship-based or land-based processing facility (not shown) would include a pump attached to the conduit 1540 that pulls the water and pollutants to the processing facility. This pumping action creates suction at the intake 1530 that causes the water and pollutants to be drawn into the lower portion 1520 through a screen 1550. The emergency extraction line component 1500 also includes a ballast 1560, which adds weight to the bottom of the emergency extraction line component 1500 and also helps to keep the emergency extraction line component 1500 properly oriented in the water.

An emergency extraction line component has many of the qualities of a marine particle skimmer. Typically, an emergency extraction line component is used for liquid-type water-borne pollutants, such as from oil or other chemical spills. In contrast, a marine particle skimmer targets solid pollutants and, in some configurations, also (or solely) liquid pollutants. Also, an emergency extraction line component is typically connected to multiple emergency extraction line components in close proximity, forming a "line" for treating the water-borne pollutant. In contrast, marine particle skimmers would typically be deployed in a "farm" or grid.

Figure 16:
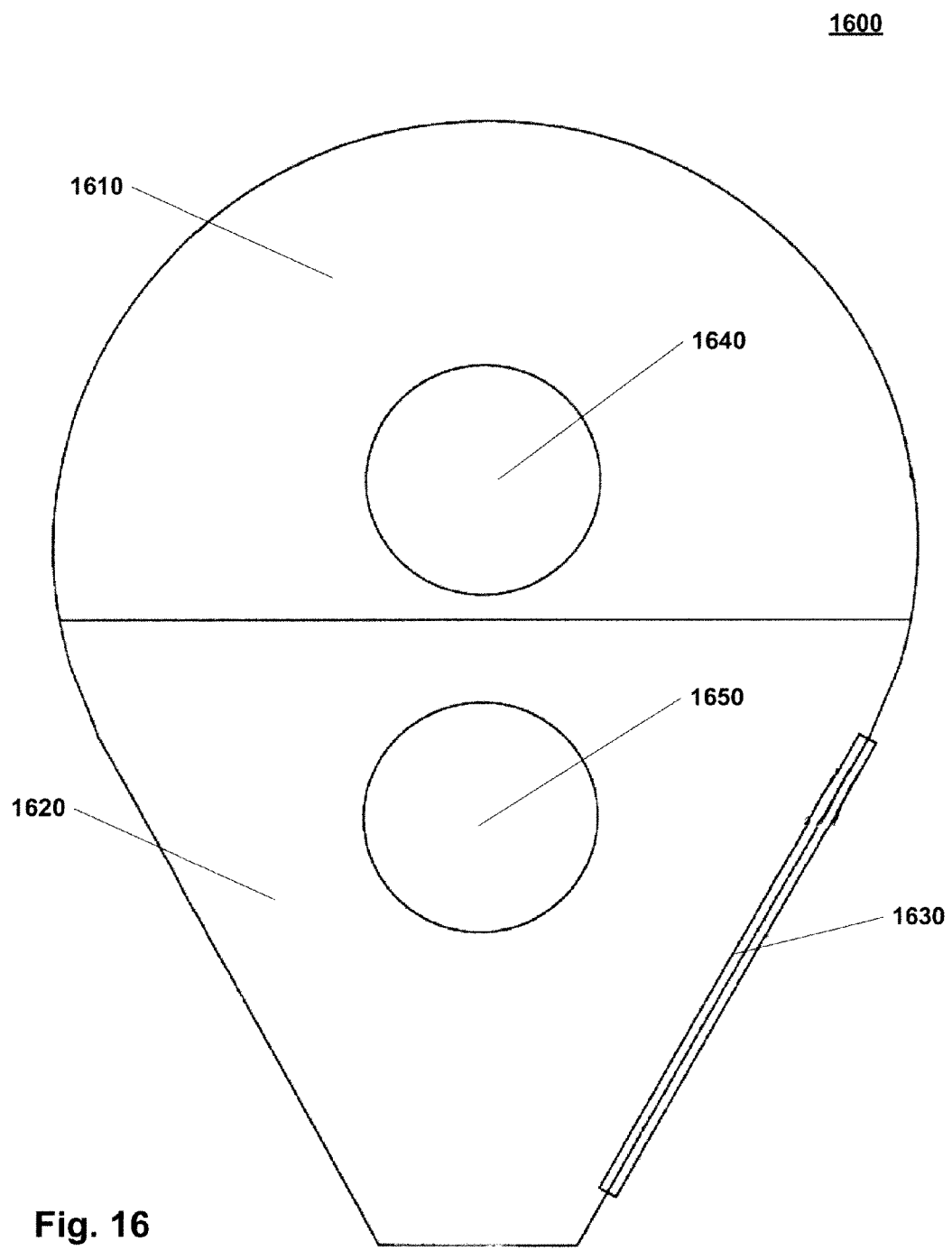
FIG. 16 shows an emergency extraction line component in accordance with an exemplary embodiment of the present invention.

FIG. 16 shows a side view of an emergency extraction line component 1600 in accordance with an exemplary embodiment of the present invention. Referring to FIG. 16, the emergency extraction line component 1600 includes a top portion 1610. The top portion 1610 would include buoyant material, such as air or "smart foam" expanding urethane foam such as that manufactured by U.S. Composites, Inc. to allow the emergency extraction line component 1600 to float on the surface of the water, with the top portion 1610 mainly above the waterline. The lower portion 1620 is mainly submerged when in the water. The lower portion 1620 includes an intake (not shown). The intake (not shown) draws water and pollutants into the lower portion 1620 through a screen 1630 and into a conduit 1640 or a conduit 1650. Screen 1630 is typically made from metal, such as aluminum, but other materials may be used. The screen 1630 typically has 0.5-inch openings. The conduits 1640, 1650 are typically connected to adjacent emergency extraction line components (not shown).

A vessel-based or land-based processing facility (not shown) would include a pump attached to the conduits 1640, 1650 that pulls the water and pollutants to the processing facility. This pumping action creates suction at the intake (not shown) that causes the water and pollutants to be drawn into the lower portion 1620 through a screen 1630. The emergency extraction line component 1600 includes two conduits running through it (conduits 1640, 1650). One of the conduits would receive water and pollutants from emergency extraction line component 1600 while the other would pass through the emergency extraction line component 1600 to service adjacent emergency extraction line components. In that way, one pump would not be required to service every emergency extraction line component in a line. In this case, two separate pumps could service a line.

Figure 17:
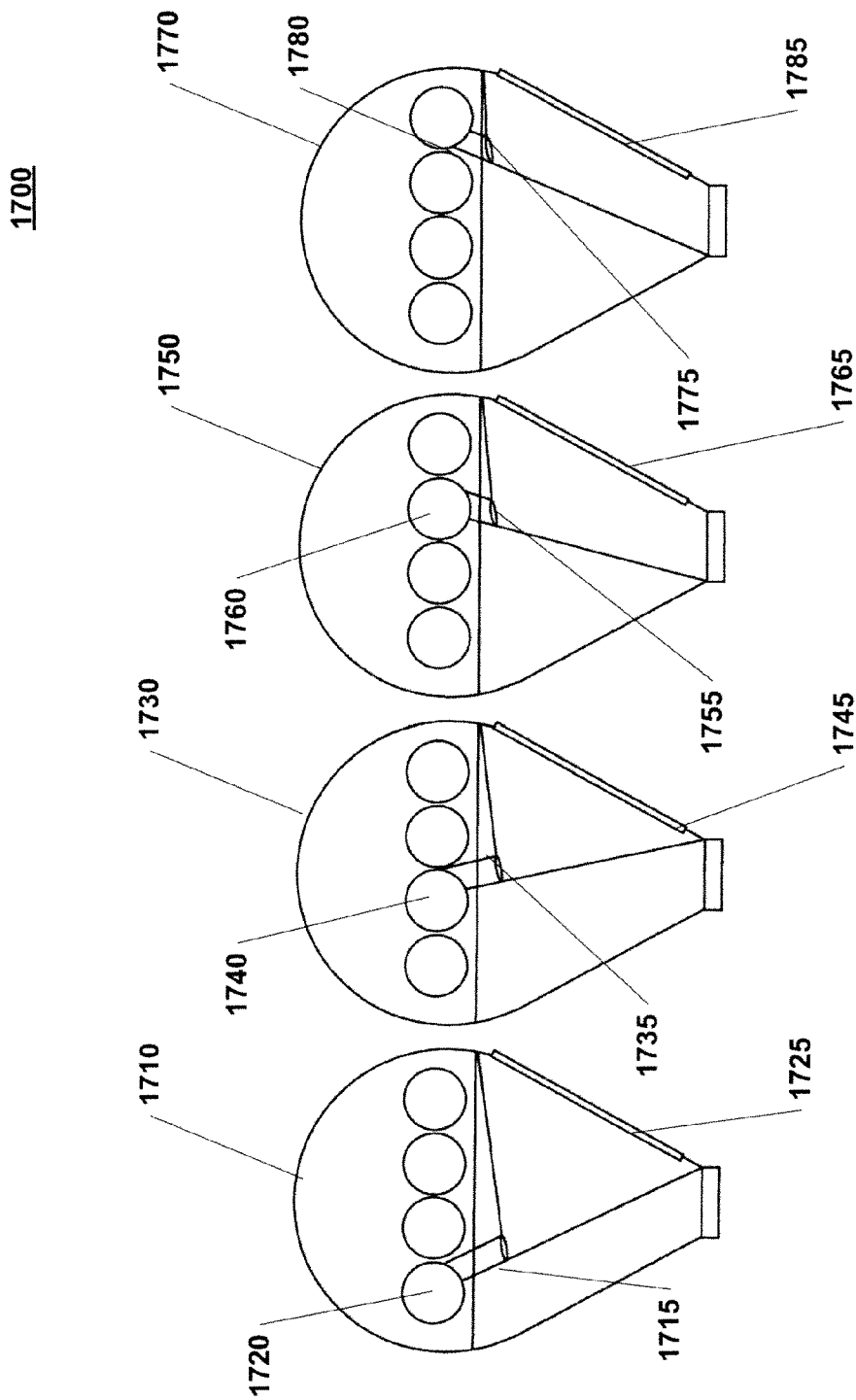
FIG. 17 shows multiple emergency extraction line components in accordance with an exemplary embodiment of the present invention.

FIG. 17 shows multiple emergency extraction line components 1710, 1730, 1750, 1770 in accordance with an exemplary embodiment of the present invention. Referring to FIGS. 15-17, the multiple emergency extraction line components 1710, 1730, 1750, 1770 are comparable to the emergency extraction line component 1500 and emergency extraction line component 1600. However, in the case of emergency extraction line components 1710, 1730, 1750, 1770, each emergency extraction line component has four conduits 1720, 1740, 1760, 1780. In the system 1700, each one of the four conduits 1720, 1740, 1760, 1780 service one of the four emergency extraction line components 1710, 1730, 1750, 1770. For example, intake 1715 of emergency extraction line component 1710 would pull water and pollutants through screen 1725 and into conduit 1720. Similarly, intake 1735 of emergency extraction line component 1730 would pull water and pollutants through screen 1745 and into conduit 1740, intake 1755 of emergency extraction line component 1750 would pull water and pollutants through screen 1765 and into conduit 1760, and intake 1775 of emergency extraction line component 1770 would pull water and pollutants through screen 1785 and into conduit 1780.

In practice, each of the four emergency extraction line components 1710, 1730, 1750, 1770 would be connected to additional emergency extraction line components (not shown) that would be serviced by the conduit servicing that emergency extraction line component. For example, the emergency extraction line component 1710 would be connected to additional emergency extraction line components (not shown) that would deliver water and pollutants to conduit 1720. In that way, system 1700 would include an array of emergency extraction line components serviced by four different lines and four different pumps. As such, one pump would not be required to service every emergency extraction line component in the array. The pumps and conduits would be sized and configured to ensure that each conduit had sufficient suction to draw in water and pollutants from each emergency extraction line component serviced by that conduit.

Figure 18:
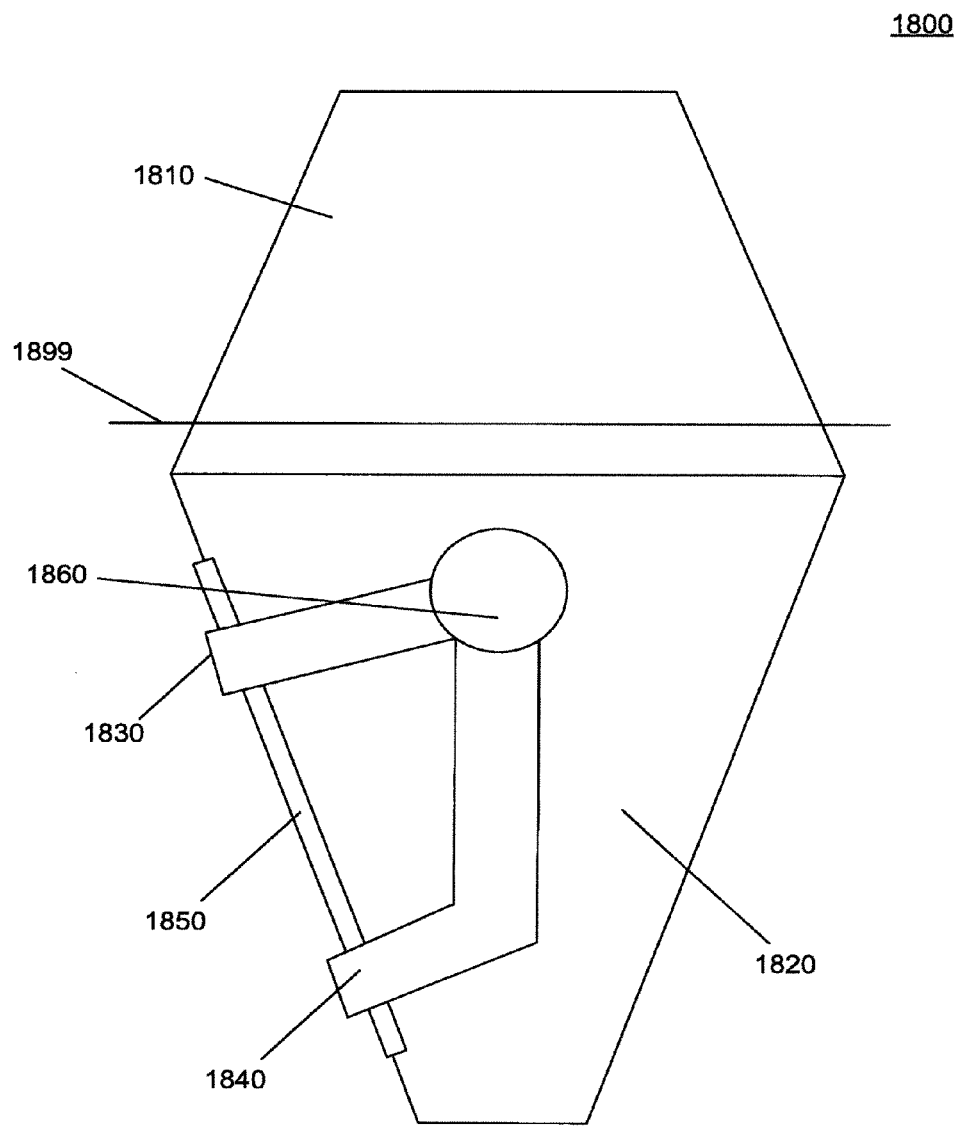
FIG. 18 shows an emergency extraction line component in accordance with an exemplary embodiment of the present invention.

FIG. 18 shows an emergency extraction line component 1800 in accordance with an exemplary embodiment of the present invention. Referring to FIG. 18, the emergency extraction line component 1800 includes a top portion 1810. The top portion 1810 would include buoyant material to allow the emergency extraction line component 1800 to float such that much of the top portion 1810 was above the water line 1899. The lower portion 1820 would mostly be below the water line 1899. The lower portion 1820 would be filled with water to stabilize the emergency extraction line component 1800 while it is in the water, that is, help keep the emergency extraction line component 1800 in an upright position. In the embodiment of FIG. 18, the emergency extraction line component 1800 includes two intakes 1830, 1840. The intakes 1830, 1840 protrude through screen 1850. The intakes 1830, 1840 pull water and pollutants into conduit 1860. Suction to pull the water and pollutants into conduit 1860 is provided by a land-based or vessel-based pump attached to the conduit 1860 (not shown). In an alternative embodiment, the screen 1850 could be solid. In this alternative embodiment, water would enter the lower portion 1820 through holes to provide ballast for the emergency extraction line component 1800.

Figure 19:
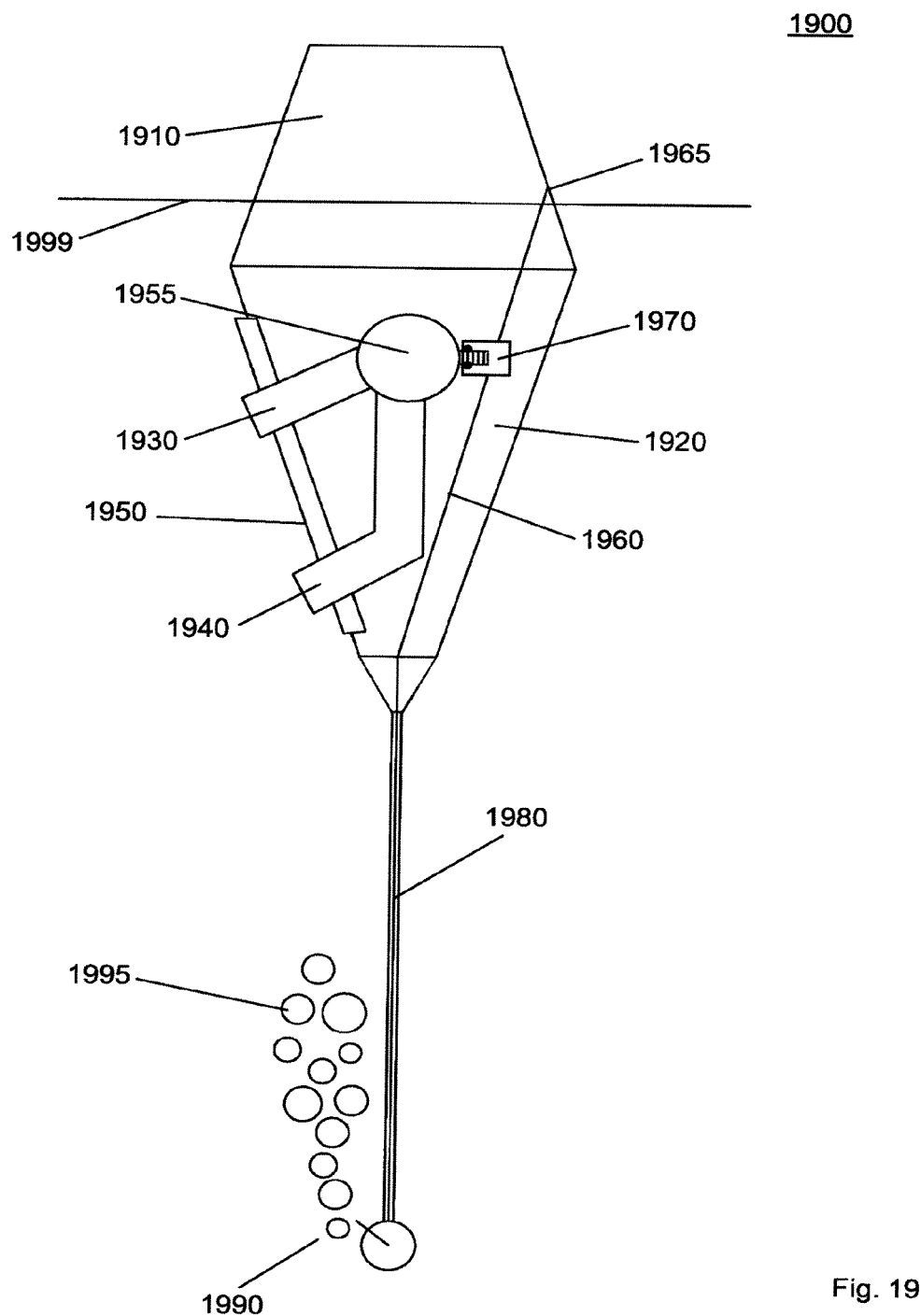
FIG. 19 shows an emergency extraction line component with an exemplary bubble conveyor in accordance with an exemplary embodiment of the present invention.

FIG. 19 shows an emergency extraction line component with an exemplary bubble conveyor in accordance with an exemplary embodiment of the present invention. Referring to FIG. 19, the emergency extraction line component 1900 includes a top portion 1910. The top portion 1910 would include buoyant material to allow the emergency extraction line component 1900 to float such that much of the top portion 1910 was above the water line 1999. The lower portion 1920 would mostly be below the water line 1999. The lower portion 1920 would be filled with water to stabilize the emergency extraction line component 1900 while it is in the water, that is, help keep the emergency extraction line component 1900 in an upright position. In the embodiment of FIG. 19, the emergency extraction line component 1900 includes two intakes 1930, 1940. The intakes 1930, 1940 protrude through screen 1950. The intakes 1930, 1940 pull water and pollutants into conduit 1955. Suction to pull the water and pollutants into conduit 1955 is provided by a land-based or vessel-based pump attached to the conduit 1955 (not shown). In an alternative embodiment, the screen 1950 could be solid. In this alternative embodiment, water would enter the lower portion 1920 through holes in the lower portion 1820 (not shown) to provide ballast for the emergency extraction line component 1900.

The emergency extraction line component 1900 also includes a skirt 1980. The skirt 1980 would have a width approximately the same as the width of the emergency extraction line component 1900 ("width" is the dimension into the page as you view FIG. 19). The skirt 1980 includes an air line 1960. The airline 1960 draws air through opening 1965 through the operation of an impeller 1970. The impeller 1970 is rotated by the movement of the water in the conduit 1955. Air drawn into the opening 1965 bubbles out the opening 1990. As these air bubbles 1995 move to the surface of the water, they push up any pollutants, such as oil, toward the intakes 1930, 1940. In this was, the emergency extraction line component 1900 can capture pollutants that are below the surface of the water. In this exemplary embodiment, the skirt ranges from 3 feet to 6 feet in depth.

FIG. 20a shows an emergency extraction line component 2000 with an extendable extractor in accordance with an exemplary embodiment of the present invention. FIG. 20b shows an emergency extraction line component with the extendable extractor in extended configuration in accordance with an exemplary embodiment of the present invention. Referring to FIGS. 20a and 20b, the emergency extraction line component 2000 includes an extendable extractor 2020, which can also be referred to as an intake. The extendable extractor 2020 protrudes from the lower portion 2010 of the emergency extraction line component 2000 to place the opening of the extractor 2020 at a depth below the surface of the water. In this way, the emergency extraction line component 2000 can reach subsurface pollutants, such as pockets of oil. The depth that can be achieved by the extendable extractor 2020 will depend on the strength of the land-based or vessel-based pump (not shown) that is attached to the conduit (not shown) that is attached to the extendable extractor 2020. In this exemplary embodiment, the extendable extractor 2020 telescopes to a lower depth.

Figure 21B:
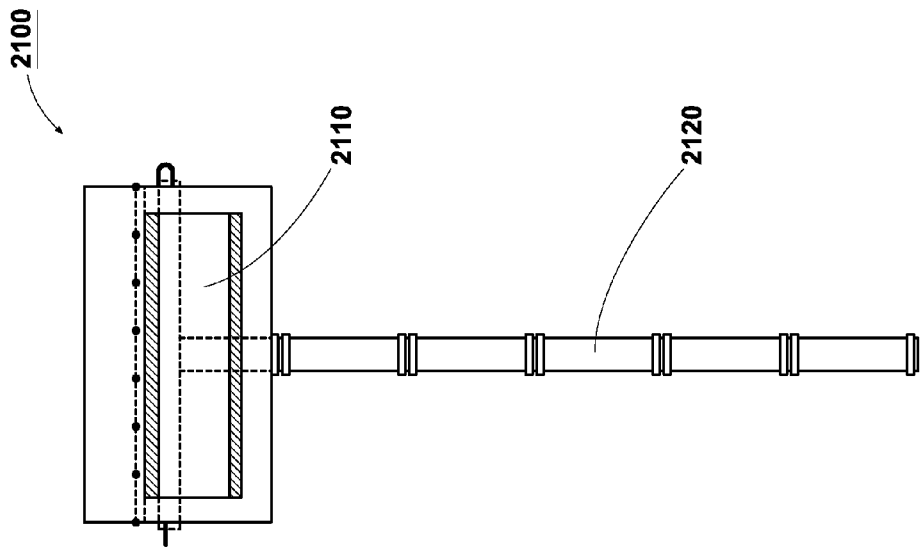
FIG. 21b shows an emergency extraction line component with the alternative extendable extractor in extended configuration in accordance with an exemplary embodiment of the present invention.
Figure 21A:
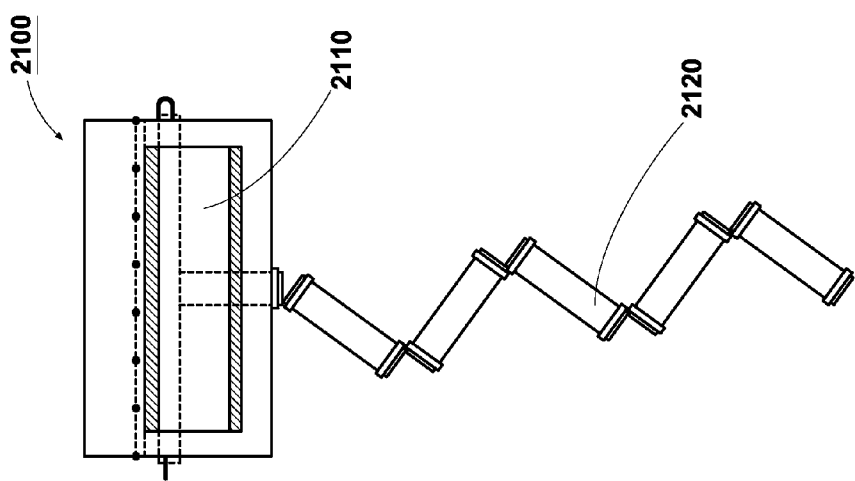
FIG. 21a shows an emergency extraction line component with an alternative extendable extractor in accordance with an exemplary embodiment of the present invention.

FIG. 21a shows an emergency extraction line component 2100 with an alternative extendable extractor in accordance with an exemplary embodiment of the present invention. FIG. 21b shows an emergency extraction line component 2100 with the alternative extendable extractor in extended configuration in accordance with an exemplary embodiment of the present invention. Referring to FIGS. 21a and 21b, the emergency extraction line component 2100 includes an extendable extractor 2120, which can also be referred to as an intake. The extendable extractor 2120 protrudes from the lower portion 2110 of the emergency extraction line component 2100 to place the opening of the extractor 2120 at a depth below the surface of the water. In this way, the emergency extraction line component 2100 can reach subsurface pollutants, such as pockets of oil. The depth that can be achieved by the extendable extractor 2120 will depend on the strength of the land-based or vessel-based pump (not shown) that is attached to the conduit (not shown) that is attached to the extendable extractor 2120. In this exemplary embodiment, the extendable extractor 2120 accordions to a lower depth.

Figure 22:
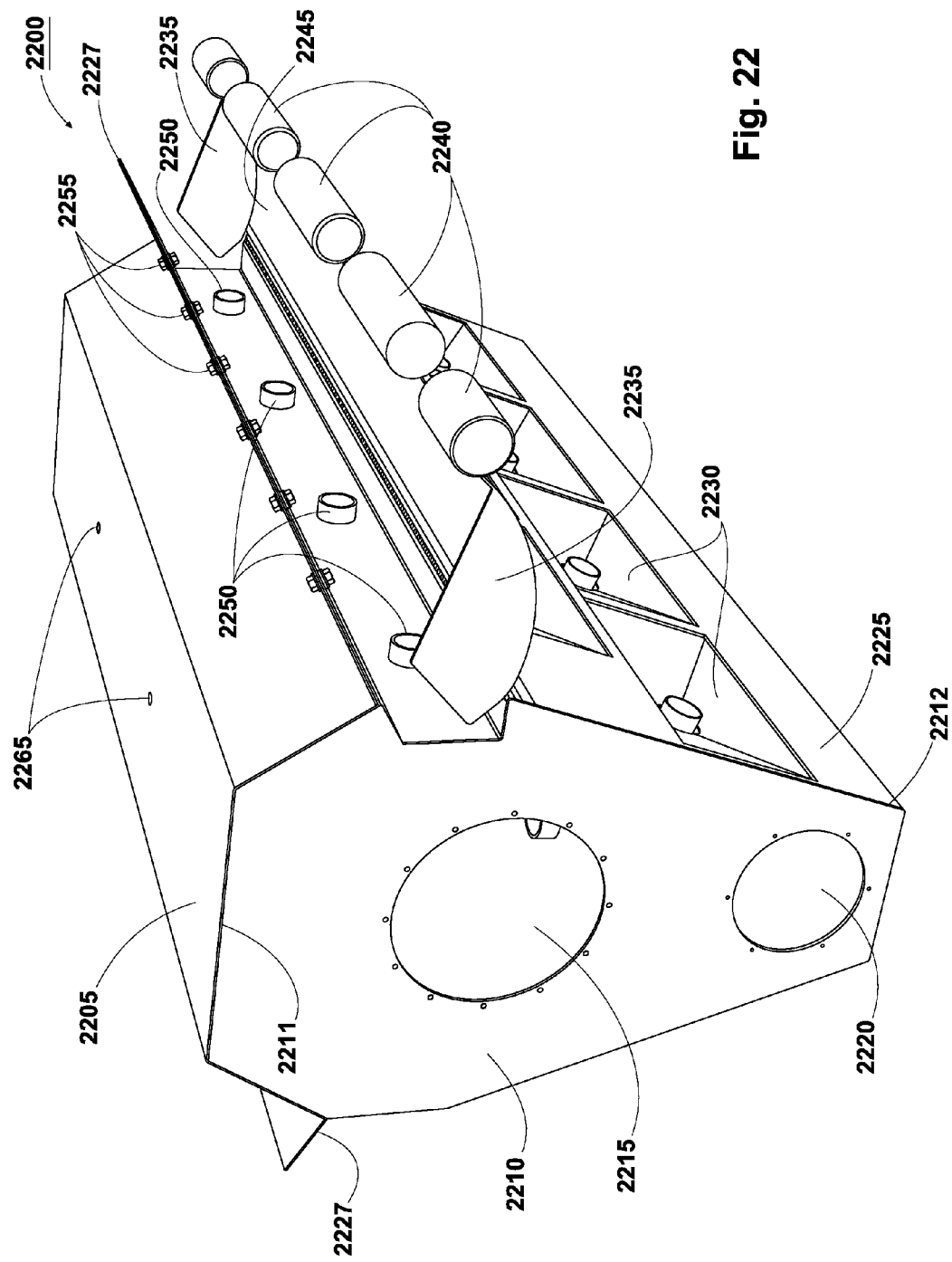
FIG. 22 shows a perspective view of an emergency extraction line component in accordance with an exemplary embodiment of the present invention.
Figure 23:
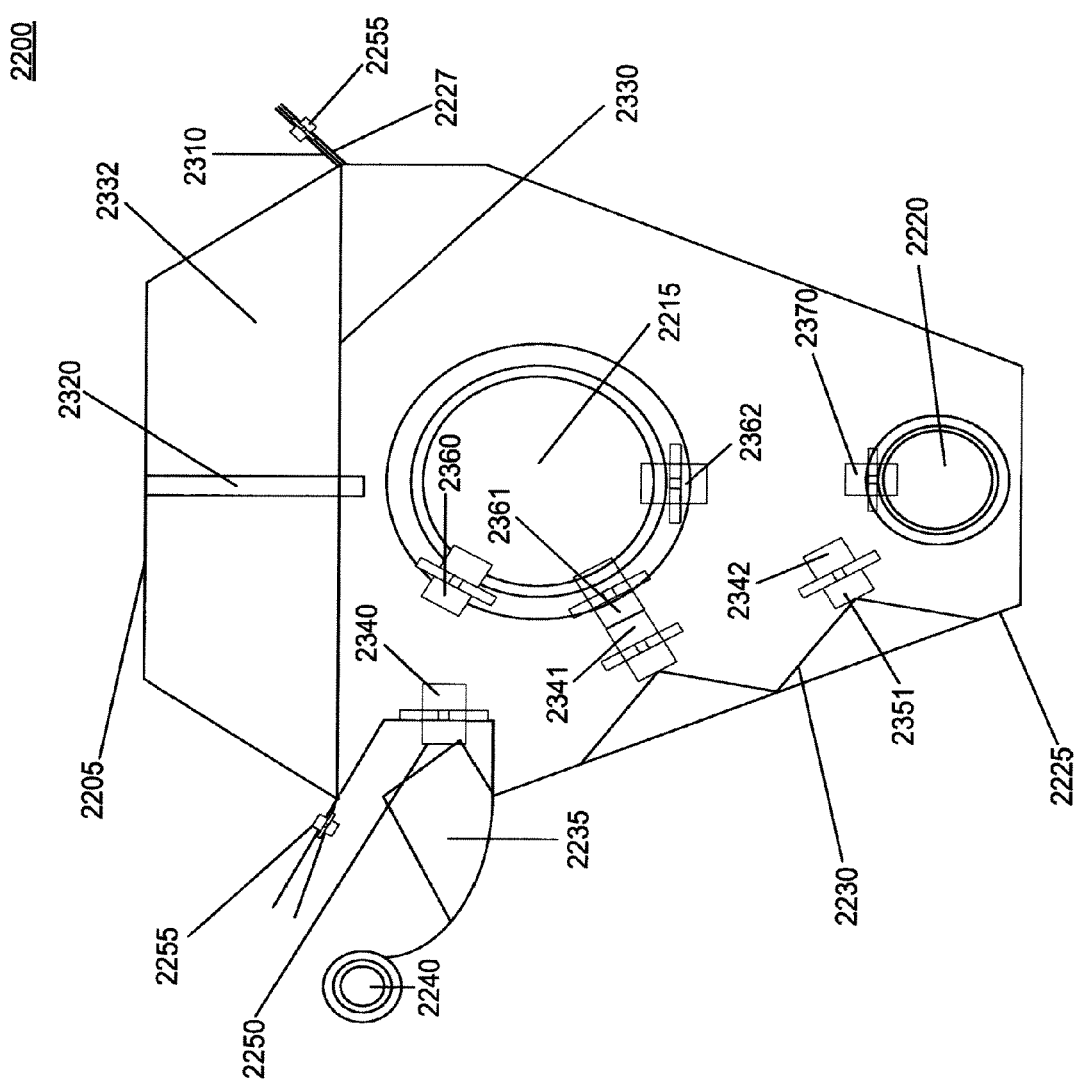
FIG. 23 shows a side view of an emergency extraction line component in accordance with an exemplary embodiment of the present invention.

FIG. 22 shows a perspective view of an emergency extraction line component 2200 in accordance with an exemplary embodiment of the present invention. Referring to FIG. 22, the emergency extraction line component 2200 includes a roof 2205. The roof 2205 covers the emergency extraction line component 2200 and contains buoyant material that enables the emergency extraction line component 2200 to float on the surface of a body of water. The roof 2205 has two holes 2265. These holes 2265 provide a connection point for a support structure (not shown), that is threaded into the holes 2265 and into the lower ledge (not shown) of the roof 2205. The support structure and lower ledge are illustrated in FIG. 23, described below.

The roof 2205 is connected to a base 2225 at a lip 2227. The base 2225 includes two lips 2227 and the roof 2205 is connected to both lips 2227. The roof 2205 is connected to the base 2225 at the lips 2227 by multiple bolts 2255. A comparable shaped structure on the roof 2205 is mated with the lip 2227. A sealing material (not shown) may be added between the mated pieces before the pieces are bolted together. In alternative embodiments, fasteners other than bolts may be used. The base 2225 is described in greater detail below, in connection with FIG. 27.

The roof 2205 is also mated with an end plate 2210 at seam 2211. The end plate 2210 also mates with the base 2225 at seam 2212. These seams may include a sealant. The end plate 2210 has two openings. These openings are for two pipes—a mainline pipe or conduit 2215 and a base line pipe of conduit 2220. These two pipes 2215, 2220 are discussed in greater detail below, in connection with FIGS. 23, 26, and 28. The emergency extraction line component 2200 has an identically configured end plate opposite the end plate 2210.

The emergency extraction line component 2200 also includes a row of four recessed panels 2230 on the front of the base 2225. These recessed panels 2230 include an opening for drawing in water and pollutants to the main line pipe 2215. The recessed shape helps to direct the flow of water and pollutants into the respective openings. These recessed panels are further described below, in connection with FIGS. 23, 24, 25, and 27.

The emergency extraction line component 2200 also includes a hinged plate 2245. The hinged plate 2245 includes end structures 2235 and buoyant floats 2240. The buoyant floats 2240 float on the surface of the water. As the emergency extraction line component 2200 bobs up and down in the water, the hinged plate 2245 will open and close as the buoyant floats 2240 float on the surface of the water. By moving with the surface of the water, the hinged door allows for surface water and pollutant flow into the four openings 2250. In this way, the four openings 2250, which are attached to the main line 2215, can draw pollutants that may float on the surface of the water into the emergency extraction line component 2200. By the door closing as the emergency extraction line component 2200 bobs lower in the water, the four openings 2250 are isolated from the water. As such, the four openings 2250 primarily draw in surface water and associated pollutants. The buoyant floats 2240 are made of a buoyant material, such as smart foam.

FIG. 23 shows a side view of an emergency extraction line component 2200 in accordance with an exemplary embodiment of the present invention. Referring to FIGS. 22 and 23, the emergency extraction line component 2200 is depicted with the end plate 2210 removed, exposing some of the internal structure of the emergency extraction line component 2200. The lower ledge 2330 of the roof 2205 attaches to a support structure 2320. The support structure 2320 supports the roof 2205. The volume 2332 formed by the roof 2205 and lower ledge 2330 includes buoyant material, such as air or smart foam. The emergency extraction line component 2200 would typically float in the water with the water line (not shown) at approximately the level of the lower ledge 2330. The structure 2310 of the roof 2205 mates with the lip 2227 of the base 2225.

The base 2225 includes two rows of intended structures 2230. The recessed panels 2230 include openings 2350 and 2351. The openings 2350 and 2351 are connected to connecting structure 2341 and 2342, respectively. Connecting structure 2341 is connected to connecting structure 2361, which connects to an opening in main line pipe 2215. Main line pipe 2215 is attached to a vessel-based or land-based pump (not shown) through additional conduits (not shown) (and, possibly, additional emergency extraction line components (not shown)), which provides suction to the main line pipe 2215. In that way, water and pollutants are pulled into opening 2350 and eventually into main line pipe 2215. Although not shown in FIG. 23, connecting structures 2340 and 2342 would also connect to main line pipe 2215 at connecting structures 2360 and 2362, respectively. Base line pipe 2220 also has a connecting structure 2370, which can connect to main line pipe 2215. This connection is illustrated in FIG. 24, discussed below.

Figure 24:
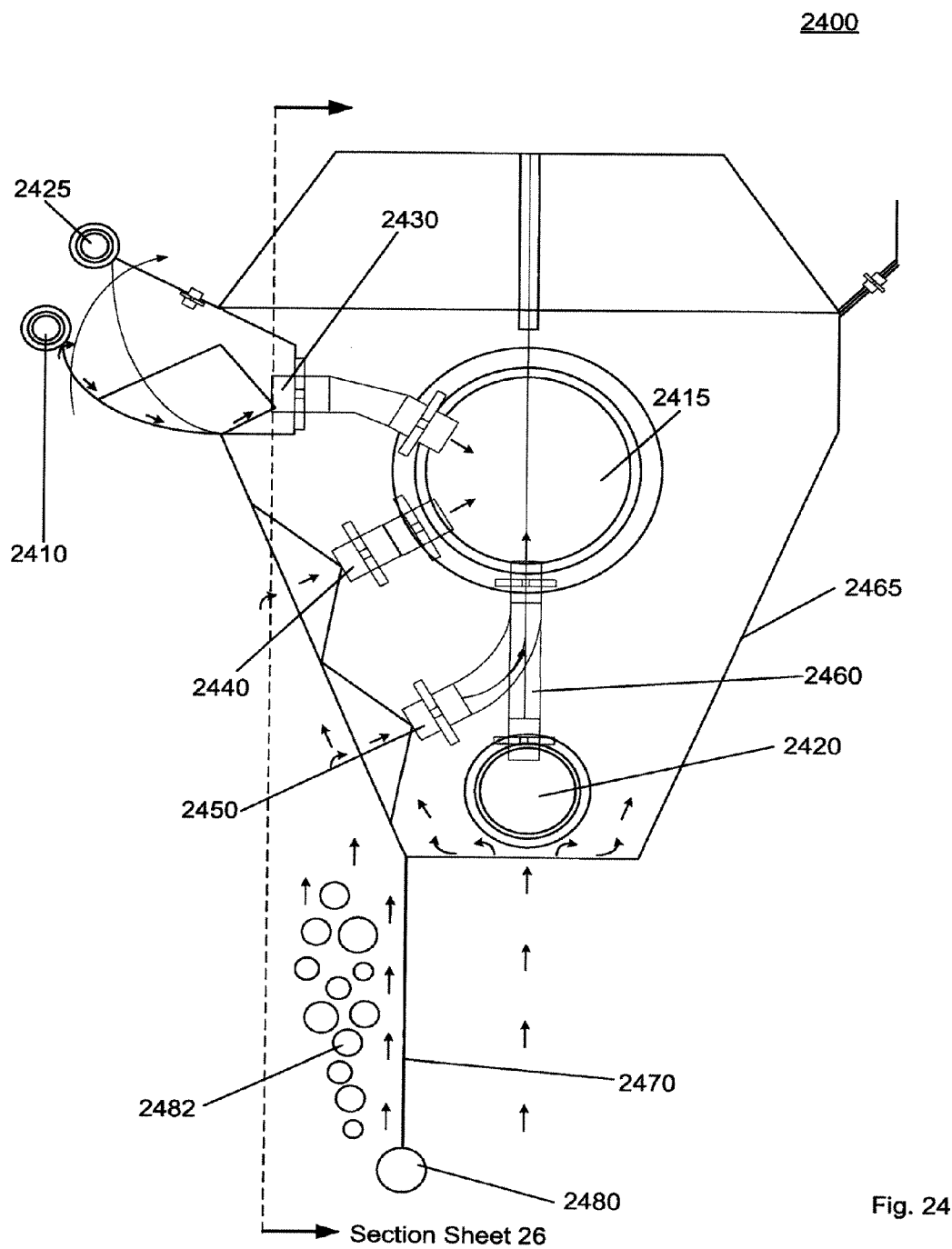
FIG. 24 shows a side view of an emergency extraction line component with exemplary bubble conveyor in accordance with an exemplary embodiment of the present invention.

FIG. 24 shows a side view of an emergency extraction line component 2400 with exemplary bubble conveyor in accordance with an exemplary embodiment of the present invention. Referring to FIG. 24, the emergency extraction line component 2400 includes a skirt 2470. The skirt 2470 is approximately the width of the emergency extraction line component 2400 (("width" is the dimension into the page as you view FIG. 24). At the base of the skirt 2470 is a bubbler 2480. The bubbler 2480 generates air bubbles 2482 that move up the front of the skirt 2470. The source of air is similar to the source disclosed above, in connection with FIG. 19 and the emergency extraction line component 1900. An impeller (not shown) is driven by the liquid that is taken into the unit. The motion of the impeller draws air in from an air inlet (not shown). The movement of the air bubbles 2482 from the bubbler 2480 pushes pollutants, such as oil, from below the surface of the water to the emergency extraction line component 2400 at the surface. These pollutants are pulled into openings 2440, 2450 and into main line pipe 2415. Main line pipe 2415 is attached to a vessel-based or land-based pump (not shown) through additional conduits (not shown) (and, possibly, additional emergency extraction line components (not shown)), which provides suction to the main line pipe 2415. A connection 2460 connects the main line pipe 2415 to a base line pipe 2420. An additional pump (not shown) can be attached, through conduit (not shown) to the base line pipe 2420 to provide additional suction power to the main line 2415 through this connection.

A hinged door 2410, with buoyant float 2425, opens and closes as the emergency extraction line component 2400 bobs up and down in the water. The hinged door 2410 closes as the emergency extraction line component 2400 moves lower in the water and opens as the emergency extraction line component 2400 moves higher in the water. This action allows the openings behind the hinged door 2410, such as opening 2430 to primarily take in water and pollutants on the surface of the body of water.

Figure 25:
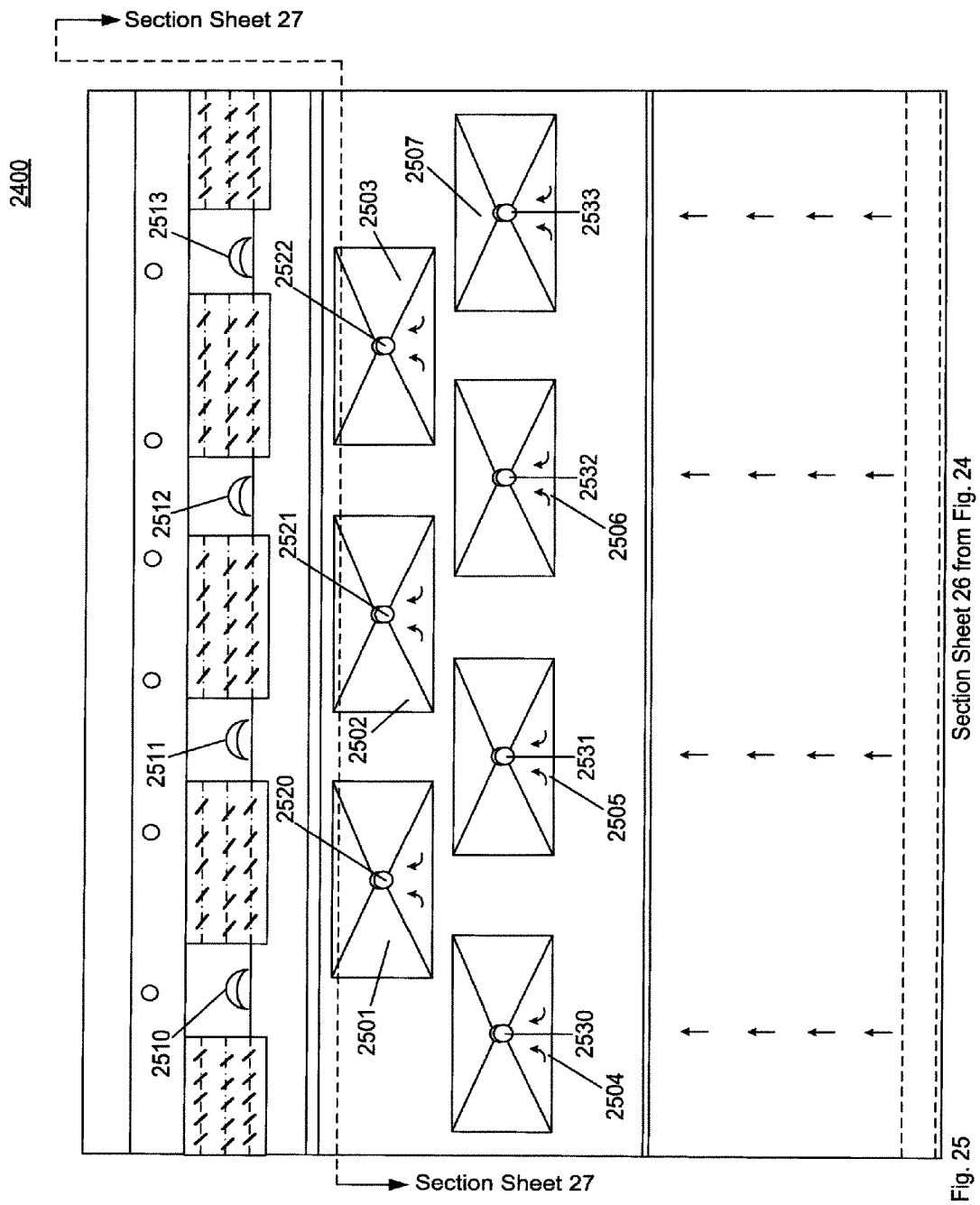
FIG. 25 shows a section of the emergency extraction line component with exemplary bubble conveyor of FIG. 24.

FIG. 25 shows a section of the emergency extraction line component 2400 with exemplary bubble conveyor of FIG. 24. Referring to FIGS. 24 and 25, this section from FIG. 24 shows the front area of the emergency extraction line component 2400, which includes 11 openings that draw in water and pollutants to the main line pipe 2415 (not shown). The four openings 2510, 2511, 2512, 2513, are near the top of the emergency extraction line component 2400, behind the hinged door 2410. Seven additional openings 2520, 2521, 2522, 2530, 2531, 2532, 2533 are provided in seven recessed panels 2501, 2502, 2503, 2504, 2505, 2506, 2507.

Figure 26:
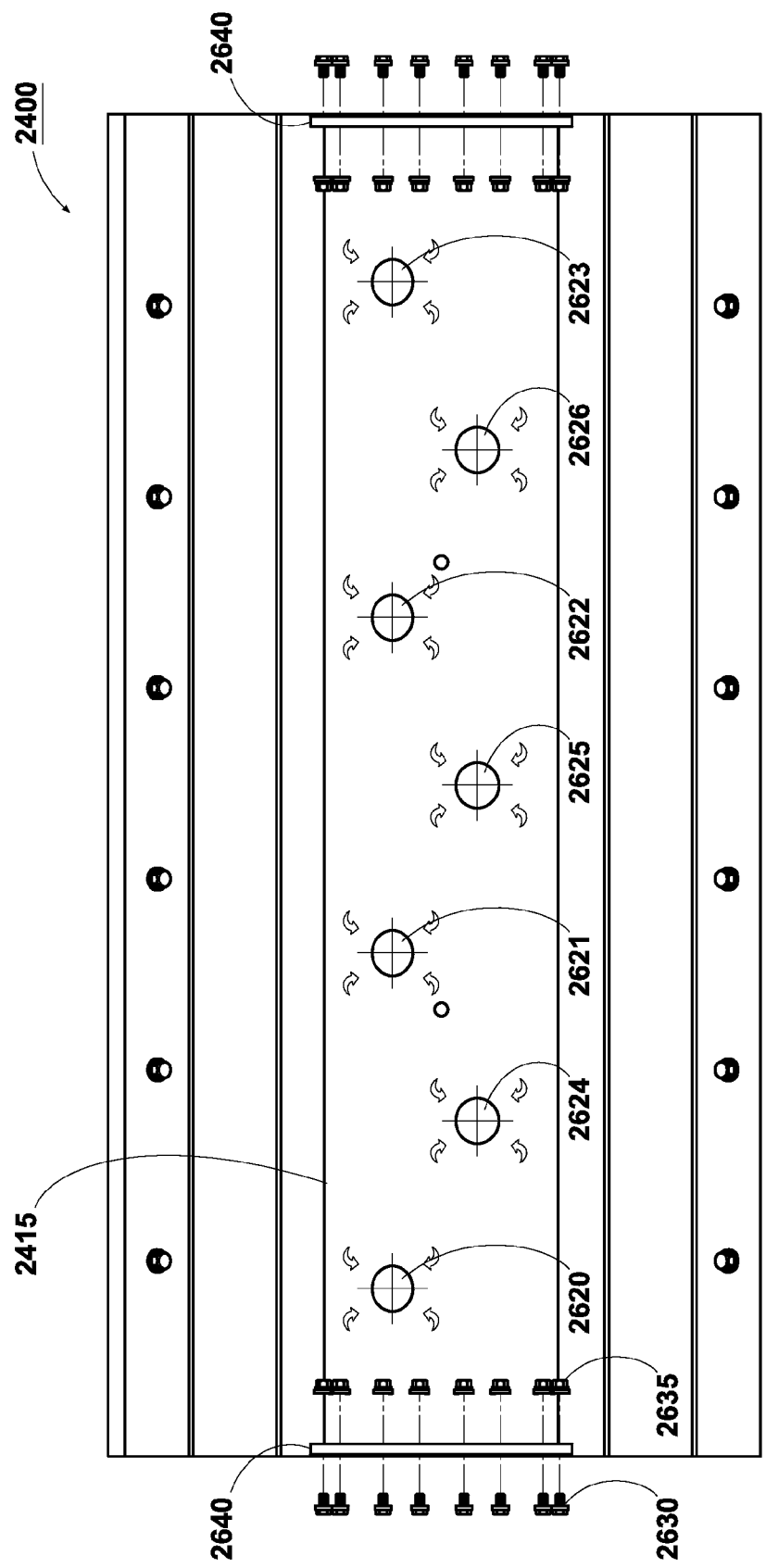
FIG. 26 shows a section of the emergency extraction line component with exemplary bubble conveyor of FIG. 24.

FIG. 26 shows a section of the emergency extraction line component 2400 with exemplary bubble conveyor of FIG. 24. Referring to FIGS. 24, 25, and 26, this section from FIG. 25 provides a plan view of the emergency extraction line component 2400 with the roof removed. This view shows the main line pipe 2415. From this orientation, the main line pipe 2415 includes four openings 2620, 2621, 2622, and 2623. These openings connect to the four openings 2510, 2511, 2512, 2513 (connection hardware not shown). From this orientation, the main line pipe 2415 also includes three openings 2624, 2635, 2626. These openings connect to the three openings 2520, 2521, 2522 (connection hardware not shown). The main line pipe 2415 is secured to the emergency extraction line component 2400 at either end with flanges and bolts 2630 and nuts 2635 or other comparable fasteners. These flanges may also be connected to connectors (not shown) that connect one emergency extraction line component to another. Connectors are described in greater detail below, in conjunction with FIGS. 38a, 38b, 29a, and 39b.

Figure 27:
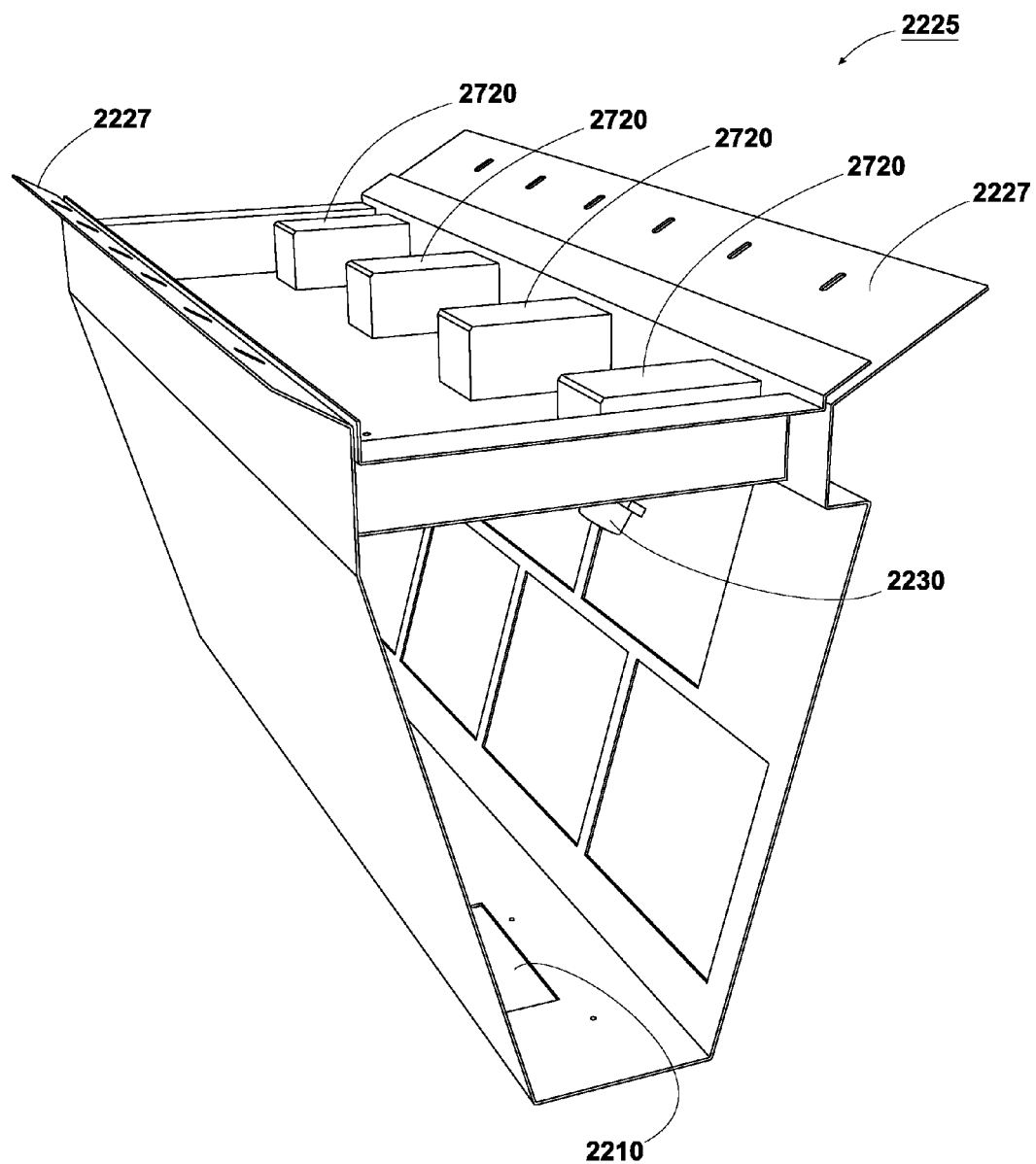
FIG. 27 shows a base of the emergency extraction line component in accordance with an exemplary embodiment of the present invention.

FIG. 27 shows a base 2225 of the emergency extraction line component in accordance with an exemplary embodiment of the present invention. Referring to FIGS. 22 and 27, the base 2225 includes an opening at the bottom of the base 2225. This opening 2710 allows water into the bottom of the emergency extraction line component 2200. This water serves as ballast for the emergency extraction line component 2200. The water fills the lower volume of the emergency extraction line component 2200 and helps to maintain the emergency extraction line component 2200 in the proper orientation while in the water. In this exemplary embodiment, the emergency extraction line component 2200 includes four such openings.

The base 2225 also includes lips 2227. These lips 2227 mate with similarly configured parts on the roof 2205. The roof 2205 is then secured to the lips 2227 using fasteners, such as bolts 2255. The interior of the roof structure includes a housings 2720, which allows room for the connector 2730, without penetrating the lower ledge of the roof 2250. Typically, the number of housings 2720 correspond to the number of upper-most openings, openings 2250.

Figure 28A:
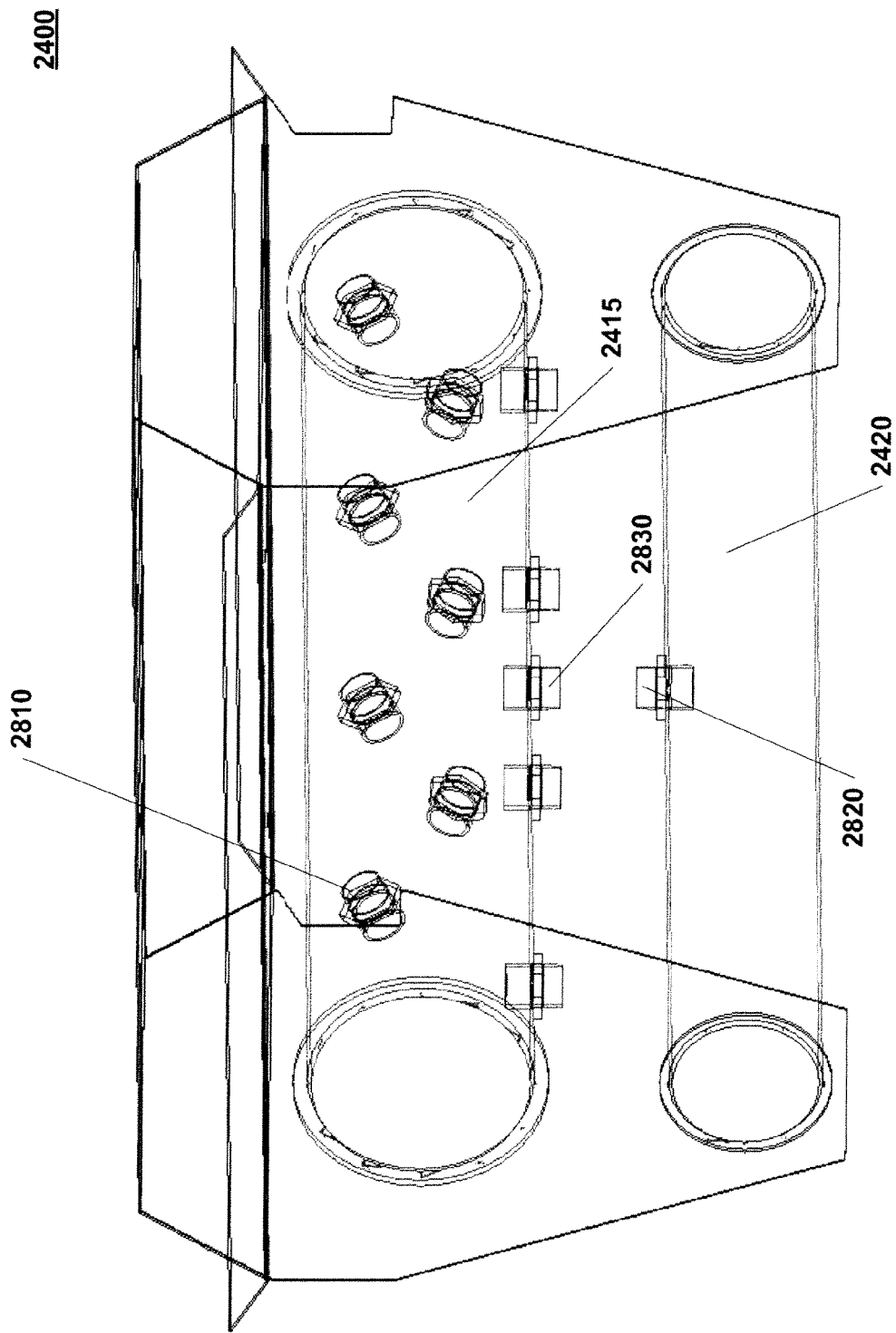
FIG. 28a shows a cut-away view of the emergency extraction line component in accordance with an exemplary embodiment of the present invention.

FIG. 28a shows a cut-away view of the emergency extraction line component 2400 in accordance with an exemplary embodiment of the present invention. Referring to FIGS. 24, 25, 26, and 28a, the emergency extraction line component 2400 is shown with its base part removed, exposing internal parts, such as main line 2415 and base line 2420. The main line pipe 2415 includes multiple connectors, such as connector 2810. These connectors are connected to openings in the base of the emergency extraction line component 2400 that allow water and pollutants to be drawn into the main line 2415. An additional connector 2830 connects to the connector 2820 on the base line pipe 2420. An additional pump (not shown) can be attached, through conduit (not shown) to the base line pipe 2420 to provide additional suction power to the main line 2415 through this connection.

Figure 28B:
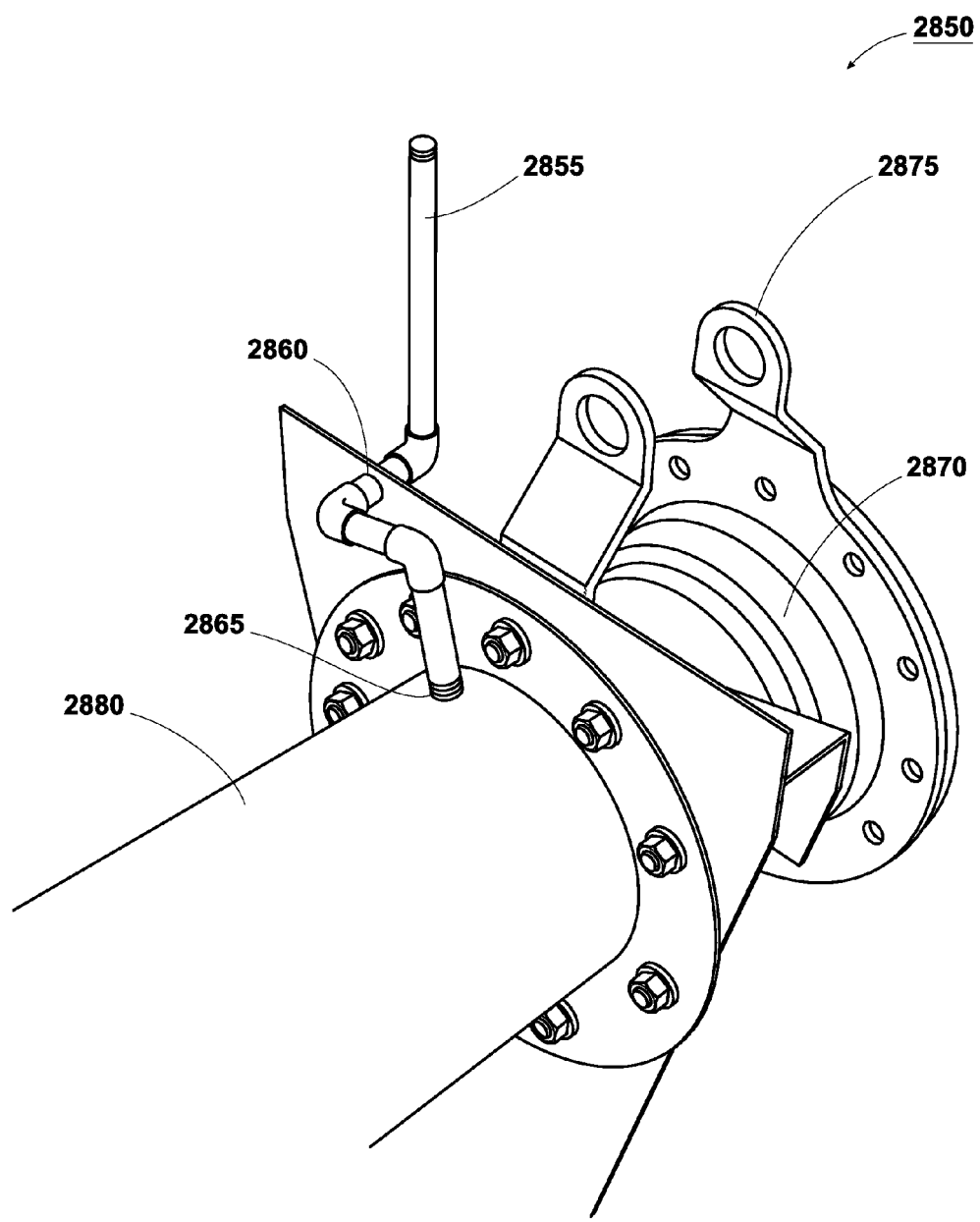
FIG. 28b shows a cut-away view of the emergency extraction line component in accordance with an exemplary embodiment of the present invention, including a snorkel valve.

FIG. 28b shows a cut-away view of a emergency extraction line component in accordance with an exemplary embodiment of the present invention, including a snorkel valve. Referring to FIG. 28b, the cut-away view shows a portion of a main line 2880. The main line 2880 is similar to the main line 2415 (see FIG. 24). Main line 2880 is connected to an adjoining emergency extraction line component (not shown) through a connector, such as connector 2870. Comparable connectors are described in greater detail below, in connection with FIGS. 39a and 39b. The connector 2870 includes a necking and tugging ring 2875. This ring is described in greater detail below, in connection with FIG. 41.

The main line 2880 also includes a snorkel valve 2855. The snorkel valve 2855, also referred to as a venturi valve, is used to extract air from the main line 2880. The snorkel valve 2855 of this exemplary embodiment is a three-quarter-inch tube. The exemplary snorkel valve 2855 is threaded into the main line 2880 at point 2865. The snorkel valve 2855 passes through the base part of the emergency extraction line component at a point 2860. The other end of the snorkel valve 2855 is connected to a compressed air source, which creates a low pressure point within a valve system that when air enters the main line 2880, it will immediately escape through the snorkel valve 2855. An air line (not shown), connects snorkel valves from multiple emergency extraction line components and ultimately connects to a pump (not shown) used to move water and contaminants through the main line 2880. The pump also creates compressed air that is fed into the air line and serves as the compressed air source for the snorkel valve 2855. This feature has a great effect on the flow rate in the main line 2880 as the air trapped in the line doesn't have to travel back to the pump to get released.

FIG. 29a shows a system for an alternative emergency extraction line 2900 in accordance with an exemplary embodiment of the present invention. FIG. 29b shows a close-up of a group of sections 2930 of the alternative emergency extraction line 2900 in FIG. 29a. Referring to FIGS. 29a and 29b, the alternative emergency extraction line 2900 is shown floating on the surface of a body of water. The alternative emergency extraction line 2900 is arched, such as in the case where the arch forms a boundary around one end of a pollutant spill, such as an oil spill. The alternative emergency extraction line 2900 is made up of alternative emergency extraction line components 2910. The movement of water and pollutants through the alternative emergency extraction line 2900 establishes a current that causes water and pollutants to move along side the alternative emergency extraction line 2900. This movement is depicted by the arrowed line in FIG. 29a.

The group of sections 2930 includes four emergency extraction line components 2910. The components 2910 are connected by connectors 2940. The connectors 2940 are able to flex, which allows the emergency extraction line 2900 to bend, such as is illustrated in FIG. 29a. Exemplary connectors are described in greater detail below, in connection with FIGS. 38b, 38b, 39a, and 39b.

Each component 2910 includes an intake screen 2950. These intake screens 2950 allow water and pollutants to be pulled into the alternative emergency extraction line 2900. In one embodiment, the suction at the intake screens 2950 is established by a land-based or vessel-based pump (not shown). In an alternative embodiment, the suction is established by a screw auger system. This screw auger is discussed in greater detail below, in connection with FIG. 30. Each component 2910 is constructed as a double-walled, buoyant-material-filled, C-shaped cylinder with the intake screen 2950 fused into an opening in the wall structure. Intake screen 2950 is typically made from metal, such as aluminum, but other materials may be used.

As water and pollutants are pulled into the alternative emergency extraction line 2900 a current outside the alternative emergency extraction line 2900 is established. In this way, the alternative emergency extraction line 2900 can move pollutants from an area of a spill both by extracting the pollutants into the alternative emergency extraction line 2900 and by pulling additional pollutants along the outside of the alternative emergency extraction line 2900.

FIG. 30 shows a close-up of a screw auger 3010 of the alternative emergency extraction line in FIG. 29a. Referring to FIGS. 29a, 29b, and 30, the system 3000 is a cut-away view of an alternative component 2910. The component 2910 houses a screw auger 3010. The screw auger 3010 is attached to adjoining screw augers (not shown) in adjoining segments of the emergency extraction line 2900 with a u-joint connector. The screw auger 3010 is ultimately connected to a motor (not shown) that turns the entire screw auger linkages for the emergency extraction line 2900. The movement of the screw auger both pulls water and pollutants into the component 2910 and establishes a current outside the emergency extraction line 2900 in the direction of the movement of the water and pollutants inside the emergency extraction line 2900.

FIG. 31a shows an alternative emergency extraction line component 3100 in accordance with an exemplary embodiment of the present invention. FIG. 31b shows a cut-away of the alternative emergency extraction line component 3100 in FIG. 31a. Referring to FIGS. 31a and 31b, the emergency extraction line component 3100 includes a screened opening 3110. As with other embodiments of alternative emergency extraction line components, water and pollutants are pulled into the alternative emergency extraction line 3100 through the screen 3110. Screen 3110 is typically made from metal, such as aluminum, but other materials may be used. The screen 3110 typically has 0.5-inch openings. The suction at the screen 3110 is generated by a fan blade 3120, which is driven by motor 3150. The flow of water and pollutants are directed into the fan around a conical structure 3140. The emergency extraction line component 3100 includes an opening 3130 where the emergency extraction line component 3100 is connected to a second emergency extraction line component 3100 (not shown). The entire emergency extraction line component 3100 forms a conduit for conducting water and pollutants from one emergency extraction line component 3100 to another emergency extraction line component 3100.

Figure 32:
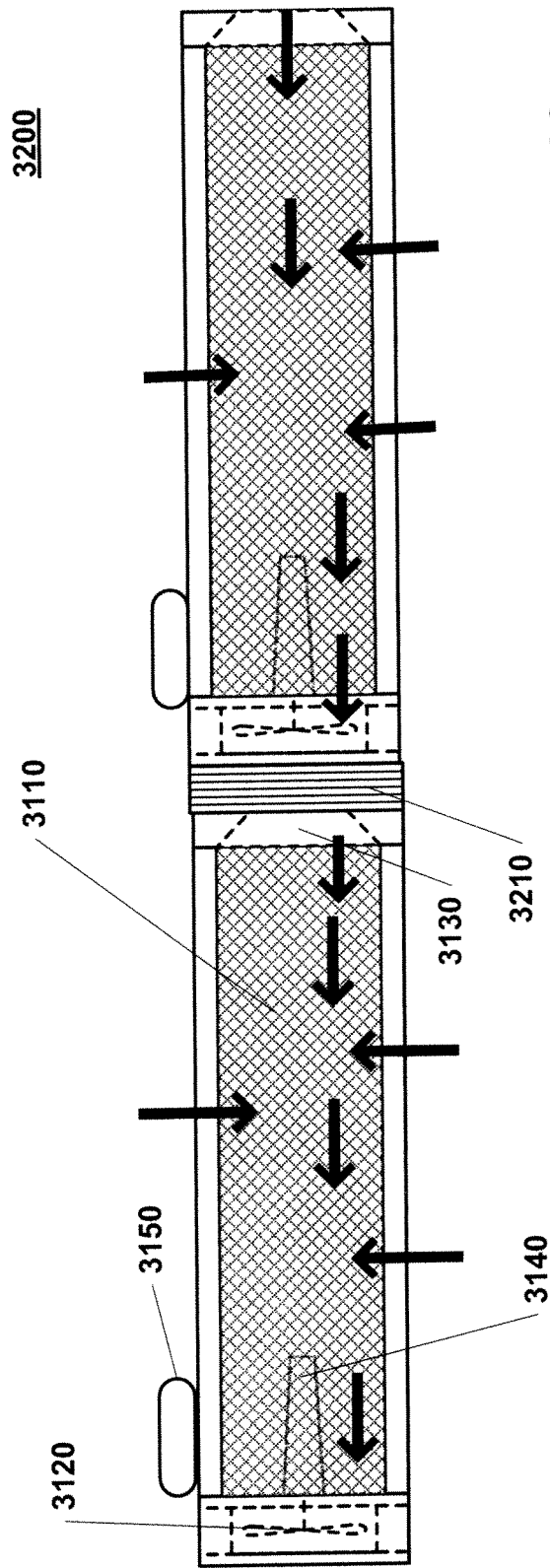
FIG. 32 shows a side view of two connected emergency extraction line components in accordance with an exemplary embodiment of the present invention.

FIG. 32 shows a side view of two connected emergency extraction line components 3100 in accordance with an exemplary embodiment of the present invention. Referring to FIGS. 31a, 31b, and 32, the two emergency extraction line components 3100 are attached at a connector 3210. The connectors 3210 are able to flex, which allows the two alternative emergency extraction line components 3100 to bend relative to one another. Exemplary connectors are described in greater detail below, in connection with FIGS. 38b, 38b, 39a, and 39b. The flow of water and pollutants are illustrated in FIG. 30 by black arrows.

Figure 33:
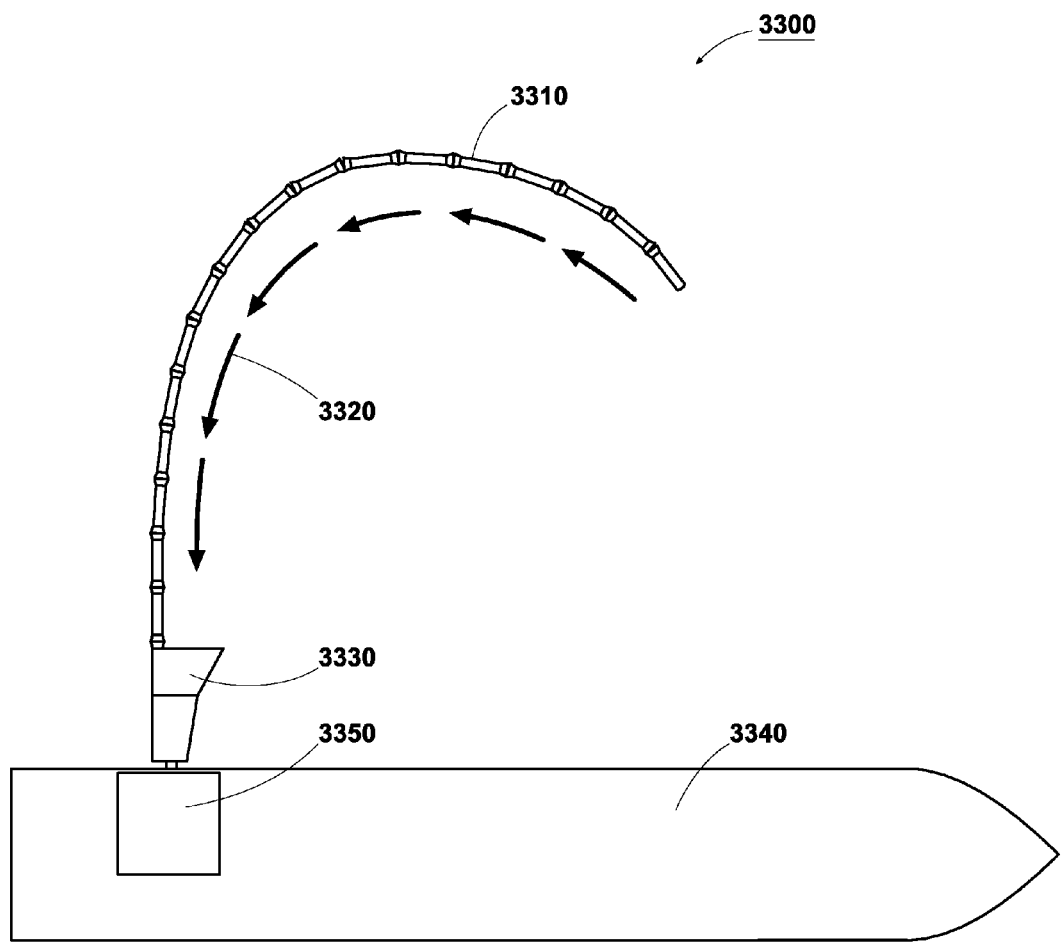
FIG. 33 shows a system for an alternative emergency extraction line in accordance with an exemplary embodiment of the present invention.

FIG. 33 shows a system 3300 for an alternative emergency extraction line in accordance with an exemplary embodiment of the present invention. Referring to FIG. 33, a vessel 3340, such as a barge or other boat, includes a pump 3350. The pump 3350 draws water and pollutants through the alternative emergency extraction line 3310. Additionally, a current 3320 of water and pollutants is established outside the alternative emergency extraction line 3310. The alternative emergency extraction line 3310 is connected to the pump 3350 with a cowling 3330. The cowling allows for the collection of water and pollutants both from the interior of the alternative emergency extraction line 3310 and the current that runs alongside the alternative emergency extraction line 3310. The collected water and pollutants are processed in the vessel 3340 to separate the pollutants from the water.

FIG. 34a shows a side view of two connected emergency extraction line components 3410, 3420 and a marine particle skimmer 3430 in accordance with an exemplary embodiment of the present invention. FIG. 34b shows a side view of two connected emergency extraction line components 3460, 3470 and an alternative marine particle skimmer 3480 in accordance with an exemplary embodiment of the present invention. Referring to FIGS. 34a and 34b, the systems 3400 and 3450 show two hybrid systems. As illustrated in FIGS. 34a and 34b, emergency extraction line components and marine particle skimmers can be combined in a single line.

Figure 35:
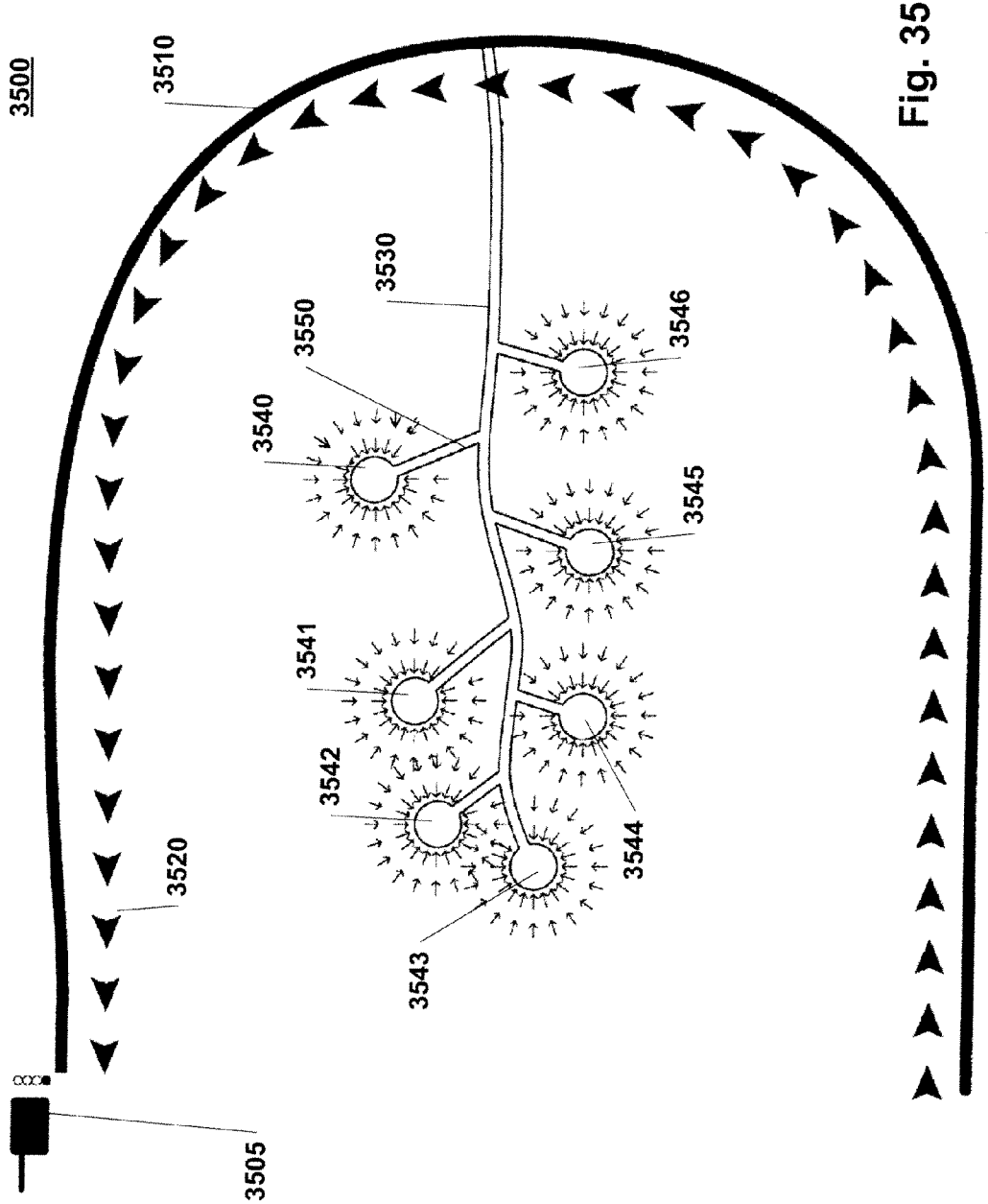
FIG. 35 shows a system for an alternative emergency extraction line and marine particle skimmer in accordance with an exemplary embodiment of the present invention.

FIG. 35 shows a system 3500 for an alternative emergency extraction line and marine particle skimmer in accordance with an exemplary embodiment of the present invention. Referring to FIG. 35, an emergency extraction line 3510 with intake screens or other openings (not shown) is attached to multiple marine particle skimmers 3540, 3541, 3542, 3543, 3544, 3545, 3546. Each individual marine particle skimmer, such as marine particle skimmer 3540, is connected to a main line 3530 by a branch line 3550. The main line 3530 is then connected to the alternative emergency extraction line 3510. Suction for the system 3500 is provided by one or more pumps, such as pump 3505. Multiple pumps can be connected to the system 3500, such that one pump is connected to a segment of the emergency extraction line 3510 of the main line 3530 only.

Figure 36:
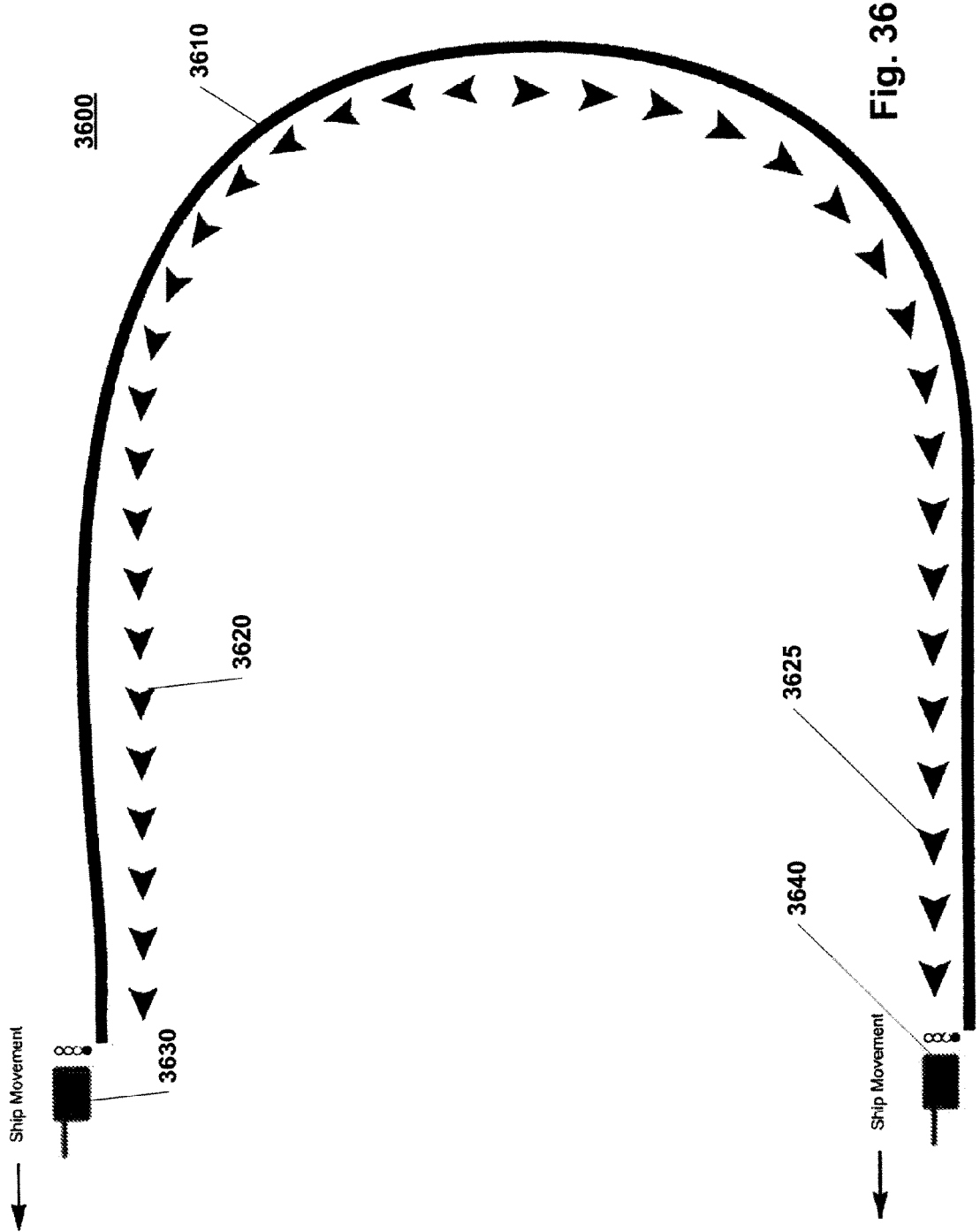
FIG. 36 shows a system for an alternative emergency extraction line in accordance with an exemplary embodiment of the present invention.

FIG. 36 shows a system 3600 for an alternative emergency extraction line in accordance with an exemplary embodiment of the present invention. Referring to FIG. 36, an emergency extraction line 3610 with intake screens or other openings (not shown) is connected to vessel-based pumps 3630 and 3640. These pumps 3630 and 3640 pull water and pollutants from the emergency extraction line 3610, such that pump 3630 provides suction to about one half the length of the emergency extraction line 3610 and pump 3640 provides suction to the other half of the emergency extraction line 3610. This movement of water and pollutants into the emergency extraction line 3610 also causes a current 3620 and current 3625, with a movement indicted by black arrow heads. The vessels that include the pumps 3630 and 3640 may move during the collection of water and pollutants. this movement may allows the system 3600 to reach a larger area of pollutants, such as from an oil spill, or may move a spill contained within the arch of the emergency extraction line 3610 to a preferred area for treatment, such as away from a beach or port.

Figure 37:
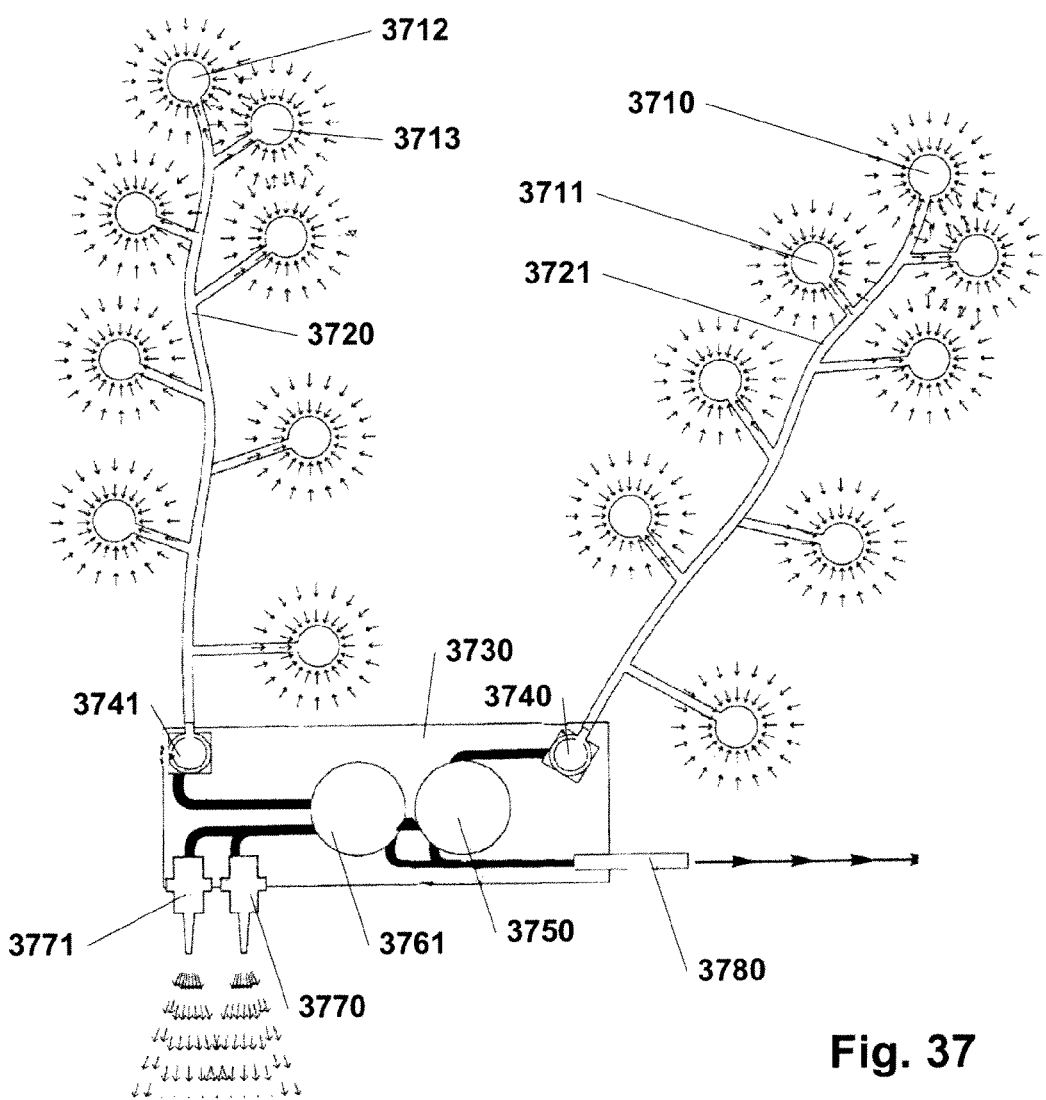
FIG. 37 shows a system for an alternative emergency extraction line and marine particle skimmer in accordance with an exemplary embodiment of the present invention.

FIG. 37 shows a system 3700 for marine particle skimmers in accordance with an exemplary embodiment of the present invention. Referring to FIG. 37, a dock 3730 contains two pumps 3740, 3741. Each pump is connected to separate lines 3720, 3721. These lines are connected to multiple marine particle skimmers, such as marine particle skimmers 3710, 3711, 3712, 3713. Of course, as illustrated above, emergency extraction line components can also be used in the system 3700.

Water and pollutants are removed by the multiple marine particle skimmers, such as marine particle skimmers 3710, 3711, 3712, 3713 and placed into separators 3750, 3761. Pumps 3770, 3771 remove the water from the separators 3750, 3761. The pollutant, such as oil, is removed through line 3780, such as by a pump (not shown) and contained.

FIG. 38a shows side view of a connector system 3800 used to connect multiple emergency extraction line components or multiple marine particle skimmers in accordance with an exemplary embodiment of the present invention. FIG. 38b shows side view of a hinge lock component of the connector system of FIG. 38a. Referring to FIGS. 38a and 38b, the system 3800 includes an attachment ring 3810 and attachment ring 3820. Connected to each attachment ring is a reinforced flexible ring 3830. The reinforced flexible ring 3830 may be made of reinforced rubber. The reinforced flexible ring 3830 allows the two emergency extraction line components (not shown) connected by the system 3800 to bend relative to one another at the connection point.

The attachment ring 3810 and attachment ring 3820 are hinge locks that connect to fittings on an emergency extraction line component (not shown). The attachment ring 3810 includes two half-rings 3850, 3860. These rings include a seal 3890, which contacts the fitting of the emergency extraction line component (not shown). The two halves pivot at a joint 3880. The halves 3850, 3860 can be pivoted open by releasing lever 3870 or locked into place by closing lever 3870.

Figure 39A:
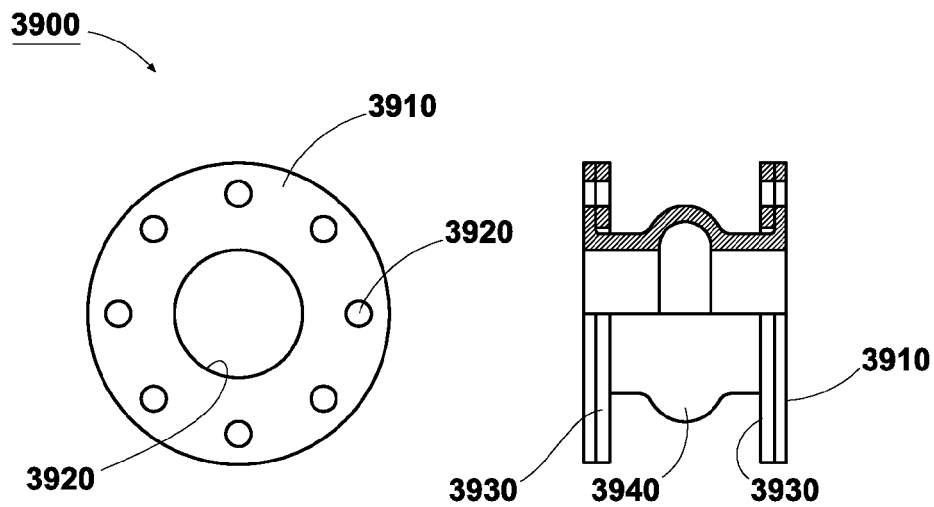
FIG. 39a shows side and end views of a connector system used to connect multiple emergency extraction line components or multiple marine particle skimmers in accordance with an exemplary embodiment of the present invention.
Figure 39B:
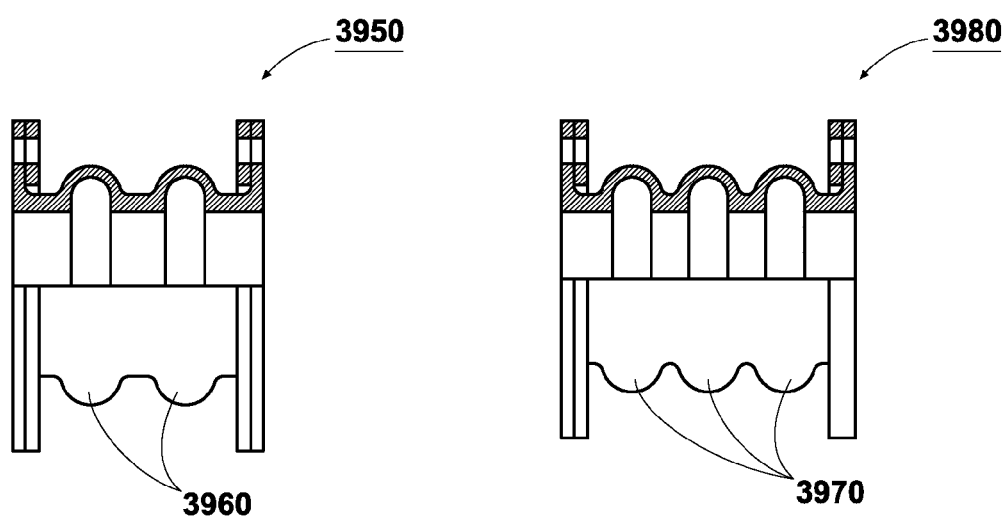

FIG. 39a shows side and end views of a connector system 3900 used to connect multiple emergency extraction line components or multiple marine particle skimmers in accordance with an exemplary embodiment of the present invention. FIG. 38b shows side view of alternative connectors of the connector system of FIG. 39a. Referring to FIGS. 39a and 39b, the system 3900 includes an end plate, or flange, 3910. The end plate 3910 includes a series of holes, such as hole 3920, which allows the connector system 3900 to be attached to an emergency extraction line component (not shown). The end ring 3910 also includes an opening 3925 that allows water and pollutants to flow through the connector system 3900. The connector system 3900 includes an end plate 3910 at each end of the connector, that is, two end plates 3910. The connector system 3900 also includes a retaining ring 3930 attached to the interior side of each of the end plates 3910. The retaining ring 3930 may be constructed of galvanized carbon steel. The connector system 3900 also includes a flexible arch 3940, made of a nylon cord, reinforced with steel and covered in ethylene propylene diene monomer (M-class) (EPDM) rubber. The flexible arch 3940 allows the two emergency extraction line components (not shown) connected by the system 3900 to bend relative to one another at the connection point. Alternative connectors 3950, 3980 include a double arch 3960 or triple arch 3970 configuration. The more arches in the connector, the greater range of flexibility provided.

Figure 40:
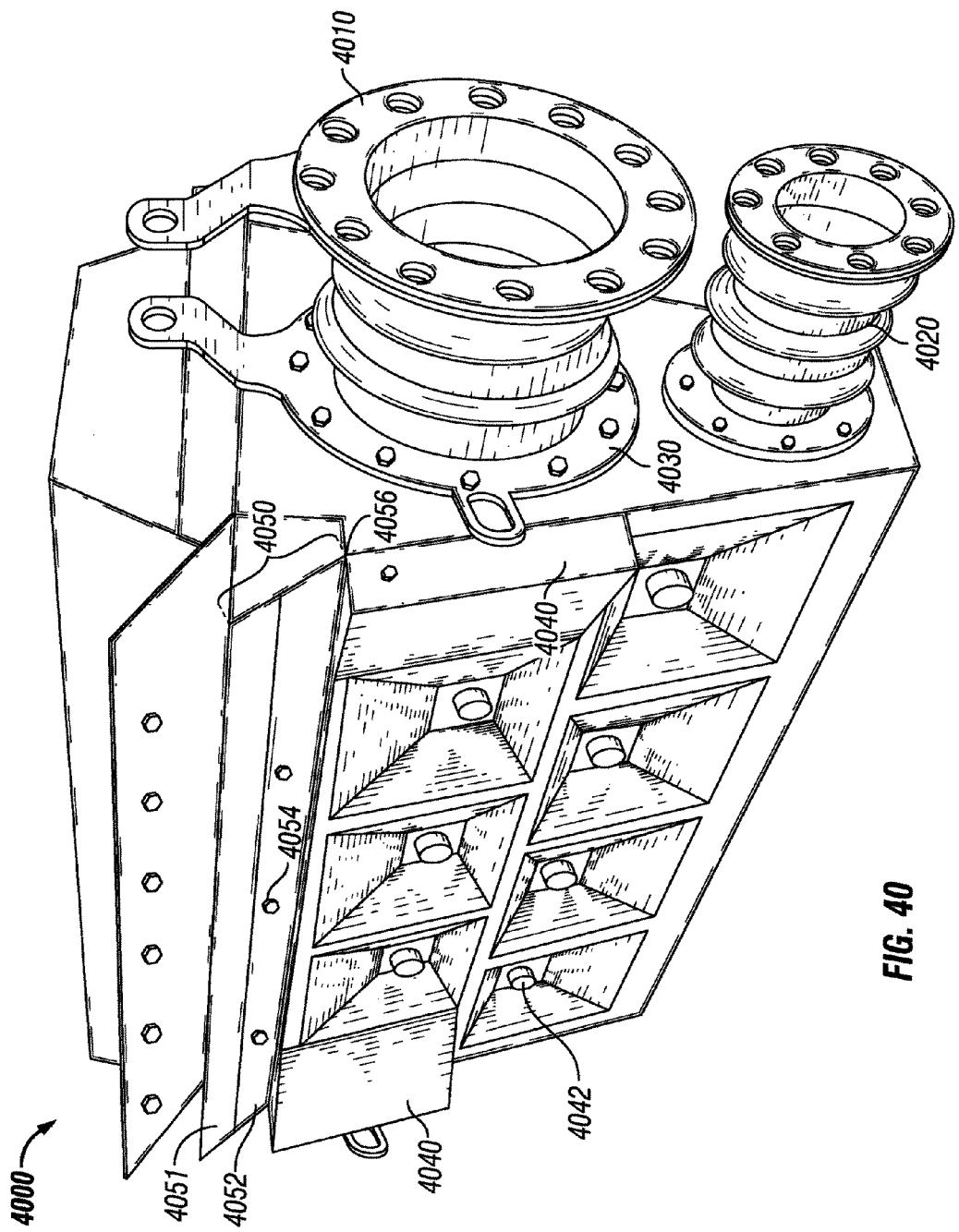
FIG. 40 shows an alternative emergency extraction line component in accordance with an exemplary embodiment of the present invention.

FIG. 40 shows an alternative emergency extraction line component 4000 in accordance with an exemplary embodiment of the present invention. Referring to FIG. 40, the emergency extraction line component 4000 includes connectors 4010 and 4020, connected to the main line (not shown) and base line (not shown) respectively. The connectors 4010 and 4020 are comparable to the connector systems described above, in conjunction with FIGS. 39*a* and 39*b*. A necking and tugging ring 4030 is connected to the connector 4010. This necking and tugging ring 4030 is described in greater detail below, in conjunction with FIG. 41*a*.

The emergency extraction line component 4000 also includes a lip structure 4050. The lip structure 4050 includes a base portion 4052 and an extending portion 4051. The extending portion 4051 is able to slide in and out on the base portion 4052 by three slot-and-peg mechanisms (such as with slot-and-peg 4054). FIG. 41*b*, discussed below, shows a blow-up of slot-and-peg 4054. The lip structure 4050 is connected to the base of the extraction line component 4000 with a hinge at point 4056, which allows the lip structure 4050 to articulate along the length of the emergency extraction line component 4000. The lip structure 4050 is tethered to multiple floating balls (not shown) that cause the lip structure to articulate as the emergency extraction line component 4000 moves up and down in the water. This articulating action restricts the flow of water and contaminants into openings that are positioned in the emergency extraction line component 4000 behind the lip structure (and which cannot be seen by in FIG. 40 as the lip structure 4050 blocks the view of them).

Bladder structures 4040 are a hinged metal plate with an air bladder (not shown) positioned behind the plate. Adding air to the air bladder causes the plates to articulate at the hinge. The air bladder adds buoyancy to the front portion of the emergency extraction line component 4000. Also, the plate forms a deflector of sorts that helps to deflect water and contaminants into openings in the emergency extraction line component 4000, such as opening 4042. An air line (not shown) provides air to the air bladder. The air line is connected to multiple emergency extraction line components and ultimately connects to a pump (not shown) used to move water and contaminants through the main lines (not shown) of the emergency extraction line components. The pump also creates compressed air that is fed into the air line and serves as the compressed air source for the air bladder. For emergency extraction line components with snorkel valves (as described above in connection with FIG. 28*b*), the air line would provide air to both the snorkel valve and the air bladder.

Figure 41A:
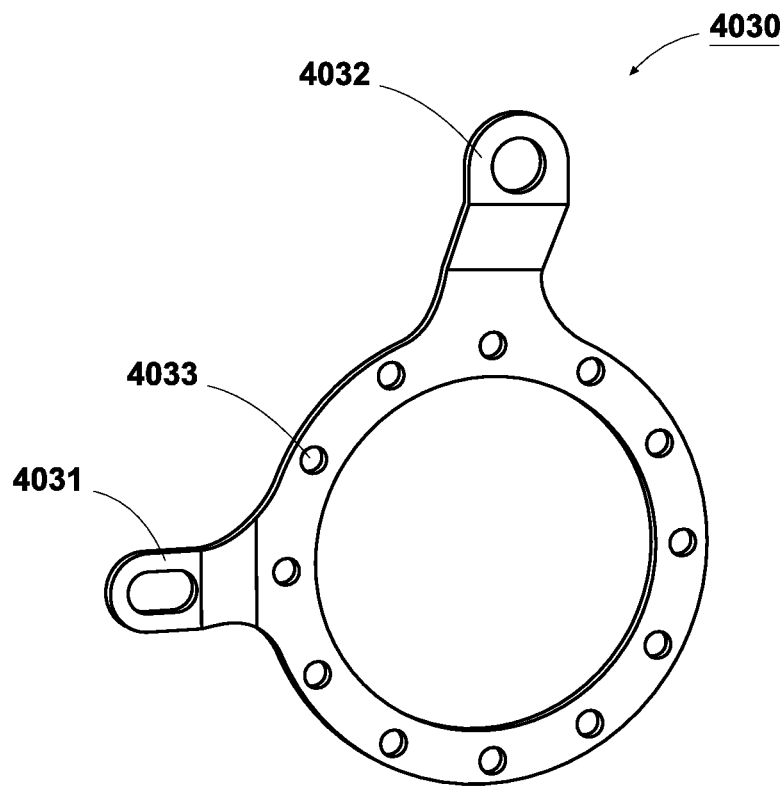
FIG. 41a shows a necking and tugging ring for an emergency extraction line component in accordance with an exemplary embodiment of the present invention.
Figure 41B:
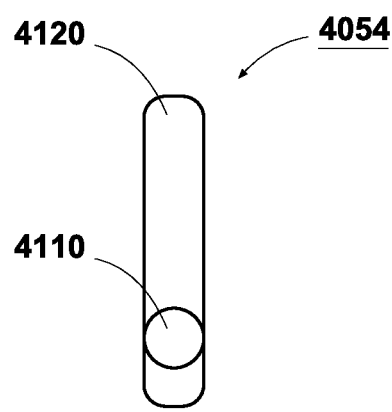
FIG. 41b shows a peg-and-slot arrangement for a lip for an emergency extraction line component in accordance with an exemplary embodiment of the present invention.

FIG. 41*a* shows a necking and tugging ring 4030 for an emergency extraction line component in accordance with an exemplary embodiment of the present invention. Referring to FIG. 41, the necking and tugging ring 4030 includes a lifting point 4032, positioned at the top of the necking and tugging ring 4030. The necking and tugging ring 4030 also includes a tugging point 4031, positioned at the side of the necking and tugging ring 4030. These points are used to position an emergency extraction line component in place. For example, a lifting device, such as a cable, can connect to the lifting point 4032 to lift an emergency extraction line component in and out of the water. Similarly, a cable can be attached to the tugging point 4031 and used to move an emergency extraction line component horizontally in the water to a new position. The necking and tugging ring 4030 is connected to an emergency extraction line component with bolts or similar connectors at connection points around the ring, such as connection point 4033.

FIG. 41*b* shows a peg-and-slot arrangement for a lip for an emergency extraction line component in accordance with an exemplary embodiment of the present invention. Referring to FIGS. 40 and 41*b*, a peg 4110 is connected to an extending portion 4051 of a lip structure 4050. A slot 4120 is created in a base portion 4052 of a lip structure 4050. The peg 4110 is able to freely move the extent of the slot 4120, allowing the extending portion 4051 of a lip structure 4050 to extend relative to the base portion 4052 of a lip structure 4050.

Figure 42A:
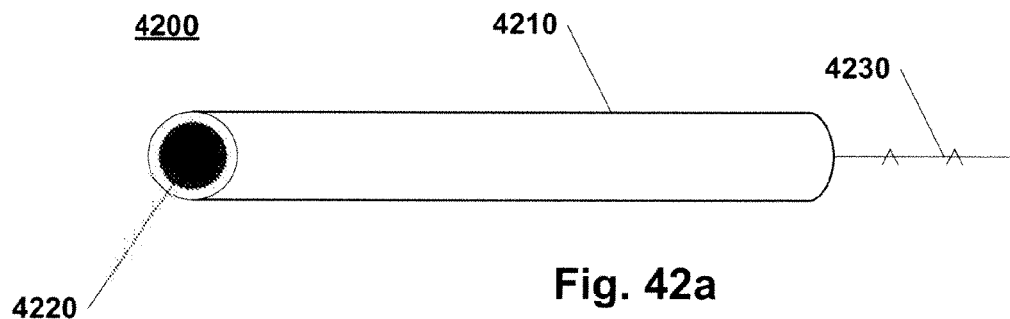
FIGS. 42a, 42b, and 42c show a air bladder system for an emergency extraction line component in accordance with an exemplary embodiment of the present invention.
Figure 42B:
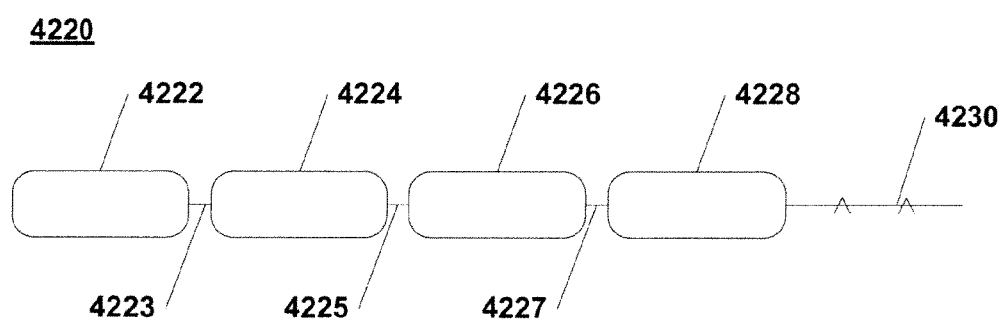
Figure 42C:

FIGS. 42*a*, 42*b*, and 42*c* show an air bladder system 4200 for an emergency extraction line component in accordance with an exemplary embodiment of the present invention. Referring to FIGS. 42*a*, 42*b*, and 42*c*, the air bladder system 4200 may be deployed within an emergency extraction line component, such as the emergency extraction line components depicted in FIGS. 22, 24, and 40 (described above). The bladder system 4200 includes an aluminum sleeve 4210 that contains an air bladder 4220. The air bladder 4220 is connected to an air line 4230. The aluminum sleeve 4210 prevents the air bladder 4220 from over-expanding. Typically, an emergency extraction line component would include two air bladder systems 4200, one positioned under the lower ledge of the roof of an emergency extraction line component at the front edge of the emergency extraction line component and the other positioned under the lower ledge of the roof of the emergency extraction line component at the back edge of the emergency extraction line component. The aluminum sleeve 4210 and interior air bladder 4220 would extend the length of the emergency extraction line component. Valves (not shown) can be controlled to selectively add air to one or both of these air bladder systems 4200. In this way, additional buoyancy can be added to the emergency extraction line component and, based on the conditions of the body of water, buoyancy can be preferentially added to the top-front or top-back of the emergency extraction line component.

The air bladder 4220 includes multiple segments 4222, 4224, 4226, 4228. Each segment is connected by an air line, such as air lines 4223, 4225, 4227. A valve (not shown) allows air into each segment through air line 4230. That is, when the valve is opened, air would be introduced into all of the segments of the air bladder 4220. When air is not provided to the air bladder 4220, the individual segments deflate, such as shown in FIG. 42*c*, with deflated segment 4221.

The air line 4230 is connected to multiple emergency extraction line components and ultimately connects to a pump (not shown) used to move water and contaminants through the main lines (not shown) of the emergency extraction line components. The pump also creates compressed air that is fed into the air line 4230 and serves as the compressed air source for the air bladder 4220. For emergency extraction line components with snorkel valves (as described above in connection with FIG. 28*b*), the air line 4230 would provide air to both the snorkel valve and the air bladder 4220.

One of ordinary skill in the art would understand that the present invention provides systems and apparatus to remove pollutants from a body of water. Alternative embodiments of marine particle skimmers and emergency extraction lines draw in water and pollutants to allow the pollutants to be collected. Individual components may provide their own means for pulling water or pollutants into the component or may be connected to a pump or other device to create the suction necessary to collect the water and pollutants.

What is claimed is:

1. A system for removing contaminated water from a body of water comprising:
   at least three emergency extraction line components, each emergency extraction line component comprising:
   a body comprising a buoyant material;
   a first contaminant-transporting conduit running through the body and operably connected to a first pump;
   a second contaminant-transporting conduit running through the body connected to the first contaminant-transporting conduit and operably connected to a second pump, wherein the connection allows contaminated water to flow between the first contaminant-transporting conduit and the second contaminant-transporting conduit; and a plurality of liquid intakes connected to the first contaminant-transporting conduit such that the contaminated water is pulled into the first conduit;

wherein each emergency extraction line component is connected to at least one other emergency extraction line component by a flexible connector.

2. The system of claim 1 wherein the flexible connector forms a connection between the first contaminant-transporting conduit of one of the at least three emergency extraction line components and the first contaminant-transporting conduit of another of the at least three emergency extraction line components.

3. The system of claim 1 wherein each emergency extraction line component further comprises a skirt comprising an air line and bubbler.

4. The system of claim 1 wherein the first pump is located on a marine vessel.

5. The system of claim 1 wherein at least one of the first pump and the second pump is located on a marine vessel.

6. The system of claim 1 further comprising an air bladder comprising multiple segments, wherein the air bladder is located within the body.

7. The system of claim 6 further comprising a sleeve surrounding the air bladder.

8. An apparatus comprising:
a body comprising a buoyant material;
a first contaminant-transporting conduit running through the body;
a first liquid intake connected to the first contaminant-transporting conduit located at a point in the body above a centerline of the first contaminant-transporting conduit; and
a second liquid intake connected to the first contaminant-transporting conduit located at a point in the body below the centerline of the first contaminant-transporting conduit;
wherein the first contaminant-transporting conduit is operably connected to a suction producing component.

9. The apparatus of claim 8 wherein the buoyant material is located within the body at a position above the first contaminant-transporting conduit.

10. The apparatus of claim 8 wherein the suction producing component is a pump.

11. The apparatus of claim 10 wherein the pump is located on a marine vessel.

12. The apparatus of claim 8 further comprising a second contaminant-transporting conduit running through the body, wherein the second contaminant-transporting conduit is operably connected to a suction producing component.

13. The apparatus of claim 12 wherein the first contaminant-transporting conduit is connected to a first suction producing component and the second contaminant-transporting conduit is connected to a second suction producing component.

14. The apparatus of claim 13 wherein the first suction producing component is a first pump and the second suction producing component is a second pump.

15. The apparatus of claim 14 wherein at least one of the first pump and the second pump is located on a marine vessel.

\* \* \* \* \*